United States Patent
Dvir et al.

(10) Patent No.: US 12,514,957 B2
(45) Date of Patent: *Jan. 6, 2026

(54) OMENTUM BASED SCAFFOLD AND DELIVERY SYSTEM

(71) Applicant: Ramot at Tel-Aviv University Ltd., Tel-Aviv (IL)

(72) Inventors: Tal Dvir, LeHavim (IL); Dan Peer, Kiryat-Ono (IL); Michal Shevach, Tel-Aviv (IL); Neta Soffer Tsur, Zikhron-Yaakov (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 335 days.

This patent is subject to a terminal disclaimer.

(21) Appl. No.: 16/686,158

(22) Filed: Nov. 17, 2019

(65) Prior Publication Data

US 2020/0101198 A1 Apr. 2, 2020

Related U.S. Application Data

(63) Continuation of application No. 15/702,834, filed on Sep. 13, 2017, now abandoned, which is a continuation of application No. 14/581,540, filed on Dec. 23, 2014, now abandoned, which is a continuation-in-part of application No. PCT/IL2014/050568, filed on Jun. 24, 2014.

(60) Provisional application No. 61/838,428, filed on Jun. 24, 2013.

(51) Int. Cl.
| | |
|---|---|
| *A61L 27/36* | (2006.01) |
| *A61K 35/34* | (2015.01) |
| *A61K 35/44* | (2015.01) |
| *A61L 27/14* | (2006.01) |
| *A61L 27/38* | (2006.01) |
| *A61L 27/52* | (2006.01) |
| *A61L 27/58* | (2006.01) |
| *C12N 5/071* | (2010.01) |
| *C12N 5/074* | (2010.01) |
| *C12N 5/077* | (2010.01) |

(52) U.S. Cl.
CPC .......... *A61L 27/3633* (2013.01); *A61K 35/34* (2013.01); *A61K 35/44* (2013.01); *A61L 27/14* (2013.01); *A61L 27/3604* (2013.01); *A61L 27/3687* (2013.01); *A61L 27/3804* (2013.01); *A61L 27/3826* (2013.01); *A61L 27/3834* (2013.01); *A61L 27/52* (2013.01); *A61L 27/58* (2013.01); *C12N 5/0657* (2013.01); *C12N 5/0691* (2013.01); *C12N 5/0696* (2013.01); *A61L 2430/20* (2013.01); *A61L 2430/40* (2013.01)

(58) Field of Classification Search
CPC .......................... C12N 5/0602; C12N 5/0658
See application file for complete search history.

(56) References Cited

U.S. PATENT DOCUMENTS

| | | |
|---|---|---|
| 5,843,134 A | 12/1998 | Thong et al. |
| 6,600,956 B2 | 7/2003 | Maschino et al. |
| 11,213,609 B2 | 1/2022 | Dvir et al. |
| 2005/0013870 A1 | 1/2005 | Freyman et al. |
| 2006/0136028 A1 | 6/2006 | Ross et al. |
| 2007/0060815 A1 | 3/2007 | Martin et al. |
| 2007/0219642 A1 | 9/2007 | Richter |
| 2007/0248638 A1 | 10/2007 | Van Dyke et al. |
| 2008/0096005 A1 | 4/2008 | Premasiri |
| 2008/0208358 A1 | 8/2008 | Bellamkonda et al. |
| 2008/0260831 A1 | 10/2008 | Badylak et al. |
| 2009/0163990 A1 | 6/2009 | Yang et al. |
| 2009/0238853 A1* | 9/2009 | Liu .................. A61L 27/34 435/402 |
| 2009/0248113 A1 | 10/2009 | Nimer et al. |
| 2009/0280154 A1 | 11/2009 | Nielsen et al. |
| 2010/0094110 A1 | 4/2010 | Heller et al. |
| 2010/0106233 A1 | 4/2010 | Grant et al. |
| 2010/0114278 A1 | 5/2010 | McMorrow et al. |
| 2010/0211172 A1 | 8/2010 | Bellamkonda et al. |
| 2010/0255447 A1 | 10/2010 | Biris et al. |
| 2010/0273667 A1 | 10/2010 | Kotov et al. |
| 2011/0085968 A1 | 4/2011 | Jin et al. |
| 2011/0087315 A1 | 4/2011 | Richardson-Burns et al. |
| 2011/0143429 A1 | 6/2011 | Chun et al. |
| 2011/0306110 A1 | 12/2011 | Takeuchi et al. |

(Continued)

FOREIGN PATENT DOCUMENTS

| | | |
|---|---|---|
| EP | 2229191 | 1/2012 |
| WO | WO 2005/007233 | 1/2005 |

(Continued)

OTHER PUBLICATIONS

Pati et al., "Printing three-dimensional tissue analogues with decellularized extracellular matrix bioink", Nature Communications, published Jun. 2, 2014, vol. 5, Article No. 3935, pp. 1-11. (Year: 2014).*
Communication Pursuant to Article 94(3) EPC Dated May 29, 2020 From the European Patent Office Re. Application No. 16875065.1. (8 Pages).
Collins et al. "The Poisson Distribution and Beyond: Methods for Microfluidic Droplet Production and Single Cell Encapsulation", Lab on A Chip, XP055426432, 15(17): 3439-3459, Published Online Jul. 30, 2015.
Official Action Dated May 22, 2020 Re. U.S. Appl. No. 16/061,675. (32 pages).
Official Action Dated Jun. 11, 2020 Re. U.S. Appl. No. 15/037,129. (21 pages).

(Continued)

*Primary Examiner* — Laura Schuberg
(74) *Attorney, Agent, or Firm* — JMB Davis Ben-David

(57) ABSTRACT

Compositions of matter comprising decellularized omentum are disclosed. The compositions may be scaffolds, hydrogels or hydrogel precursor compositions. Methods of generating the compositions are disclosed as well as uses thereof.

6 Claims, 41 Drawing Sheets
(39 of 41 Drawing Sheet(s) Filed in Color)

(56) References Cited

U.S. PATENT DOCUMENTS

| | | | |
|---|---|---|---|
| 2012/0156250 A1* | 6/2012 | Christman | A61L 27/3625 |
| | | | 424/94.1 |
| 2012/0177910 A1 | 7/2012 | Weber et al. | |
| 2013/0085359 A1 | 4/2013 | Yao et al. | |
| 2014/0145365 A1 | 5/2014 | Omenetto et al. | |
| 2014/0271784 A1 | 9/2014 | Yang et al. | |
| 2015/0202348 A1 | 7/2015 | Dvir et al. | |
| 2015/0202351 A1 | 7/2015 | Kaplan et al. | |
| 2016/0106886 A1 | 4/2016 | Dvir et al. | |
| 2016/0270729 A1 | 9/2016 | Dvir et al. | |
| 2018/0000990 A1 | 1/2018 | Dvir et al. | |
| 2018/0361023 A1 | 12/2018 | Dvir et al. | |
| 2022/0118156 A1 | 4/2022 | Dvir et al. | |
| 2024/0316112 A1 | 9/2024 | Dvir et al. | |

FOREIGN PATENT DOCUMENTS

| | | | |
|---|---|---|---|
| WO | WO 2009/085547 | 7/2009 | |
| WO | WO 2011/154424 | 12/2011 | |
| WO | WO 2011/159923 | 12/2011 | |
| WO | WO 2012/094208 | 7/2012 | |
| WO | WO-2013040078 A2 * | 3/2013 | A61F 2/02 |
| WO | WO-2013040087 A2 * | 3/2013 | A61F 2/02 |
| WO | WO 2013/086502 | 6/2013 | |
| WO | WO 2013/109642 | 7/2013 | |
| WO | WO 2014/037942 | 3/2014 | |
| WO | WO 2014/188420 | 11/2014 | |
| WO | WO 2014/207744 | 12/2014 | |
| WO | WO 2015/048136 | 4/2015 | |
| WO | WO 2015/071912 | 5/2015 | |
| WO | WO 2017/103930 | 6/2017 | |
| WO | WO 2024/116183 | 6/2024 | |

OTHER PUBLICATIONS

Achyuta et al. "Biocompatibility Assessment of Insulating Silicone Polymer Coatings Using an in vitro Glial Scar Assay", Macromolecular Bioscience 10: 872-880, 2010.
Communication Pursuant to Article 94(3) EPC Dated Jul. 12, 2018 From the European Patent Office Re. Application No. 14741411.4. (6 Pages).
Communication Pursuant to Article 94(3) EPC Dated Nov. 21, 2019 From the European Patent Office Re. Application No. 14741411.4. (5 Pages).
Communication Pursuant to Article 94(3) EPC Dated Sep. 21, 2018 From the European Patent Office Re. Application No. 14862849.8. (7 Pages).
Communication Pursuant to Article 94(3) EPC Dated Nov. 29, 2018 From the European Patent Office Re. Application No. 14800309.8. (5 Pages).
International Preliminary Report on Patentability Dated Dec. 3, 2015 From the International Bureau of WIPO Re. Application No. PCT/IL2014/050445.
International Preliminary Report on Patentability Dated Jan. 7, 2016 From the International Bureau of WIPO Re. Application No. PCT/IL2014/050568.
International Preliminary Report on Patentability Dated May 26, 2016 From the International Bureau of WIPO Re. Application No. PCT/IL2014/050994.
International Search Report and the Written Opinion Dated Apr. 4, 2017 From the International Searching Authority Re. Application No. PCT/IL2016/051344. (12 Pages).
International Search Report and the Written Opinion Dated Aug. 18, 2014 From the International Searching Authority Re. Application No. PCT/IL2014/050445.
International Search Report and the Written Opinion Dated Mar. 22, 2015 From the International Searching Authority Re. Application No. PCT/IL2014/050994.
International Search Report and the Written Opinion Dated Oct. 24, 2014 From the International Searching Authority Re. Application No. PCT/IL2014/050568.

Notice of Non-Compliant Amendment (37 CFR 1.121) Dated May 5, 2015 Re. U.S. Appl. No. 14/581,540.
Official Action Dated Jan. 4, 2019 Re. U.S. Appl. No. 14/891,375. (15 pages).
Official Action Dated Mar. 8, 2018 Re. U.S. Appl. No. 14/891,375. (16 pages).
Official Action Dated Jan. 10, 2019 Re. U.S. Appl. No. 15/702,834. (19 pages).
Official Action Dated Oct. 11, 2019 Re. U.S. Appl. No. 15/037,129. (18 Pages).
Official Action Dated Mar. 13, 2017 Re. U.S. Appl. No. 14/581,540. (15 pages).
Official Action Dated May 16, 2019 Re. U.S. Appl. No. 15/702,834. (17 Pages).
Official Action Dated Mar. 21, 2019 Re. U.S. Appl. No. 15/037,129. (38 pages).
Official Action Dated Sep. 21, 2017 Re. U.S. Appl. No. 14/891,375. (29 pages).
Official Action Dated Jun. 28, 2016 Re. U.S. Appl. No. 14/581,540.
Restriction Official Action Dated Jul. 13, 2017 Re. U.S. Appl. No. 14/891,375. (9 pages).
Summons to Attend Oral Proceedings Pursuant to Rule 115(1) EPC Dated Jul. 17, 2019 From the European Patent Office Re. Application No. 14862849.8. (8 Pages).
Supplementary European Search Report and the European Search Opinion Dated Jul. 22, 2019 From the European Patent Office Re. Application No. 16875065.1. (8 Pages).
Supplementary European Search Report and the European Search Opinion Dated Jun. 22, 2017 From the European Patent Office Re. Application No. 14862849.8. (12 Pages).
Supplementary European Search Report and the European Search Opinion Dated Nov. 28, 2016 From the European Patent Office Re. Application No. 14800309.8. (7 Pages).
Aregueta-Robles et al. "Organic Electrode Coatings for Next-Generation Neural Interfaces", Frontiers in Neuroengineering, 7(Art. 15): 1-7, May 27, 2014. Abstract, Fig.1.
Broda et al. "A Chemically Polymerized Electrically Conducting Composite of Polypyrrole Nanoparticles and Polyurethane for Tissue Engineering", Journal of Biomedical Materials Research, 98(4): 509-516, Sep. 15, 2011.
Cohen-Karni et al. "Nanocomposite Gold-Silk Nanofibers", Nano Letters, 12(10): 5403-5406, Aug. 28, 2012.
Cohen-Karni et al. "Nanocomposite Gold-Silk Nanofibers", Nano Letters, 12(10): 5403-5406, Aug. 28, 2012. Fig.1B.
Crapo et al. "An Overview of Tissue and Whole Organ Decellularization Processes", Biomaterials, 32(12): 3233-3243, Apr. 30, 2011.
Dvir et al. "Activation of the ERK1/2 Cascade Via Pulsatile Interstitial Fluid Flow Promotes Cardiac Tissue Assembly", Tissue Engineering, 13(9): 2185-2193, Sep. 2007.
Dvir et al. "Nanowired Three-Dimensional Cardiac Patches", Nature Nanotechnology, 6: 720-725, Published Online Sep. 25, 2011.
Dvir et al. "Nanowired Three-Dimensional Cardiac Patches", Nature Nanotechnology, XP055526382, 6(11): 720-725, Published Online Sep. 25, 2011.
Dvir et al. "Precascularization of Cardiac Patch on the Omentum Improves Its Therapeutic Outcome", Proc. Natl. Acad. Sci. USA, PNAS, 106(35): 14990-14995, Sep. 1, 2009.
Engelmayr Jr. et al. "Accordion-Like Honeycombs for Tissue Engineering of Cardiac Anisotropy", Nature Materials, 7(12): 1003-1010, Dec. 2008.
Fleischer et al. "Albumin Fiber Scaffolds for Engineering Functional Cardiac Tissues", Biotechnology and Bioengineering, 111(6): 1246-1257, Jun. 2014.
Fleischer et al. "Coiled Fiber Scaffolds Embedded With Gold Nanoparticles Improve the Performance of Engineered Cardiac Tissues", Nanoscale, 6(16): 9410-9414, Aug. 21, 2014.
Fleischer et al. "Spring-Like Fibers for Cardiac Tissue Engineering", Biomaterials, 34(34): 8599-8606, Available Online Aug. 13, 2013.
Gilbert et al. "Decellularization of Tissues and Organs", Biomaterials, XP002730648, 27(19): 3675-3683, Jul. 2006. p. 3676, Para 2, Table 1, p. 3679, Para 3.

(56) References Cited

OTHER PUBLICATIONS

Homola "Surface Plasmon Resonance Sensors for Detection of Chemical and Biological Species", Chemical Reviews, 108(2): 462-493, Jan. 30, 2008.
Hsu et al. "Gold Nanoparticles Induce Surface Morphological Transformation in Polyurethane and Affect the Cellular Response", Biomacromolecules, 9(1): 241-248, Jan. 2008.
Johnson et al. "Tailoring Material Properties of A Nanofibrous Extracellular Matrix Derived Hydrogel", Nanotechnology, 22(49): 494015-1-494015-23, Published Online Nov. 21, 2011.
Mao et al. "Recent Advances in Polymeric Microspheres for Parental Drug Delivery—Part 2", Expert Opinion on Drug Delivery, XP055605149, 9(10): 1209-1223, Aug. 28, 2012.
Porzionato et al. "Decellularization of Rat and Human Omentum to Develop Novel Scaffolds to Be Recellularized With Adipose Derived Stem Cells", Italian Journal of Anatomy and Embryology, IJAE, 116(1/Suppl.): 149, 2011.
Porzionato et al. "Decellularized Omentum as Novel Biologic Scaffold for Reconstructive Surgery and Regenerative Medicine", European Journal of Histpchemistry, 57(e4): 24-30, 2013.
Prabhakaran et al. "Electrospun Composite Scaffolds Containing Poly(Octanediol-CO-Citrate) for Cardiac Tissue Engineering", Biopolymers, 97(7): 529-538, Feb. 10, 2012.
Prabhakaran et al. "Electrospun Composite Scaffolds Containing Poly(Octanediol-CO-Citrate) for Cardiac Tissue Engineering", Biopolymers, 97(7): 529-538, Published Online Feb. 10, 2012.
Radisic et al. "Functional Assembly of Engineered Myocardium by Electrical Stimulation of Cardiac Myocytes Cultured on Scaffolds", Proc. Natl. Acad. Sci. USA, Pnas, 101(52): 18129-18134, Dec. 28, 2004.
Sawkins et al. "Hydrogels Derived From Demineralized and Decellularized Bone Extracellular Matrix", Acta Biomaterialia, 9: 7865-7873, 2013.
Sawkins et al. "Hydrogels Derived From Demineralized and Decellularized Bone Extracellular Matrix", Acta Biomaterialia, XP002730649, 9(8): 7865-7873, Available Online Apr. 25, 2013. p. 7866, 1-h col. Para 2, r-h col. Para 6, p. 7867, 1-h col. Para 6.
Shevach et al. "Fabrication of Omentum-Based Matrix for Engineering Vascularized Cardiac Tissues", Biofabrication, 6(2): 024101-10024101-12, Published Online Jan. 24, 2014. Para 4.1, p. 9, Fig.8.
Shevach et al. "Gold Nanoparticle-Decellularized Matrix Hybrids for Cardiac Tissue Engineering", Nano Letters, 14(10): 5792-5796, Sep. 8, 2014.
Shevach et al. "Nanoengineering Gold Particle Composite Fibers for Cardiac Tissue Engineering", Journal of Materials Chemistry B, 1(39): 5110-5217, 2013.
Shevach et al. "Omentum ECM-Based Hydrogel as A Platform for Cardiac Cell Delivery", Biomedical Materials, 10(3): 034106-10-034106-11, May 13, 2015. Para 2.1, p. 2, Fig.7.
Singelyn et al. "Catheter-Deliverable Hydrogel Derived From Decellularized Ventricular Extracellular Matrix Increases Endogenous Cardiomyocytes and Preserves Cardiac Function Post-Myocardial Infarction", Journal of the American College of Cardiology, JACC, 59(8): 751-763, Feb. 21, 2012.
Soffer-Tzur et al. "Optimizing the Biofabrication Process of Omentum-Based Scaffolds for Engineering Autologous Tissues", Biofabrication, 6(3): 035023-1-035023-14, Published Online Aug. 27, 2014. Table 1.
Tian et al. "Macroporous Nanowire Nanoelectronic Scaffolds for Synthetic Tissues", Nature Materials, 11: 986-994, Nov. 2012 & Supplementary Information, p. 1-27, 2012.
Whelove et al. "Development and In Vitro Studies of A Polyethylene Terephthalate-Gold Nanoparticle Scaffold for Improved Biocompatibility", Journal of Biomedical Materials Research, Part B: Applied Biomaterials, 99B(1): 142-149, Oct. 2011.
Whelove et al. "Development and In Vitro Studies of A Polyethylene Terephthalate-Gold Nanoparticle Scaffold for Improved Biocompatibility", Journal of Biomedical Materials Research, Part B: Applied Biomaterials, 99B(1): 142-149, Published Online Jul. 28, 2011.
Yao et al. "Collagen Microsphere Serving as A Cell Carrier Supports Oligodendrocyte Progenitor Cell Growth and Differentiation for Neurite Myelination In Vivo", Stem Cell Research & Therapy, XP021162904, 4(5): 109-1-109-8, Sep. 9, 2013.
You et al. "Nanoengineering the Heart: Conductive Scaffolds Enhance Connexin 43 Expression", Nano Letters, 11(9): 3643-3648, Aug. 1, 2011.
You et al. "Nanoengineering the Heart: Conductive Scaffolds Enhance Connexin 43 Expression", Nano Letters, XP055204904, 11(9): 3643-3648, Aug. 1, 2011.
Zhang et al. "Neurite Development in PC12 Cells on Nanostructured Substrates", Advances in Science and Technology, 53: 85-90, Oct. 1, 2006.
Zimmermann et al. "Tissue Engineered of A Differential Cardiac Muscle Construct", Circulation Research, 90(2): 223-230, Feb. 8, 2002.
Official Action Dated Dec. 27, 2019 Re. U.S. Appl. No. 14/891,375. (32 pages).
Final Official Action Dated Oct. 16, 2020 Re. U.S. Appl. No. 14/891,375. (19 pages).
Restriction Official Action Dated Dec. 13, 2019 Re. U.S. Appl. No. 16/061,675. (7 pages).
Merriam-Webster "Particle" Definition, Retrieved from www.merriam-webster.com, 1 Page, 2019.
Official Action Dated Jun. 30, 2021 Re. U.S. Appl. No. 16/061,675. (10 Pages).
Advisory Action Dated Jan. 22, 2021 Re. U.S. Appl. No. 16/061,675. (3 pages).
Official Action Dated Nov. 12, 2020 Re. U.S. Appl. No. 16/061,675. (19 Pages).
International Search Report and the Written Opinion Dated Mar. 7, 2024 From the International Searching Authority Re. Application No. PCT/IL2023/051227 (12 Pages).
Official Action Dated Nov. 14, 2024 Re. U.S. Appl. No. 17/567,200. (47 Pages).

* cited by examiner

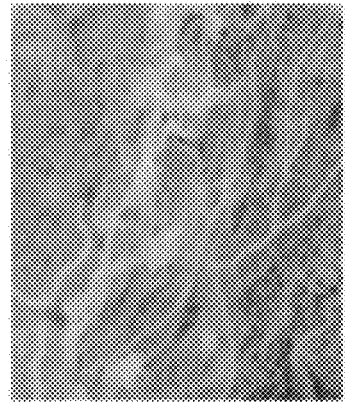
FIG. 2C
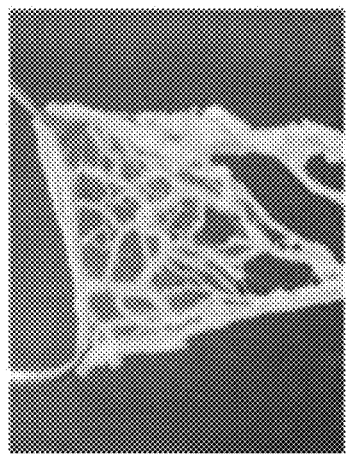
FIG. 2B
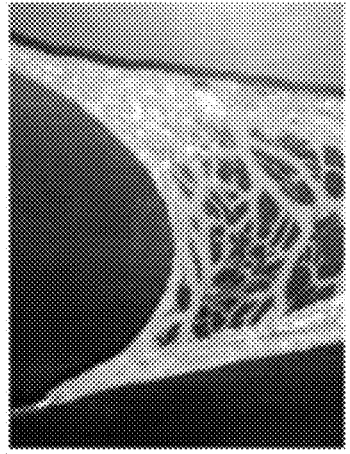
FIG. 2A
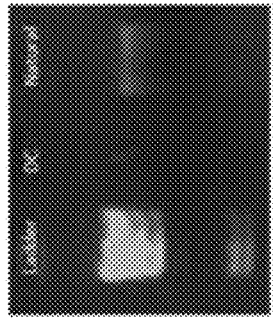
FIG. 2G
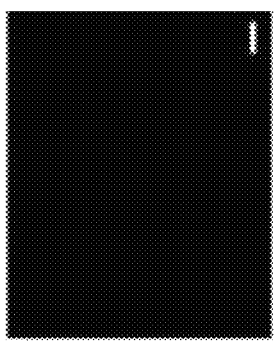
FIG. 2F
FIG. 2E
FIG. 2D

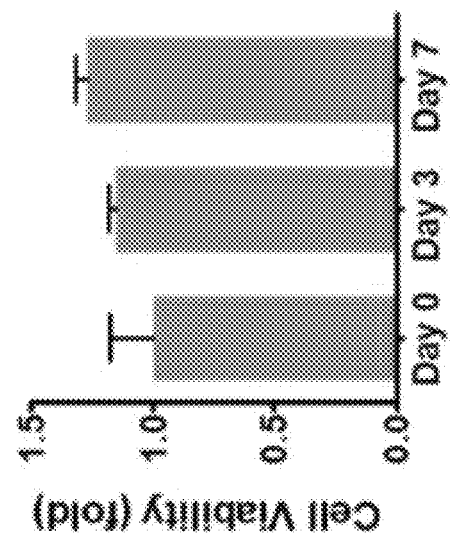
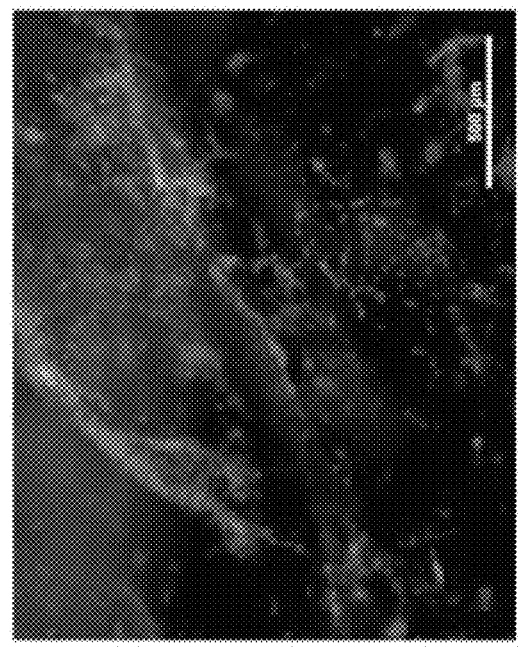

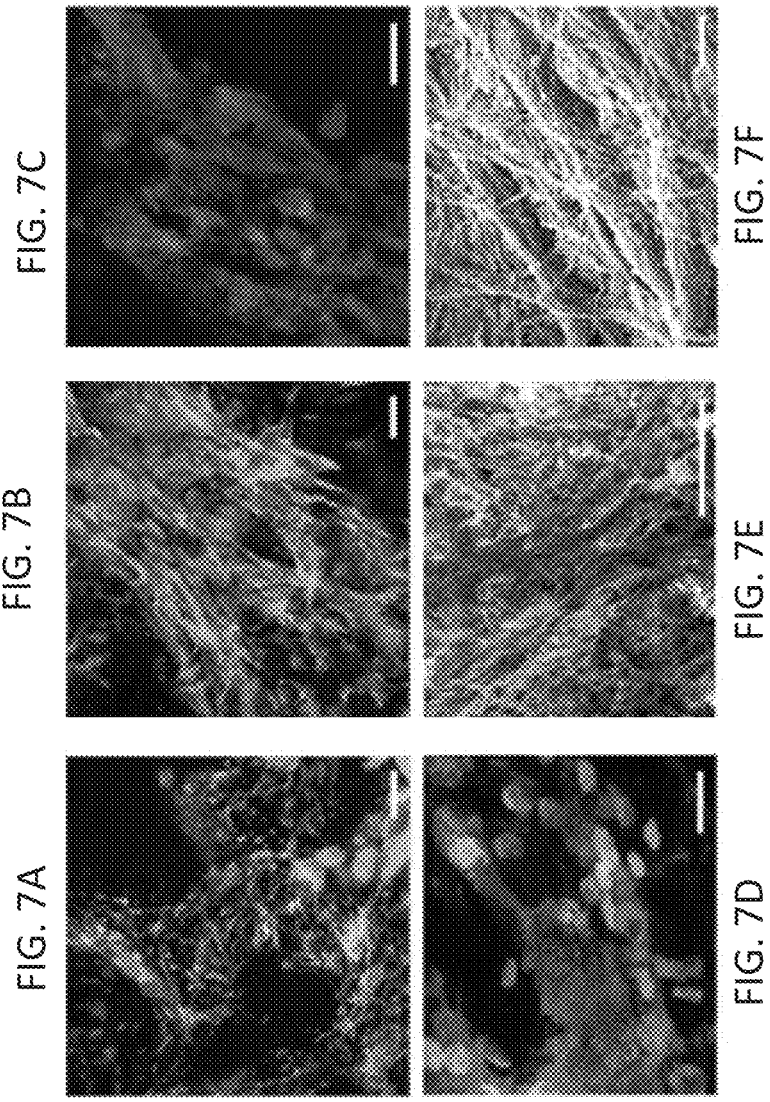

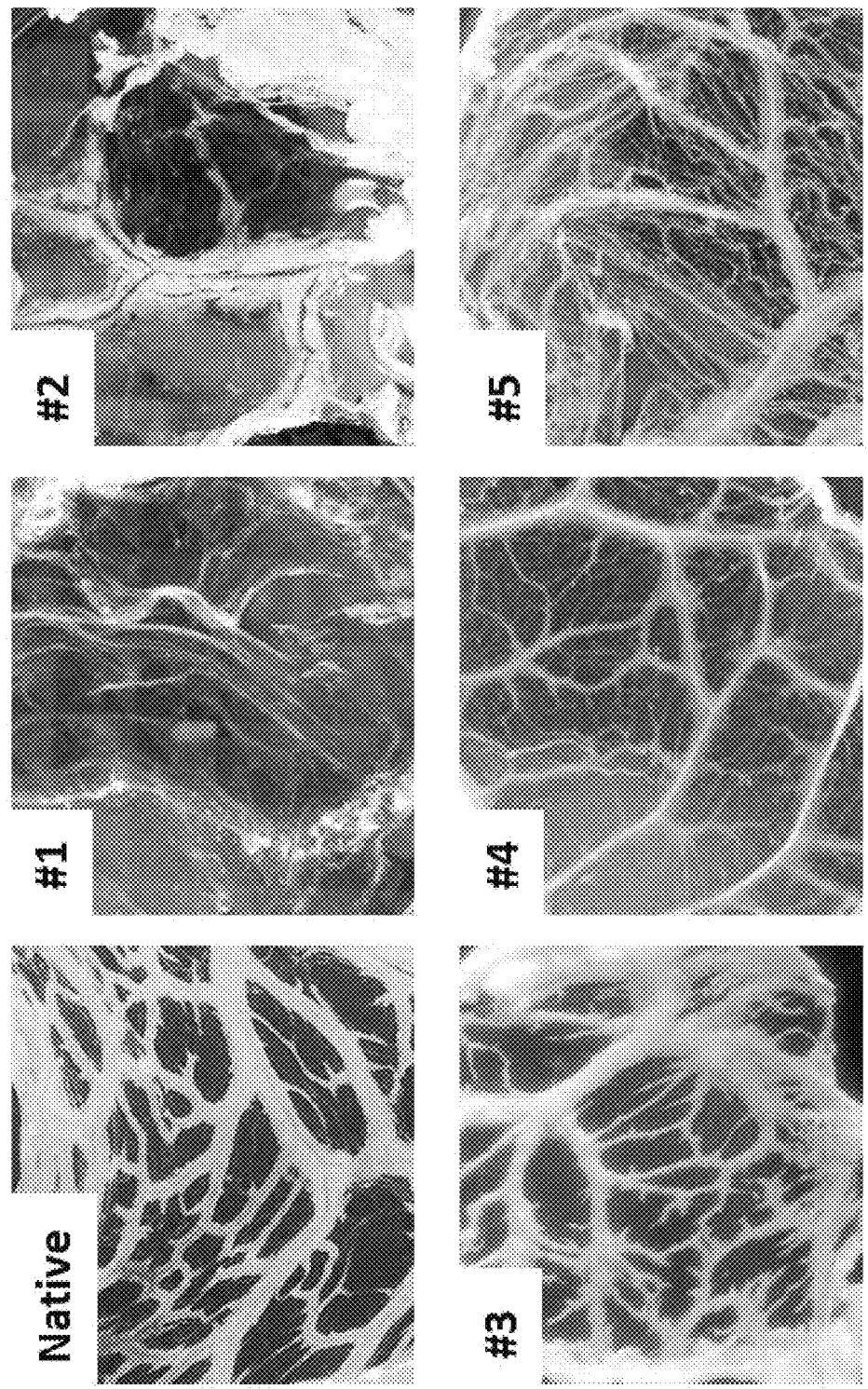

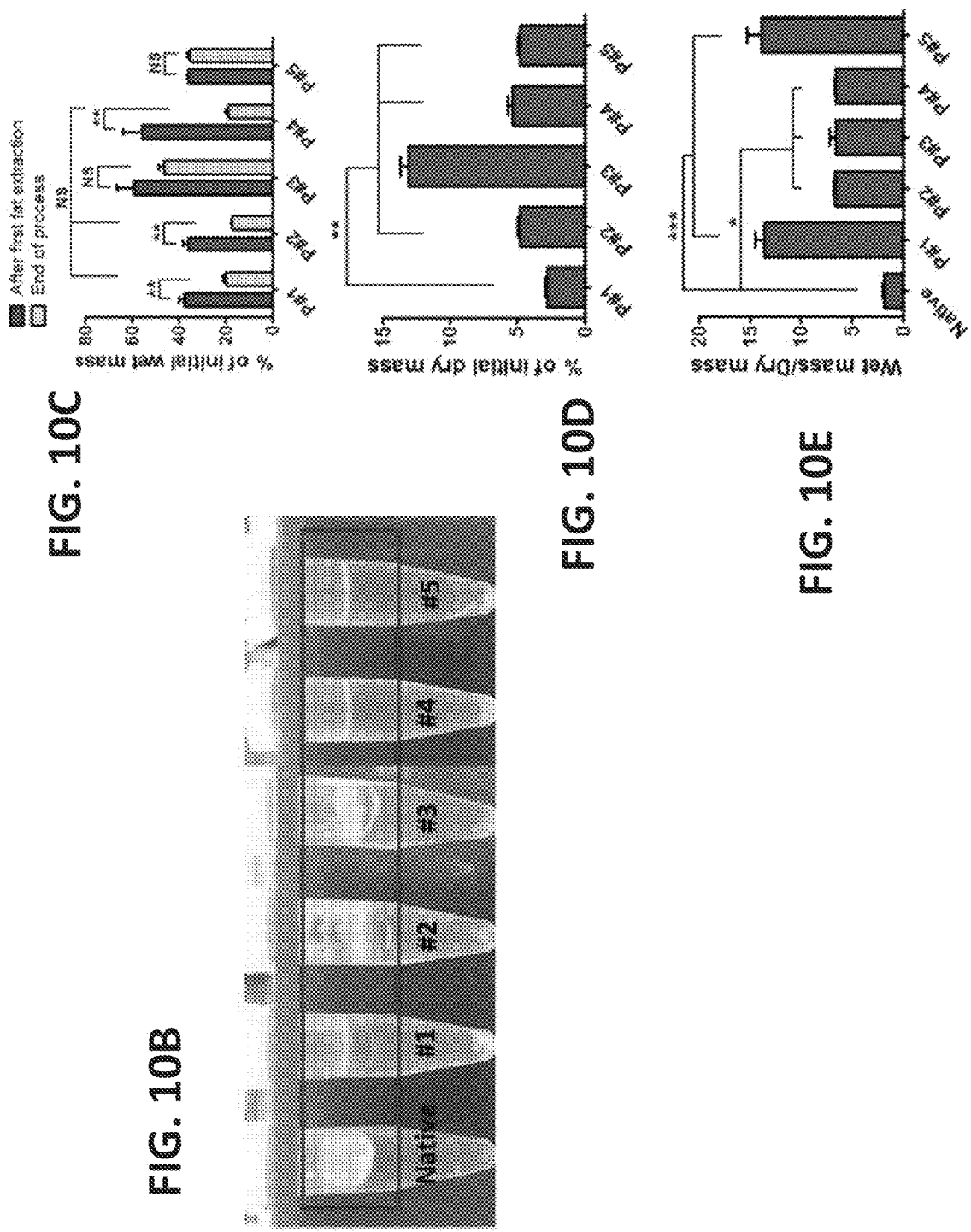

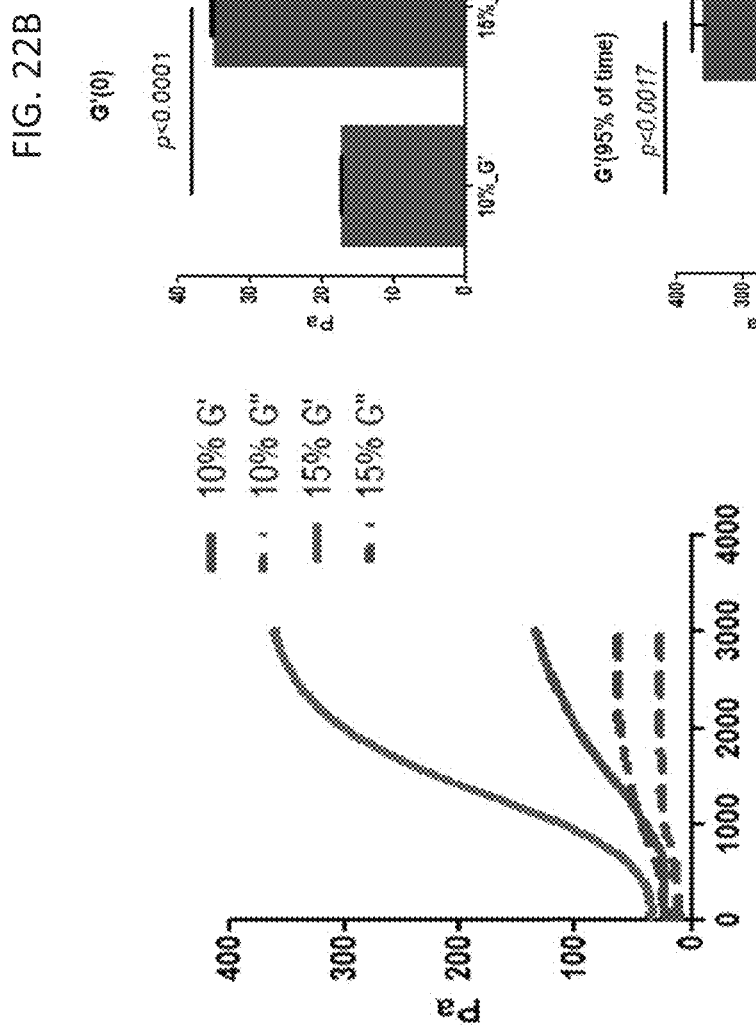
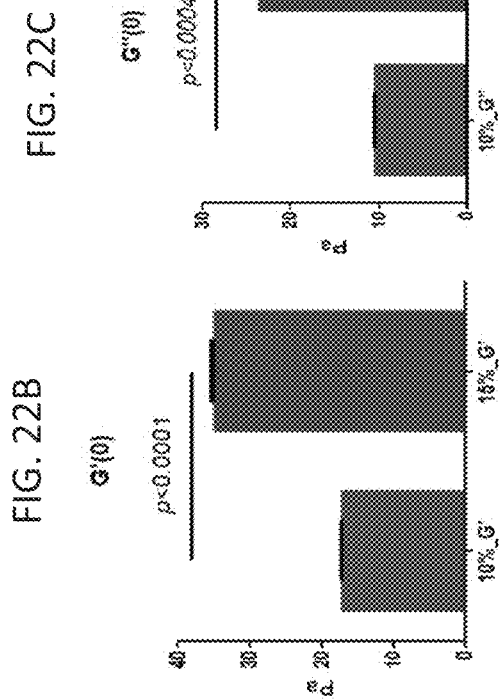
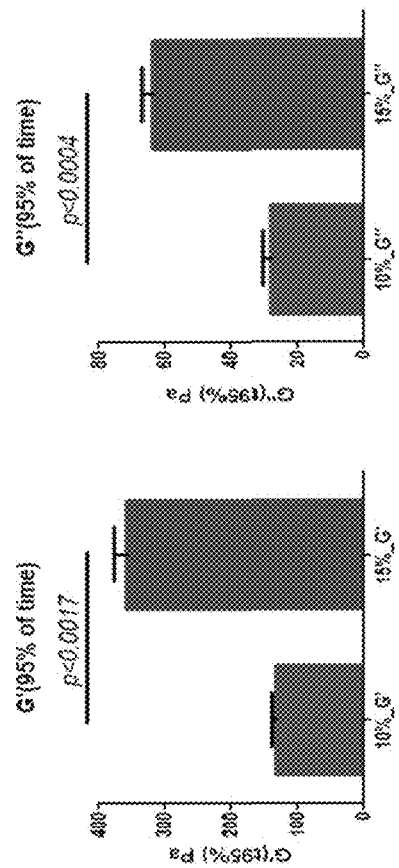
FIG. 22A, FIG. 22B, FIG. 22C, FIG. 22D, FIG. 22E

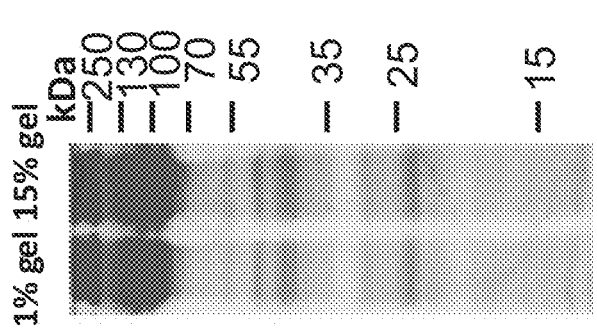
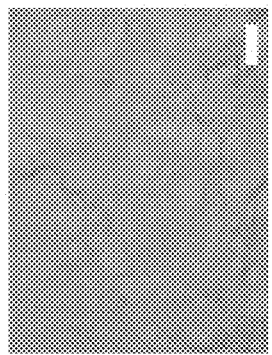
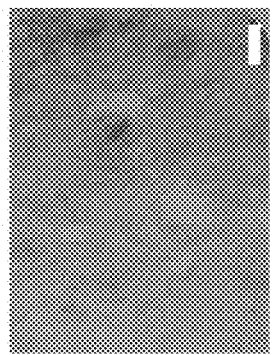
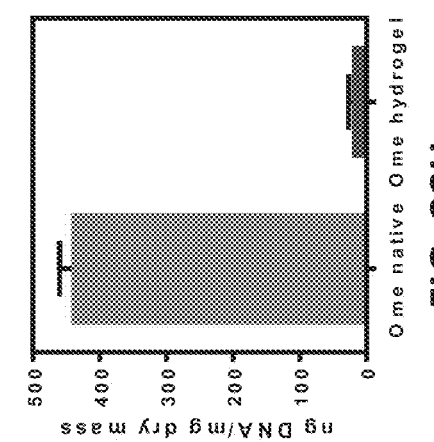
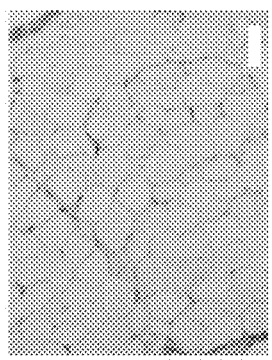
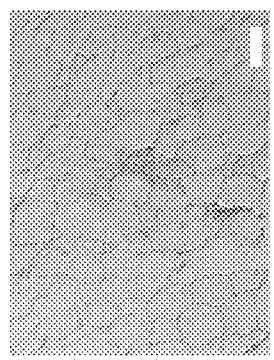
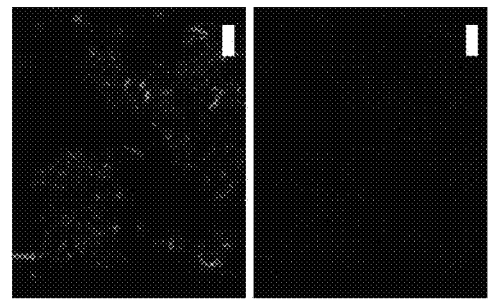

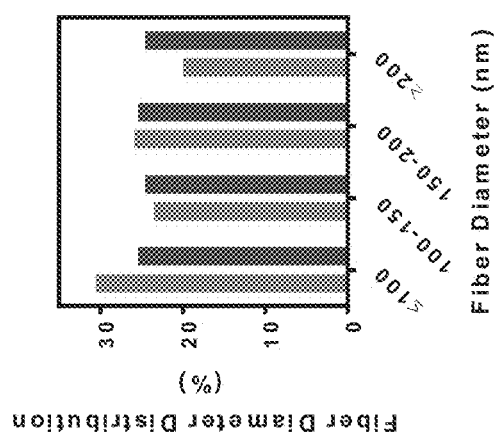
FIG. 29G
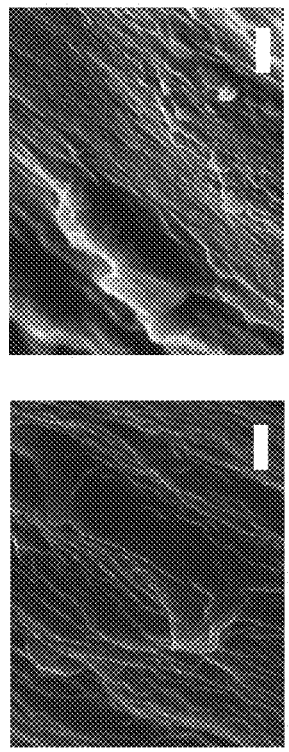
FIG. 29A
FIG. 29B
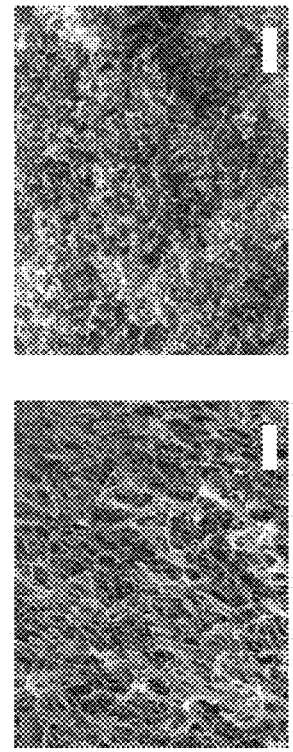
FIG. 29C
FIG. 29D
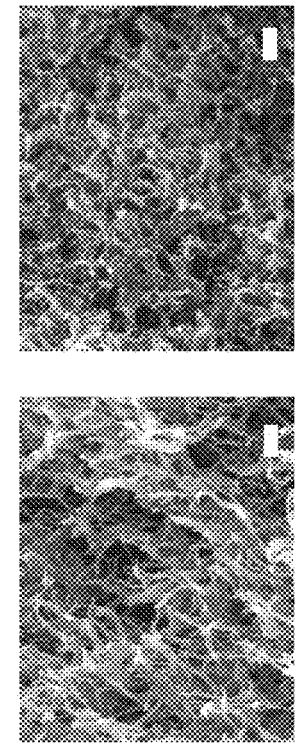
FIG. 29E
FIG. 29F

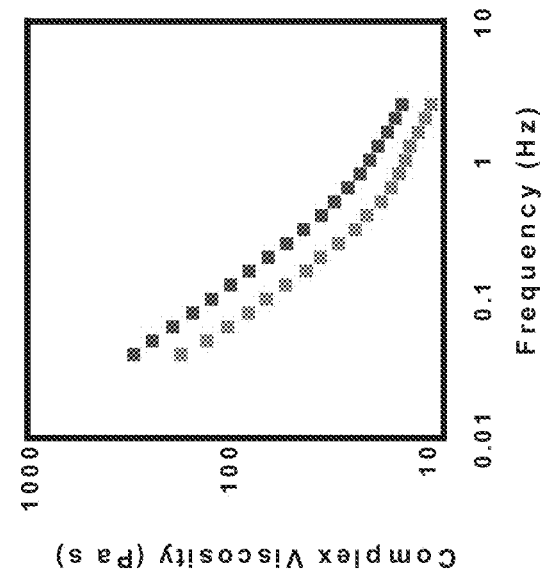
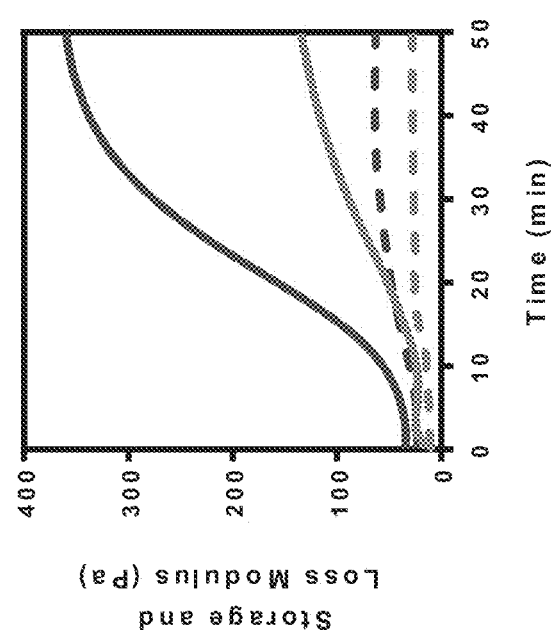
FIG. 31A
FIG. 31B

OMENTUM BASED SCAFFOLD AND DELIVERY SYSTEM

RELATED APPLICATIONS

This application is a continuation of U.S. patent application Ser. No. 15/702,834 filed on Sep. 13, 2017, which is a continuation of U.S. patent application Ser. No. 14/581,540 filed on Dec. 23, 2014, which is a Continuation-in-Part (CIP) of PCT Patent Application No. PCT/IL2014/050568 having International Filing Date of Jun. 24, 2014, which claims the benefit of priority under 35 USC 119(e) of U.S. Provisional Patent Application No. 61/838,428 filed on Jun. 24, 2013. The contents of all of the above applications are incorporated by reference as if fully set forth herein.

FIELD AND BACKGROUND OF THE INVENTION

The present invention, in some embodiments thereof, relates to a decellularized omentum matrix for tissue engineering and a gel comprising decellularized omentum.

The inability of the myocardium to heal itself after infarction, and the shortage of cardiac donors have motivated scientists to explore new technologies for heart regeneration. Cellular therapies, such as intracoronary cell injection, evolved to repopulate the scar tissue with contracting cells. However, two main drawbacks of this approach are the lack of control over cell accumulation site, and cell death before forming interactions with their surroundings. These shortfalls motivated the development of the cardiac tissue engineering concept, where 3-dimensional (3D) ECM-like scaffolds are fabricated from biomaterials, providing mechanical support to the assembling tissue.

During the past years various types of biomaterials have been used as scaffolds for cardiac cells accommodation, including synthetic (e.g. poly(lactic-co-glycolic acid), poly (glycerol sebacate)) and natural (e.g. collagen, alginate). Although significant improvement in the function of the infarcted heart was reported after implantation of engineered heart patches based on these biomaterial scaffolds, the full therapeutic potential of cardiac tissue engineering has not yet been met. One of the remaining challenges is the lack of proper vasculature, needed for efficient anastomosis with the host post transplantation. Another drawback is the lack of a truly supporting microenvironment, mimicking the natural conditions and fostering the assembly of a functional cardiac tissue.

In addition to mechanical support, the native ECM provides cells with a wealth of instructive cues for inducing functional tissue assembly. These include topographical signals provided by the intricate mesh of collagens and elastin fibers, adhesion proteins such as fibronectin and laminin, cytokines and growth factors. The latter may be stored by the glycosaminoglycans (GAGs) reservoirs, to be released in a controlled manner into the cell microenvironment, promoting essential physiological processes.

To supply many of these necessities to the growing cells, various tissues, such as heart valves, blood vessels, urinary bladders, heart muscles and others, were decellularized, and the remaining matrices were used as scaffolds for tissue engineering. The significance of naturally derived matrix intrinsic properties in successful cultivation of cardiac cells has led tissue engineers to develop efficient cell removal techniques from pig and rat hearts. The obtained scaffolds had internal fibrilar morphology, inherent vasculature ECM and proper mechanical properties. However, post transplantation in humans, xenogeneic matrices or even allogeneic biomaterials may provoke immunogenic response, impairing graft function. In addition, cells isolated from one source may be exposed to an advantageous microenvironment when grown on a matrix isolated from the same individual. In other words, the patient's own cells may grow better on an autologous matrix.

The omentum is a double sheet of peritoneum that extends from the greater curvature of the stomach overlying most abdominal organs. This tissue is highly vascularized and its fibrilar ECM is rich with collagens, adhesive proteins and GAGs. Since GAGs bind a variety of protein ligands, they can serve as growth factor depots and regulate a wide variety of biological activities, including developmental processes, angiogenesis, and cardioprotection. Due to its unique composition, the omentum also serves as a depot for adult stem cells with regenerative potential. These stem cells are based in the omentum matrix and upon signals migrate to heal injured organs. The overall regenerative capacity of the omentum, its ability to maintain progenitor cell viability, absorb large amounts of edema fluids and limit the formation of scar tissue at the site of injury, has long been demonstrated.

Dvir, T., et al. (*Proc Natl Acad Sci USA* 106, 14990-14995 (2009)) teaches the utilization of the omentum to induce cell migration and blood vessel network formation in an implanted synthetic scaffold. These vascularized scaffolds were then re-implanted on the infarcted heart and completely attenuated its deterioration.

International Patent Application No. WO2009/085547 teaches the generation of decellularized omentum scaffolds for tissue engineering. International Patent Application No. WO2009/085547 does not teach use of the decellularized omentum scaffolds for cardiac engineering.

U.S. Patent Publication No. 20050013870 teaches a scaffold comprising decellularized extracellular matrix of a number of body tissues including omentum. The body tissues have been conditioned to produce a biological material such as a growth factor.

Porzionato et al. (Italian Journal of Anatomy and Embryology. Volume 116, 2011 and Eur J Histochem. 2013 Jan. 24:57(1):e4. doi: 10.4081/ejh.2013.e4) teaches decellularized omentum.

Additional background art includes Gilbert et al., Biomaterials 27 (2006) 3675-3683 and Flynn et al., Biomaterials 31 (2010), 4715-4724.

U.S. Patent Publication No. 20090163990 teaches methods of decellularizing omentum.

Soluble forms of decellularized extracellular matrix are known in the art as described in Acta Biomaterialia, Volume 9, Issue 8. August 2013, Pages 7865-7873 and Singelyn et al., J Am Coll Cardiol. Feb. 21, 2012; 59(8): 751-763.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

SUMMARY OF THE INVENTION

According to one aspect, there is provided a composition of matter comprising decellularized omentum which comprises less than 50 ng DNA per mg dry omentum, having a mean fiber diameter of at least 1 μm, wherein the porosity of the composition is at least 50%.

According to one aspect, there is provided a method of decellularizing omentum comprising:
(a) exposing the omentum to a hypotonic solution;
(b) dehydrating the omentum following step (a);
(c) extracting fat from the dehydrated omentum using polar and non-polar extraction agents following step (b);
(d) rehydrating the dehydrated omentum following step (c); and
(e) extracting cells from the rehydrated omentum following step (d).

According to one aspect, there is provided a composition of matter comprising decellularized omentum generated according to the method described herein.

According to another aspect, there is provided a scaffold fabricated from the composition of matter described herein.

According to another aspect, there is provided a method of generating a cell-seeded scaffold comprising:
(a) providing the scaffold described herein; and
(b) seeding cells on the scaffold, thereby generating the cell-seeded scaffold.

According to another aspect, there is provided a composition of matter comprising a population of cells seeded on the scaffold described herein.

According to another aspect, there is provided an isolated composition of matter comprising vascularized cardiac cells seeded on a decellularized omentum scaffold, the vascularized cardiac cells being able to contract more than 20 times per minute.

According to another aspect, there is provided a hydrogel comprising solubilized, decellularized omentum.

According to another aspect, there is provided a precursor composition comprising solubilized decellularized omentum which is capable of forming a gel on heat activation.

According to another aspect, there is provided a method of treating a cardiac disease or disorder in a subject in need thereof comprising administering to the subject a therapeutically effective amount of the composition of matter described herein, the hydrogel described herein or the precursor composition described herein, thereby treating the cardiac disease or disorder.

According to another aspect, there is provided a method of generating a 3D structure comprising extruding the precursor composition described herein through an aperture thereby generating the 3D structure.

According to another aspect, there is provided a method of regenerating tissue in a subject in need thereof, comprising administering to the subject a therapeutically effective amount of the composition of matter described herein, the hydrogel described herein or the precursor composition described herein, thereby regenerating the tissue in a subject.

According to another aspect, there is provided a method of generating a precursor composition, which upon temperature activation is capable of forming a hydrogel, the method comprising:
(a) decellularizing omentum to generate decellurized omentum;
(b) lyophilizing the decellularized omentum to generate lyophilized omentum; and
(c) solubilizing the lyophilized omentum, thereby generating the composition of matter.

According to an embodiment, the composition of matter further comprises a biodegradable polymer.

According to an embodiment, the mean fiber diameter is between 1-2 μm.

According to another embodiment, the biodegradable polymer is selected from the group consisting of collagen, chitosan, chitin, gelatin, alginate, hyaluronic acid, Fibrin, Albumin, Chondroitin sulfate, Natural poly(amino acids), Elastin, Elastin-like peptides, Poly (α-esters), Polyglycolide. Poly(lactide-co-glycolide), Polycaprolactone, Polylactides, Polydioxanone, Poly(trimethylene carbonate), Polyurethanes, Poly(ester amide), Poly(ortho esters), Polyanhydrides, Poly(anhydride-co-imide). Cross-linked polyanhydrides, Pseudo poly(amino acid), Poly(alkyl cyanoacrylates), Polyphosphazenes, Polyphosphoester, synthetic poly (amino acids).

According to another embodiment, the composition of matter is devoid of lipids.

According to another embodiment, the composition of matter comprises less than 10% of the cells as compared to the amount of cells in the omentum prior to decellularization.

According to another embodiment, the composition of matter comprises less than 5% of the cells as compared to the amount of cells in the omentum prior to decellularization.

According to another embodiment, the method further comprises lyophilizing the omentum following step (e).

According to another embodiment, the extracting cells from the rehydrated omentum is effected using a protease.

According to another embodiment, the protease comprises trypsin.

According to another embodiment, the method further comprises mechanically rupturing cells of the omentum following step (a) and prior to step (b).

According to another embodiment, the non-polar extraction solvent is hexane.

According to another embodiment, the polar extraction solvent is acetone or isopropanol.

According to another embodiment, the polar extraction solvent is acetone and the non-polar extraction solvent is hexane.

According to another embodiment, the dehydrating is effected using a dehydrating agent selected from the group consisting of methanol, ethanol, isopropanol, propanol and combinations thereof.

According to another embodiment, the protease is contacted with the dehydrated omentum for at least one hour.

According to another embodiment, the cells comprise cardiac cells.

According to another embodiment, the cells further comprise endothelial cells and/or fibroblasts.

According to another embodiment, the endothelial cells and/or the fibroblasts do not originate from cardiac tissue.

According to another embodiment, the ratio of the cardiac cells:endothelial cells is greater than 60:40.

According to another embodiment, the cells comprise cardiac cells.

According to another embodiment, the cells comprise stem cells.

According to another embodiment, the composition of matter is devoid of feeder cells.

According to another embodiment, the cells further comprise endothelial cells.

According to another embodiment, the endothelial cells do not originate from cardiac tissue.

According to another embodiment, the ratio of the cardiac cells:endothelial cells is greater than 60:40.

According to another embodiment, the vascularized cardiac cells are able to contract more than 40 times per minute.

According to another embodiment, the amplitude of contraction of the vascularized cardiac cells is greater than 5 μm.

According to another embodiment, the decellularized omentum is devoid of lipids.

According to another embodiment, the hydrogel comprises less than 50 ng DNA per dry weight.

According to another embodiment, the hydrogel comprises greater than 1 μg sulfated GAG per dry weight.

According to another embodiment, the precursor composition further comprises cells.

According to another embodiment, the omentum is human omentum.

According to another embodiment, the hydrogel comprises collagen, laminin, elastin, fibronectin and glycosaminoglycans.

According to another embodiment, the omentum is decellularized according to the method described herein.

According to another embodiment, the omentum is autologous to the subject.

According to another embodiment, the omentum is non-autologous to the subject.

According to another embodiment, the solubilizing is effected using a protease enzyme.

According to another embodiment, the protease comprises pepsin.

According to another embodiment, the decellularizing omentum is effected using the method described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent applicatitin publication with color drawing(s) will he provided by the Office upon request and, payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-1D. Key players of the omentum. A. Collagen fibers by Masson's trichrome staining (blue) B. High GAG content throughout the tissue by Alciane blue staining (light blue). C. Smooth muscle actin staining of smooth muscle cells comprising blood vessels (brown). D. Co-staining of VEGF (pink) and the adhesion molecule laminin (green). Bar. A=100 μm, B=100 μm, C=100 μm, D=100 μm.

FIGS. 2A-2G. Decellularization process and cell removal. A. Fresh omentum prior to cell removal. Omentum during (B) and after complete decellularization (C). The matrix at the end of the process. Blood vessel infrastructure is pointed by black arrows. D. Higher magnification of the blood vessel infrastructure. E. F. Nuclei staining of fresh (E) and decellularized (F) omentum (Hoechst 33258; blue). G. Ethidium bromide DNA gel. Left to right: ladder, decellularized omentum (DC) and fresh omentum (Natural). No band associated with the decellularized omentum was found. Bar: E=200 μm, F=200 μm.

FIGS. 3A-3D. Decellularized matrix analyses. A. SEM image of native omentum. B. SEM image of decellularized omentum. C. HRSEM image of a blood vessel ECM preserved within the decellularized matrix. D. Fiber diameter distribution in the decellularized matrix. Bar: A=50 μm, B=20 μm, C=2 μm.

FIGS. 4A-4D. Analyses of matrix components. A. Collagen fibers in the decellularized matrix by Masson's trichrome staining (blue). B. Immunostaining of the decellularized matrix for collagen IV (green) and I (pink). C. Gags within the decellularized matrix by Alcian blue staining (light blue). D. Quantification of sulfated GAGs in native and decellularized omentum (DC) using Blyscan assay. Bar: A=100 μm. B=50 μm. D=50 μm.

Figure 5C:
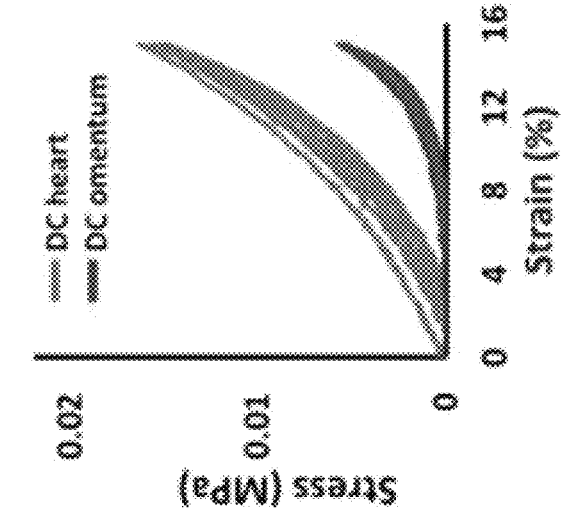
Figure 5B:
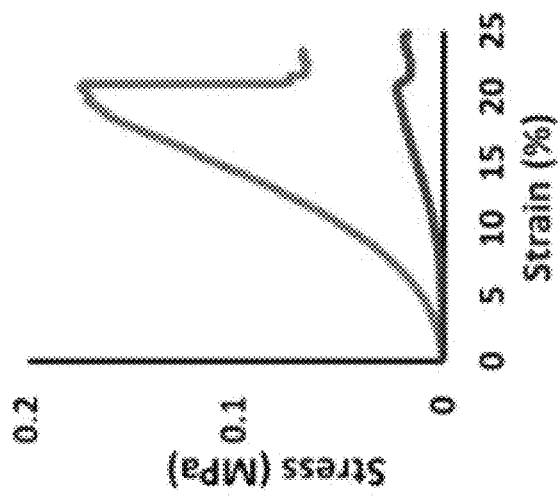
Figure 5A:
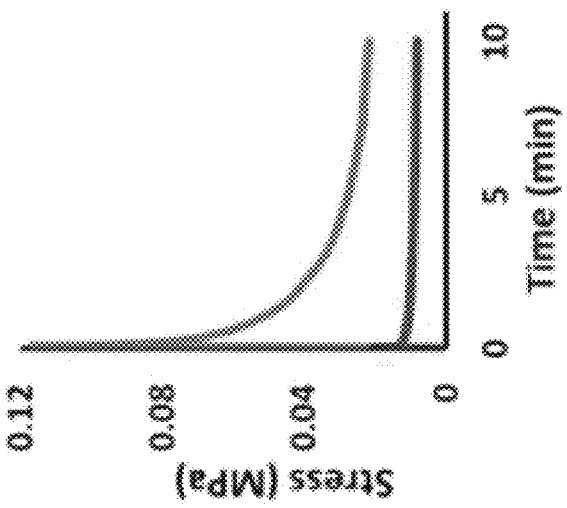

FIGS. 5A-5C. Mechanical properties of the decellularized omentum. A. Cyclic strain. B. Stress relaxation. C. Strain to break. Red—decellularized omentum (DC omentum), blue—decellularized heart (DC heart).

FIGS. 6A-6C. Cardiac cell seeding and viability. A. The omental scaffold prior (left) and after (right) cell seeding. Bar=5 mm. B. Live/dead assay on day 7. Green and red represent live and dead cells, respectively. C. XTT viability assay revealed maintenance throughout the cultivation period.

FIGS. 7A-7H. Cardiac tissue assembly and function. A. Cardiac cell assembly on omental matrix fibers as judged by troponin I (green) and collagen I (pink) staining on day 3. B. Troponin I staining of cardiac cells on day 7. C, D. Cardiac a sarcomeric actinin staining of cardiomyocytes within the omentum matrix (C) and decellularized heart matrix (D). E. High resolution SEM image of cardiac cell elongation on the matrix. F. ECM proteins secreted by the cultured cardiac cells decreasing pore size. G, H. Engineered tissue function on day 3. Engineered tissues within the omental matrix (Om), heart matrix (Heart), porcine small intestine submucosa scaffold (SIS), and alginate sponge (Alg). Bar: A=500 μm, B, C and D=20 μm, E=50 μm. F=1 μm.

FIGS. 8A-8F. Vascularization of the cardiac patch. A. B. HUVECs seeded on the matrix, stained for CD31 (pink) located on collagen IV (green) fibers. C. D. HUVECs co-seeded with cardiac cells on day 7, stained for CD31 (pink) and troponin I (green). E. Contraction rate of the vascularized matrix (day 7). F. Contraction amplitude of the vascularized matrix (day 7). The patches were engineered with varying percentages of endothelial cells (10, 25, 50%). Bar: A=100 μm, B=100 μm, C=100 μm. D=100 μm.

FIGS. 9A-9E. Mesenchymal and iP Stem cells growth on the omental scaffold. A. Rat MSCs staining for Sca-1 (green) on day 7. B. Rat MSCs staining for vimentin (pink) and Ki-67 proliferation marker (green) on day 7. Arrows indicate positively Ki67 cells. C. XTT viability assay of MSCs cultured on omental matrices. Values are fold increase over the initial cell number. D. iPS cells form embryoid bodies when cultured on the omental matrix. E. iPS cells staining on day 7 for SSEA-4 (pink), Nanog (green) and nuclei (blue). Bar: A=20 μm, B=20 μm, D=100 μm. E=100 μm.

FIGS. 10A-10E. Decellularized matrices. A: Macroscopic images of the native omentum and the decellularized matrices obtained by the different protocols. B: A centrifuged digestion solution of 20 mg of each scaffold and the native tissue. The lipids that remained in the scaffolds are visible as an upper phase. C-E: Mass loss after decellularization. (C) Percentages of the wet remaining masses of the tissues during and after the decellularization processes. (D) Percentages of the remaining dry mass after decellularization. (E) The relation between the wet mass and the dry mass of the native and decellularized tissues at the end of the process, as an indication of the water absorbance property of the scaffolds.

Figure 11A:
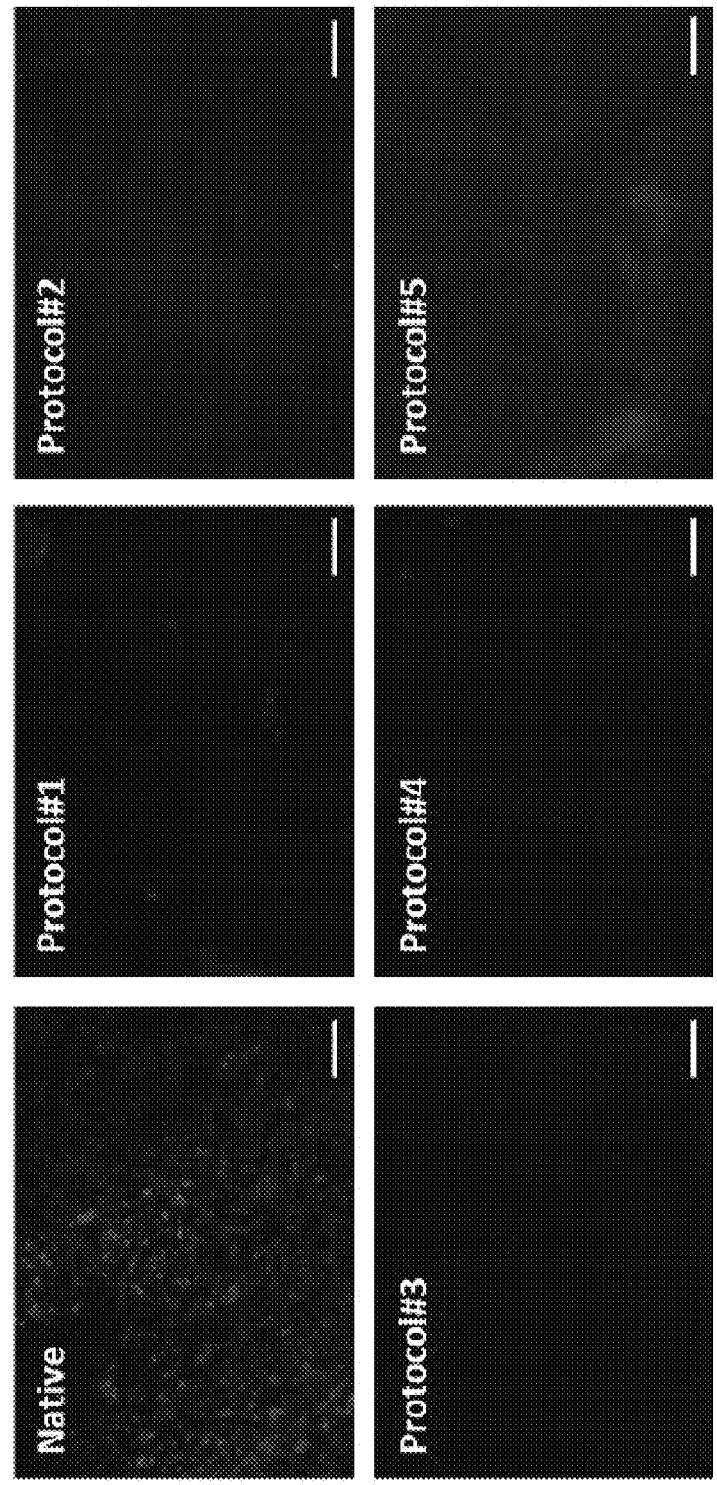
Figure 11B:
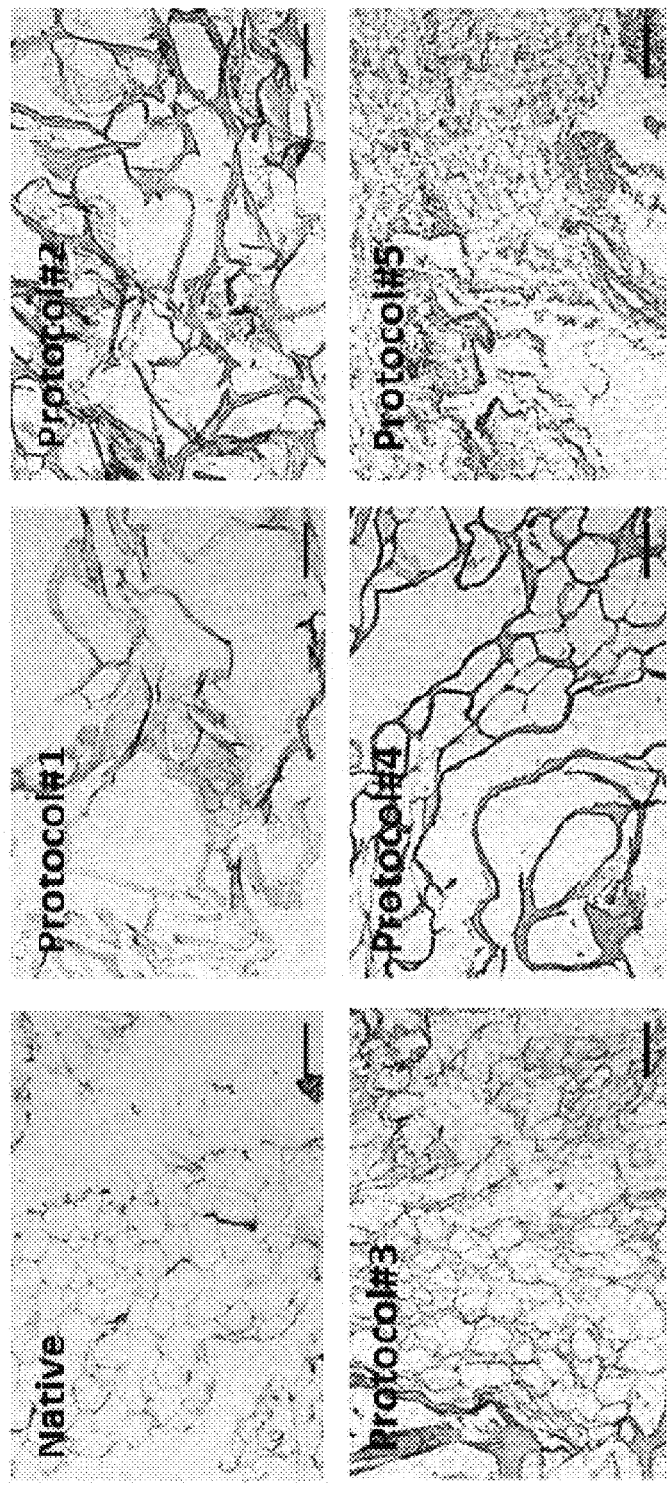

FIGS. 11A-11B. Nuclei elimination. A: Hoechst staining of the native tissue and the decellularized matrices obtained by the different methods for the demonstration of the remaining DNA (scale bar=100 µm). B: Hematoxylin and eosin stained sections of the native tissue and the decellularized matrices obtained by the different methods. Nuclei stained blue, cytoplasm and extracellular proteins stained pink (scale bar=100 µm).

Figure 12A:
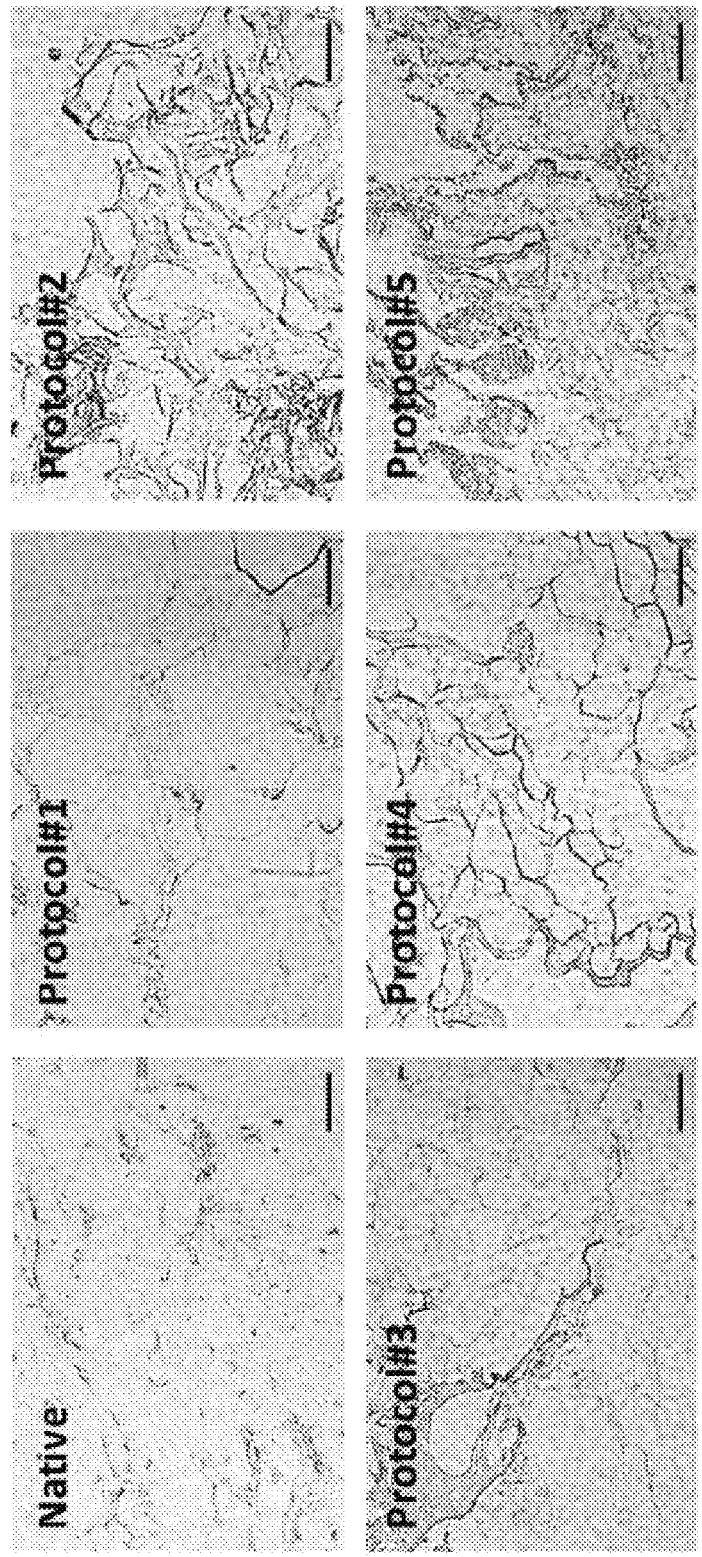
Figure 12B:
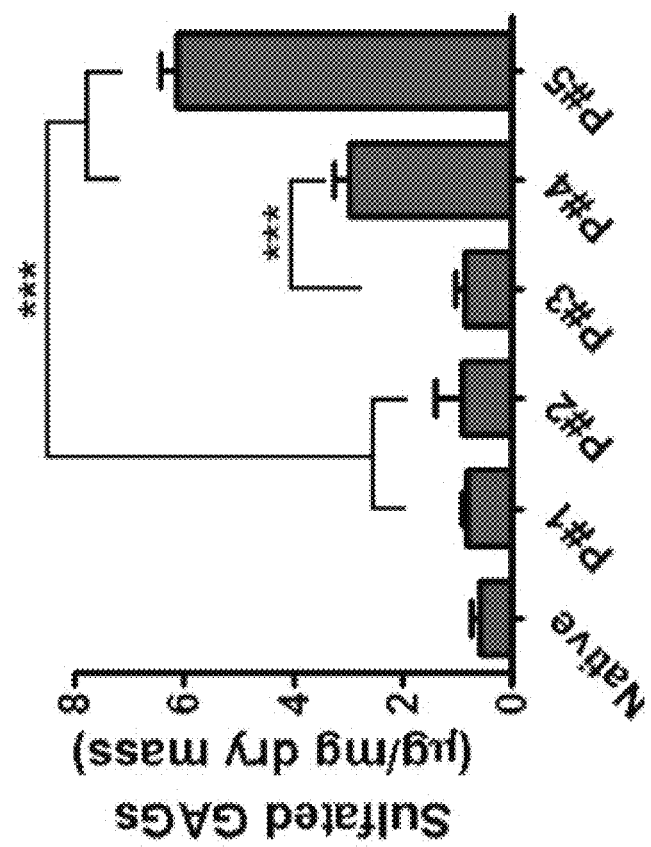

FIGS. 12A-12B. Glycosaminoglycan (GAG) content. A: Alcian blue and fast red stained sections of the native tissue and the decellularized matrices obtained by the different methods. GAGs stained light blue, nuclei stained red and proteins stained pale pink (scale bar=100 µm). B: Measurement of sulfated GAGs in the decellularized matrices obtained by the different methods. Results are presented as mean µg sulfated GAGs per mg dry mass±standard error.

Figure 13A:
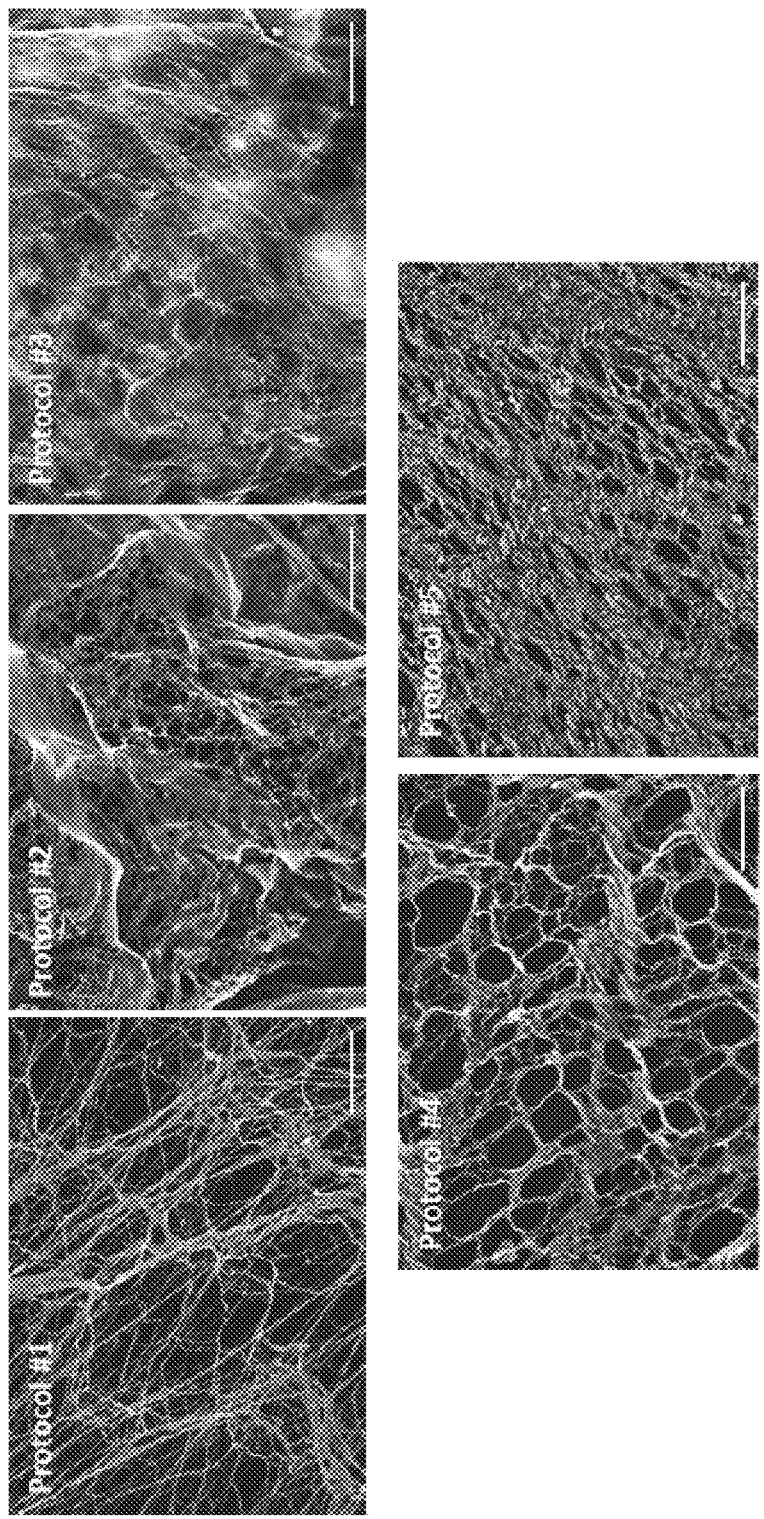
Figure 13C:
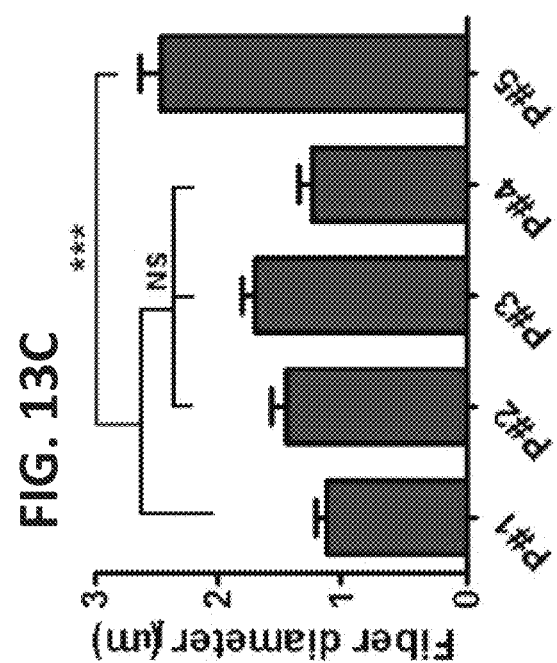
Figure 13B:
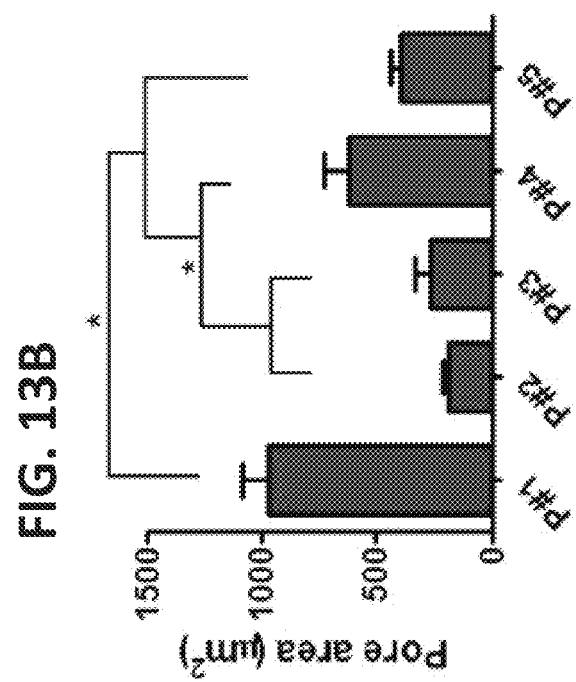

FIGS. 13A-13C. Morphology. A: Scanning electron microscope (SEM) images of the matrices obtained by the different methods (scale bar=100 µm). B-C: Measurements of the structural properties of the different matrices as observed in the SEM images: (I) Mean pore area in µm2±standard error (II) Mean fiber diameter in µm±standard error.

Figure 14:
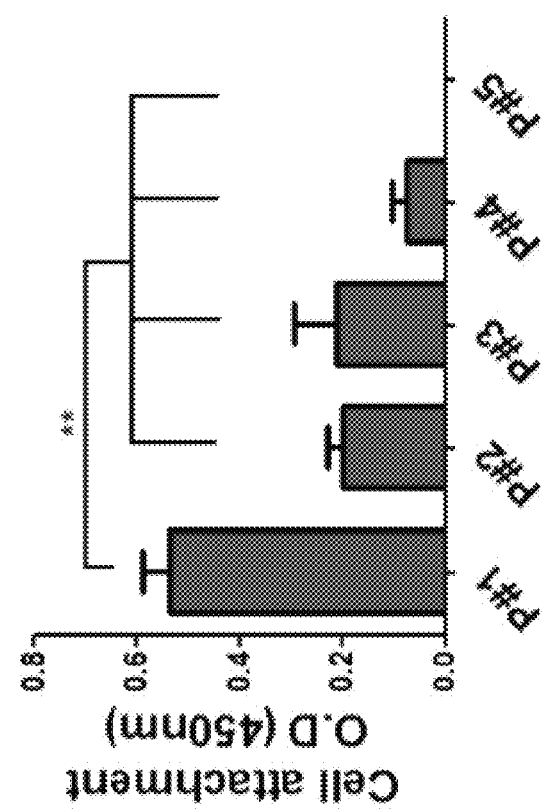

FIG. 14. Cell attachment to the scaffolds. NIH-3T3 cells were seeded on the scaffolds obtained by the different protocols. Cell attachment to the scaffolds was measured by the O.D of the XTT assay 3 hours after seeding. Results are represented as mean optical density (O.D) at 450 nm.

Figure 15A:
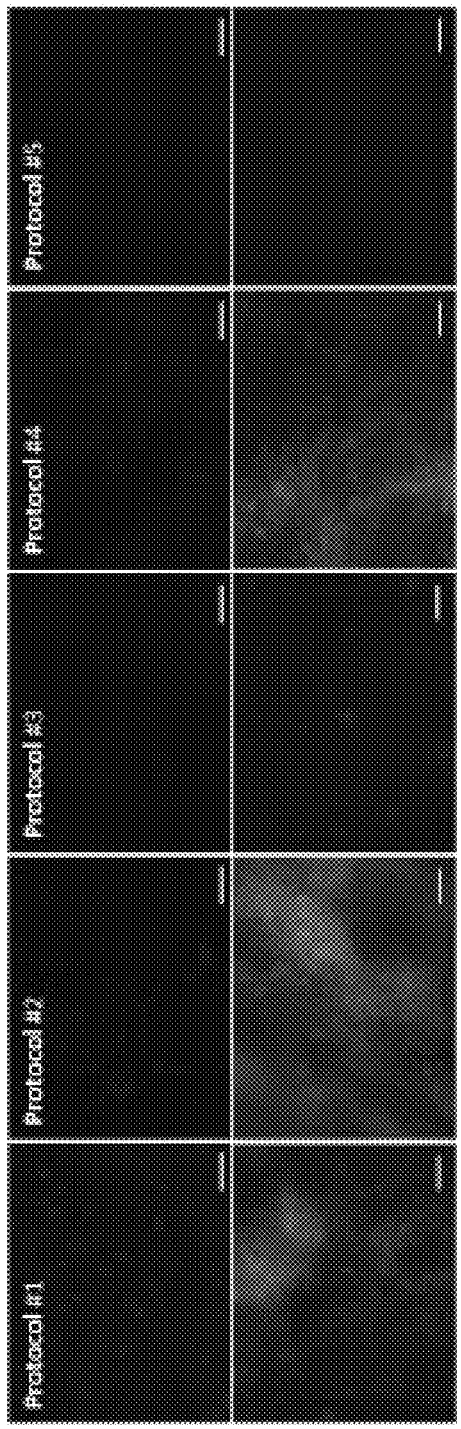
Figure 15B:
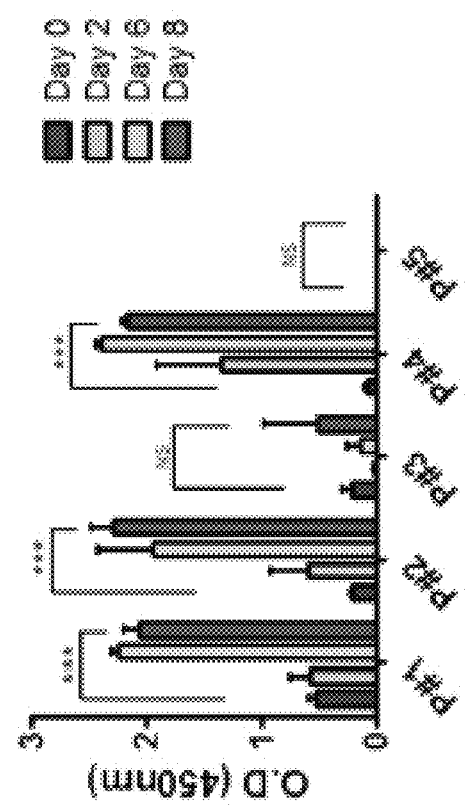

FIGS. 15A-15B. Cell proliferation on the scaffolds. A: Fluorescent images of EGFP expressing NIH-3T3 cells on the scaffolds obtained by the different protocols after 2 (top) or 8 (Bottom) days culture (scale bar=100 µm). B: XTT metabolic activity assay. Results are presented as mean optical density (O.D) at 450 nm.

Figures 16A, 16B:
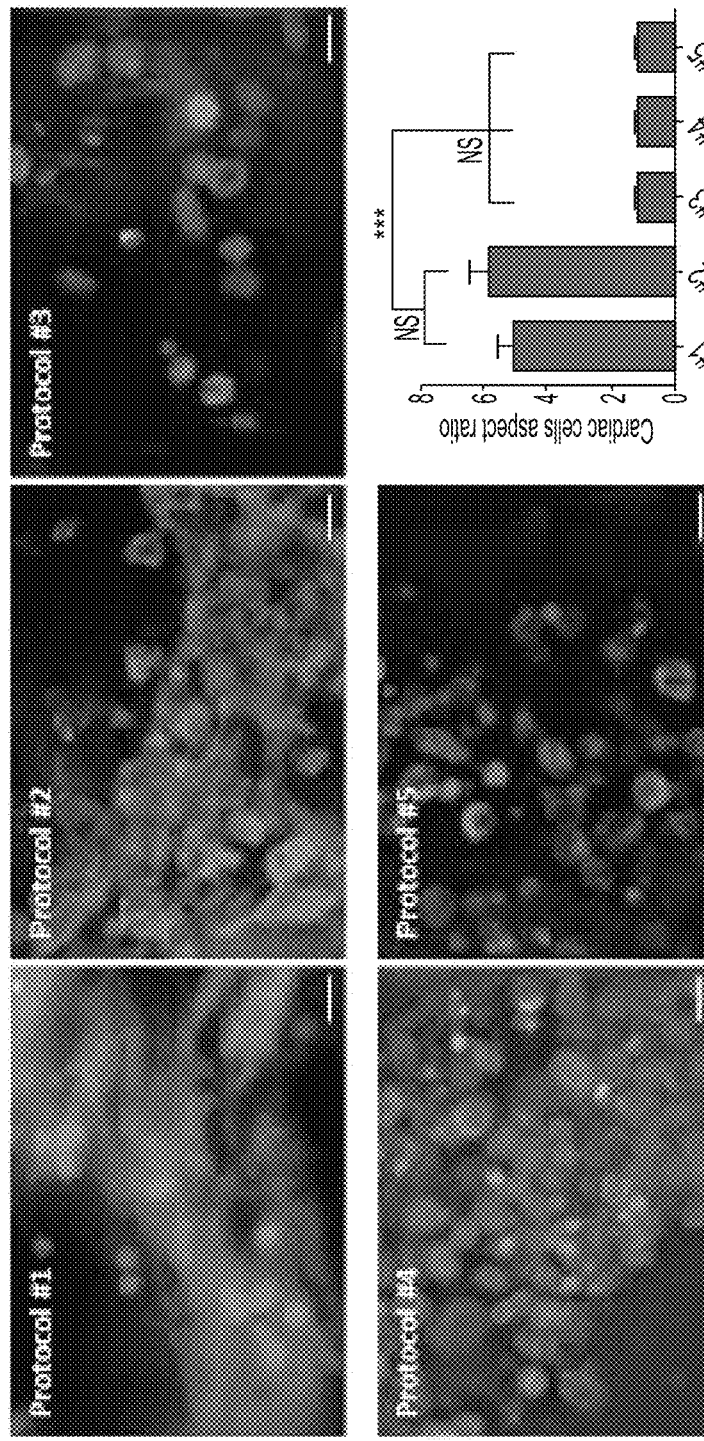

FIGS. 16A-16B. Cardiomyocyte organization within the scaffolds. A: Fluorescent images of stained cardiomyocytes on the scaffolds obtained by the different protocols. Nuclei stained blue and actinin stained pink. B: Cardiomyocyte aspect ratio.

FIGS. 17A-17D. Decellularization process. (A) Fresh omentum prior to cell removal. Omentum during (B) and after (C) complete decellularization. (D) Lyophilized milled omentum powder.

Figure 18B:
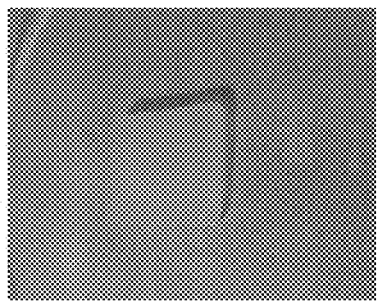
Figure 18A:
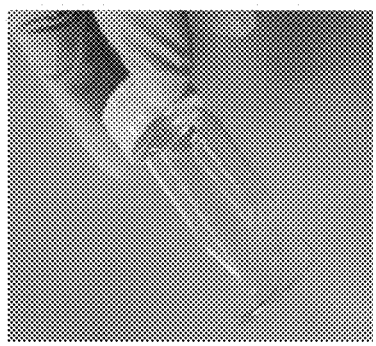
Figure 19:
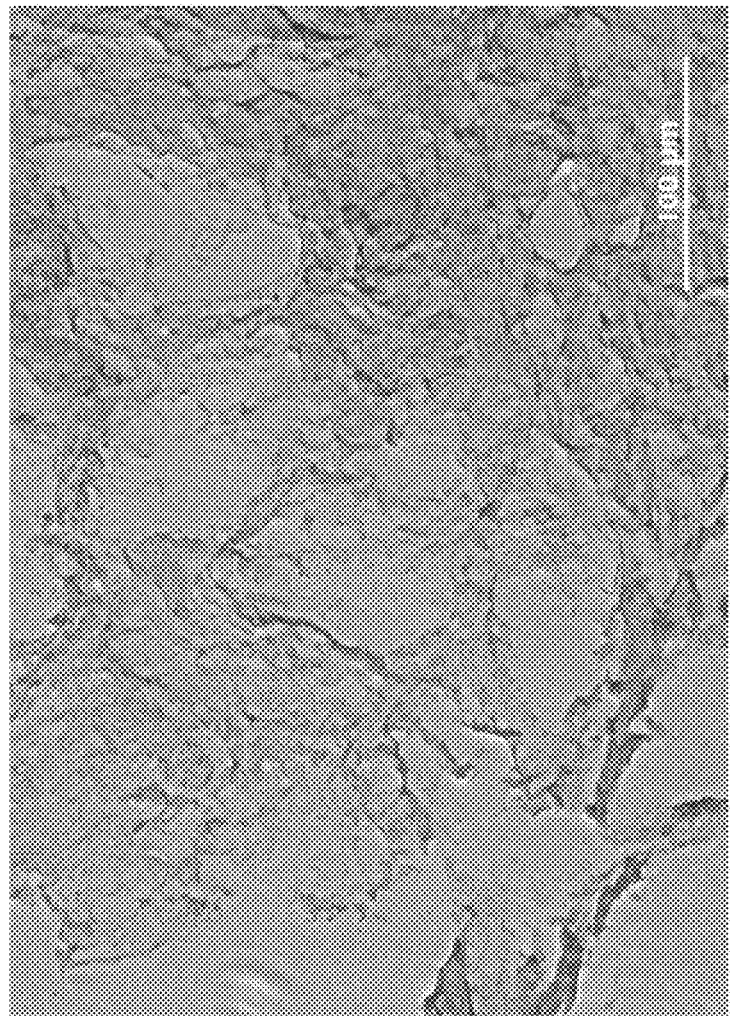

FIGS. 18A-18B. Gelation of omentum matrix hydrogel. (A) The solubilized from of omentum matrix (liquid at RT); (B) At physiological conditions, the omentum matrix forms a gel that maintains the mold shape;

FIG. 19. Histological analysis of omentum hydrogel. H&E stains confirms the absence of nuclei.

Figure 20:
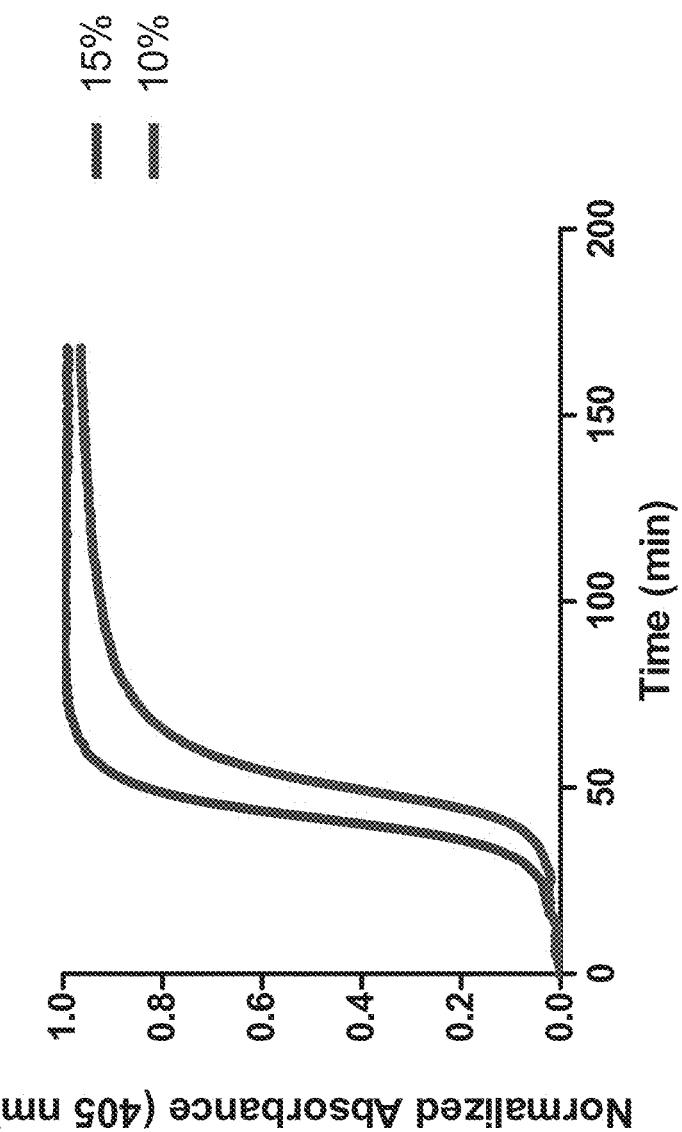

FIG. 20. Turbidimetric gelation kinetics. The 15% concentration hydrogel has reached plateau faster than the 10% hydrogel.

Figure 21:
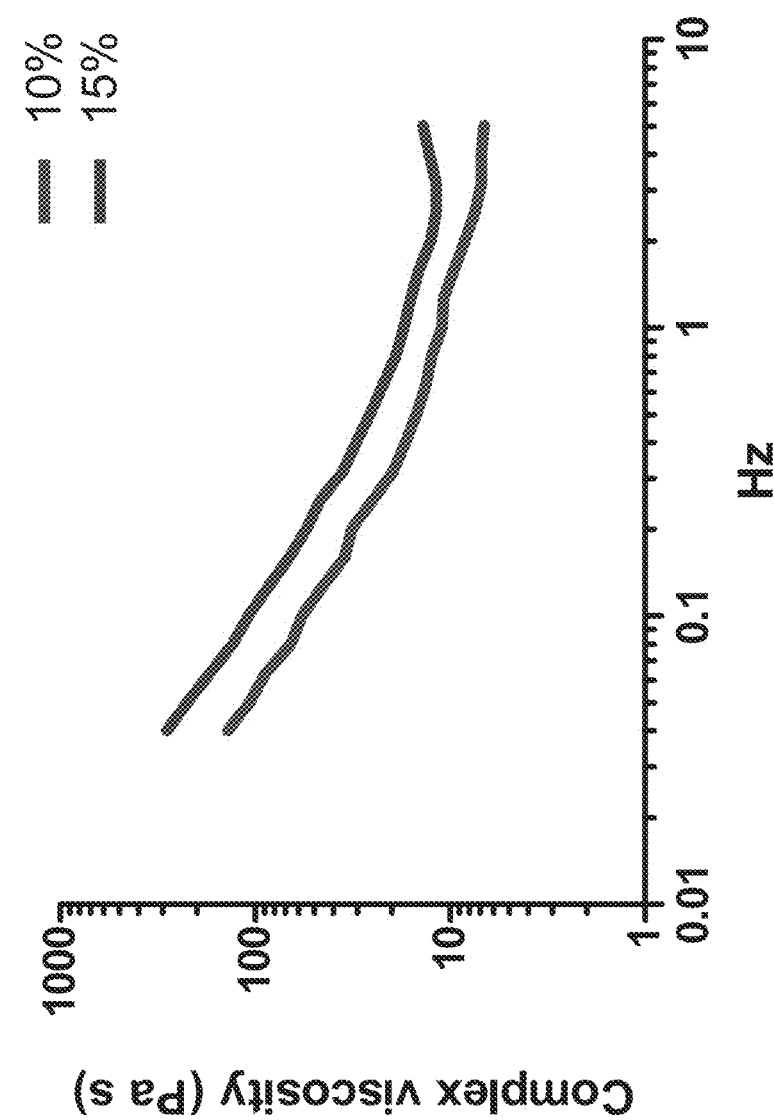

FIG. 21. Complex viscosity at various frequencies between 0.04 and 5 Hz.

FIGS. 22A-22E. Elastic (G') and loss modulus (G") change over time. (A) G' and G" over the time of gelation.
(B) G' at the beginning of gelation (C) G" at the beginning of gelation (D) G' at 95% of gelation time. (E) G" at 95% of gelation time.

Figure 23:
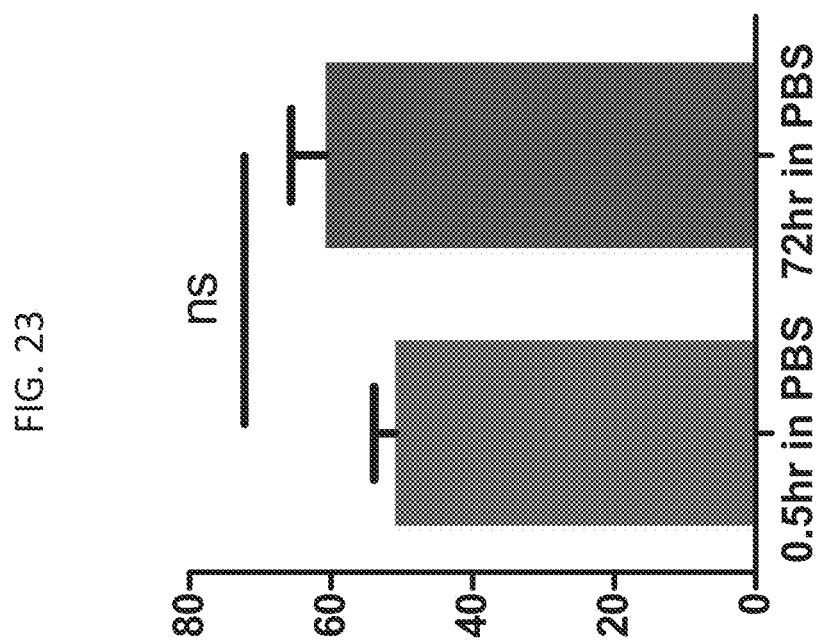

FIG. 23. Swelling ratio by mass for 15% hydrogels. No significant difference in swelling ratio was observed between swelling for 0.5 and for 72 hr.

Figure 24B:
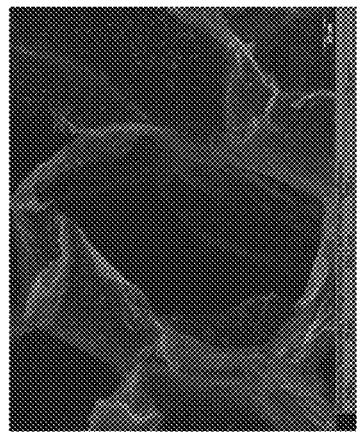
Figure 24A:
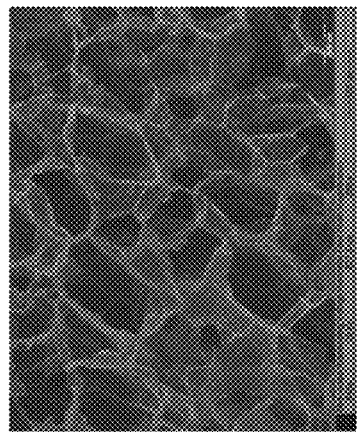

FIGS. 24A-24B. (A) SEM images of lyophilized hydrogel. (B) Same image, higher magnification.

Figure 25:
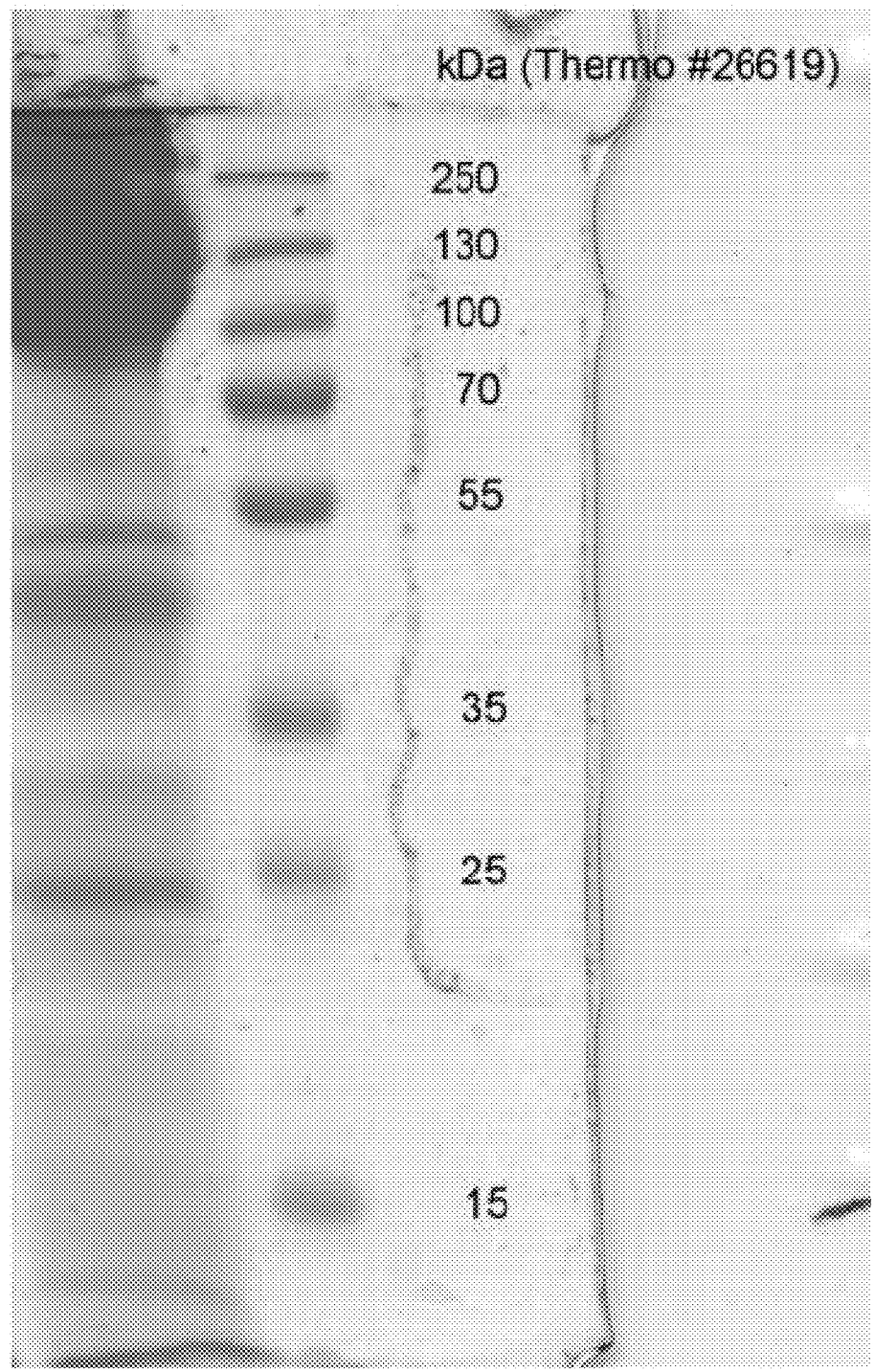

FIG. 25. SDS PAGE analysis of a hydrogel comprising decellularized omentum.

Figure 26:
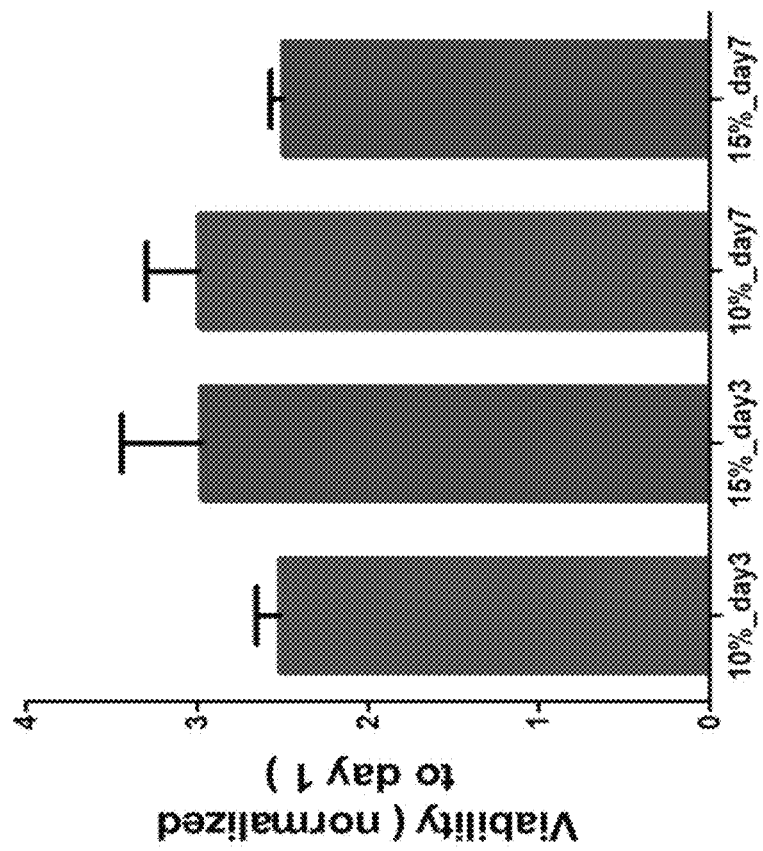

FIG. 26 is a bar graph illustrating that the hydrogel supports cells for at least seven days.

FIGS. 27A-27F. Decellularization and gelation process. (A) Fresh omentum prior to cell removal. Omentum during (B) and after (C) complete decellularization and lyophilization. (D) Milled dECM powder (E) Digested dECM remains liquid at RT. (F) Under physiological conditions, the digested dECM self-assembles into a structured hydrogel.

FIGS. 28A-28I. Biochemical analysis of native omentum and dECM-hydrogel. H&E and Masson's trichrome staining of native omentum (A, C) and dECM-hydrogel sections (B, D). In H&E staining, cell nuclei are stained in blue, extracellular fibers and cytoplasm are stained in pink. In Masson's trichrome staining, collagen fibers appear blue and nuclei appear black. (E) SDS-page of 1% (left) and 1.5% (right) dECM-hydrogel proteins. (F,G) DNA staining with Hoechst 33258 (blue) of native omentum (F) and dECM-hydrogel sections (G) revealed lack of nuclei remains in the hydrogel. Both images were taken under the same imaging conditions. (H) DNA content quantification further confirmed sufficient DNA removal. (I) Quantification of sulfated glycosaminoglycans content. Scale bar: A-D=100 µm; F,G=200 µm.

FIGS. 29A-29G. Scanning electron microscopy analysis of liquid dECM and dECM-hydrogels. 1% (A) and 1.5% (B) liquid dECM, prior to gelation. 1% (C. E) and 1.5% hydrogels (D. F) after gelation. (G) Analysis of fiber diameter (nm) in dECM-hydrogels. Scale bar: a-d=5 µm; e,f=2 µm. 1% hydrogel (pink); 1.5% hydrogel (blue).

FIGS. 30A-30D. Turbidity gelation kinetics of 1% and 1.5% dECM-hydrogels. Normalized absorbance (A), maximum slope at linear region (B), time at 50% of maximum absorbance T1/2 (C) and lag phase time Tlag (D). 1% hydrogel (pink); 1.5% hydrogel (blue).

FIGS. 31A-31B. Rheological properties of dECM-hydrogels. (A) Representative curves of storage (G'; solid line) and the loss modulus (G"; dashed line) during gelation at 37° C. (B) Complex viscosity of dECM-hydrogels vs. frequency plots. 1% hydrogel (pink); 1.5% hydrogel (blue).

FIGS. 32A-32F. Storage (G') and loss modulus (G") during gelation at T0, T0.5 and T0.95 during gelation at 37° C. 1% hydrogel (pink); 1.5% hydrogel (blue).

Figure 33B:
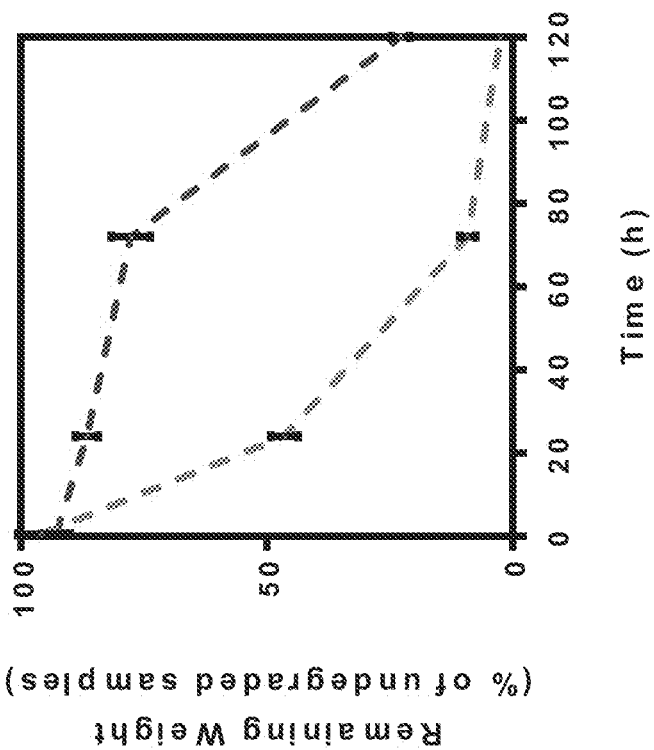
Figure 33A:
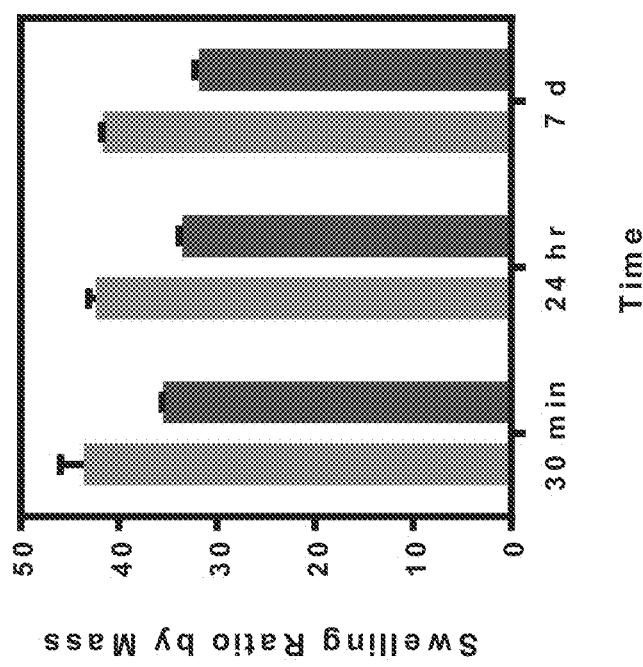

FIGS. 33A-33B. Swelling ratio by mass (A) and in-vitro degradation by collagenase of (B) of 1% and 1.5% dECM-hydrogels. 1% hydrogel (pink); 1.5% hydrogel (blue).

FIGS. 34A-34F. Hydrogel potential to accommodate cardiac cells. Cardiac cells seeded on and encapsulated in 1% (A,C) and 1.5% (B,D) dECM-hydrogels (nuclei stained blue; cardiac actinin stained pink). (E,F) Hydrogel area change due to cardiac cells degradation over time by 1 and 2 millions of cardiac cells (denoted by 1M; blue and 2M; pink) in 1% (E) and 1.5% (F) dECM-hydrogels. Scale bar: A-D=100 µm.

Figure 35C:
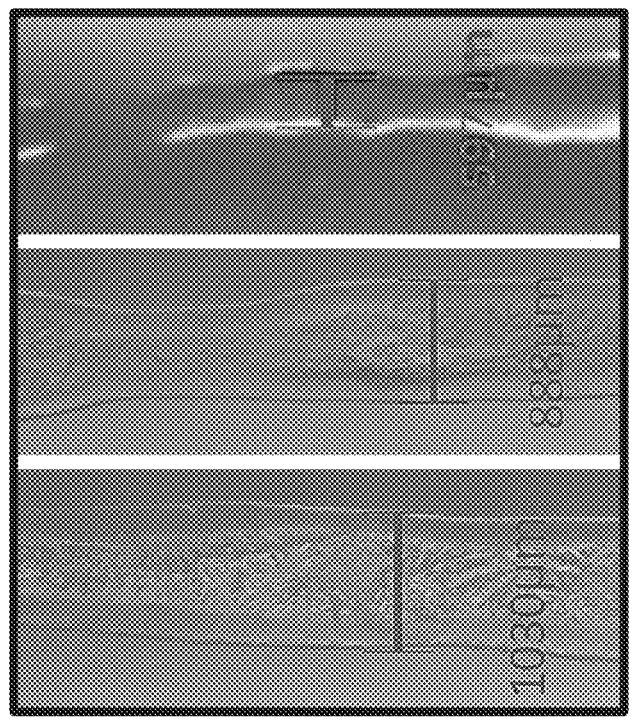
Figure 35B:
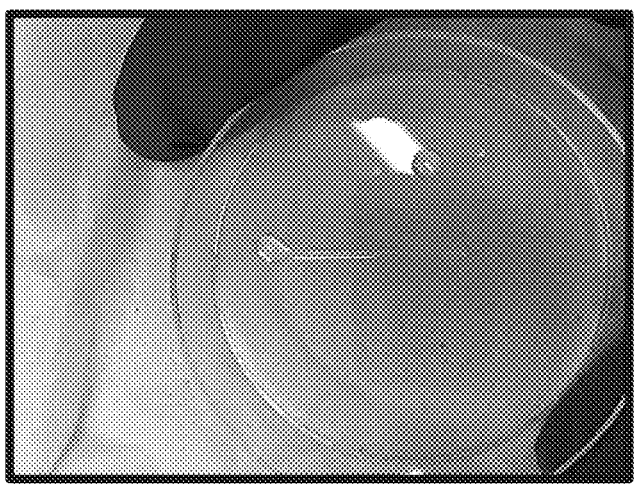
Figure 35A:
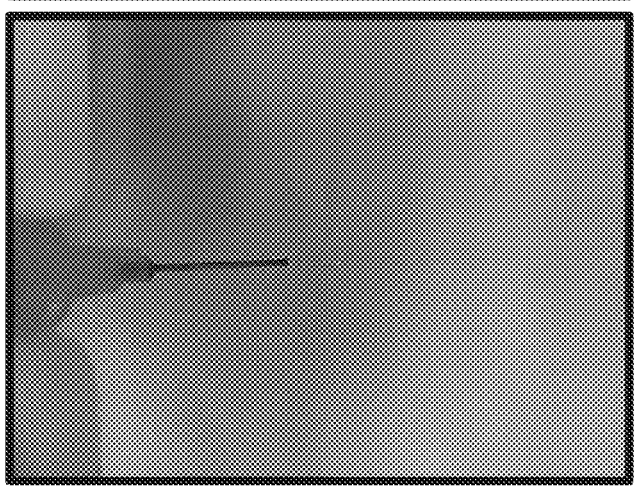

FIGS. 35A-35C. 3D printing of omentum-based hydrogel. A. The hydrogel is extruded through the syringe. B. Macroscopic view of the printed line. C. Various dimensions of the printed lines as observed and measured by a binocular and image analysis.

DESCRIPTION OF SPECIFIC EMBODIMENTS OF THE INVENTION

The present invention, in some embodiments thereof, relates to a decellularized omentum matrix and hydrogels derived therefrom for tissue engineering and more specifically for cardiac tissue engineering.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Omentum-based matrices fabricated by decellularization have the potential to serve as autologous scaffolds for tissue engineering. The present inventors compared five distinct protocols for omentum decellularization, utilizing chemical, physical and biological processes. They analyzed the efficiency of cell removal, scaffold macro and micro structure, biochemical composition, and the ability of seeded cells to attach and proliferate in the matrix. Moreover, they assessed the ability of the distinct scaffolds to promote the organization of cardiac tissue.

While comparing methods for decellularization, the present inventors found that only particular protocols were efficient at generating a decellularized omentum that could be used as a scaffold for propagation of cardiac cells.

In particular, it was found that the use of acetone for fat removal is not sufficient by itself (protocol 3) but a combination of a polar and non-polar extraction agent is required. Further, the present inventors found that a short exposure to hypertonic tension and mild detergents is not efficient for cell removal (protocol 5). Rather, more aggressive processing of the omentum (such as trypsin digestion and/or freezing and thawing) is required in order to obtain an a-cellular matrix that is compatible for cell culture and tissue assembly. The present inventors further deduced that the extent of extraction of lipids from the tissue correlates with the ability to induce cell attachment, maintain cell viability and promote proper assembly of cells into tissues.

Figure 7H:
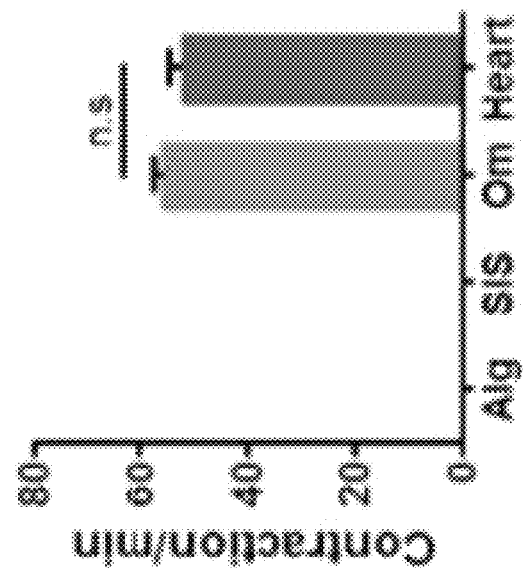

Whilst reducing the present invention to practice, the present inventors seeded cardiac cells on optimally decellularized omentum. They found that cardiac cells were located on collagen fibers of the decellularized tissue, suggesting cell-matrix interaction (FIG. 7A). The cells assembled into elongated and aligned cell bundles (FIG. 7B). Sarcomeric α-actinin (pink) staining revealed massive striation, indicating the contraction potential of the tissue (FIG. 7C). The cells within the omental matrix acquired morphology similar to that of cells cultivated on decellularized heart (FIG. 7D) and typical to native cardiac cells. The contraction amplitude and rate were of the same order as cardiac tissue engineered within decellularized heart matrix (FIGS. 7G and 7H), whereas cells seeded onto alginate scaffolds and SIS membranes, serving as control groups, were not able to induce construct contraction.

Figure 8A:
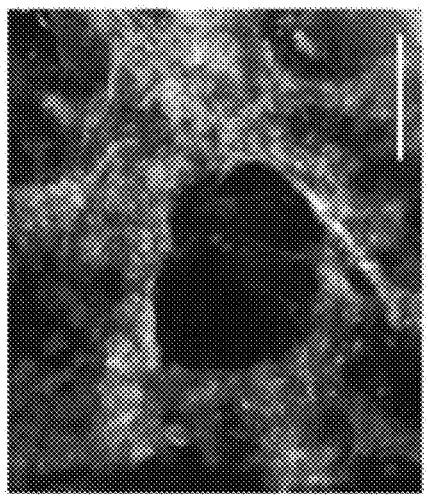
Figure 8B:
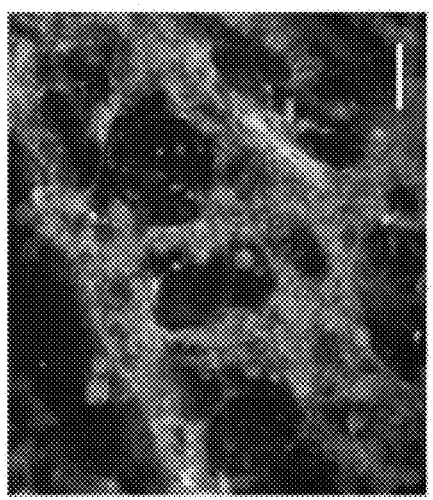
Figure 8C:
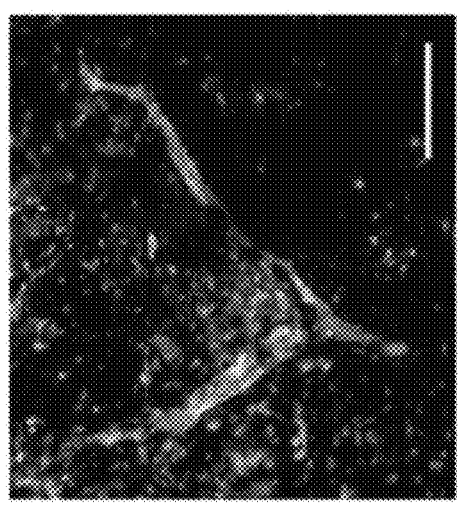
Figure 8D:
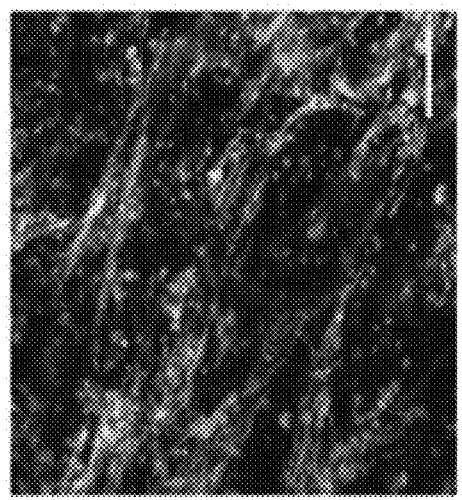

The present inventors next sought to assess the ability of the omentum-based matrix to support vascularized cardiac tissue. At particular endothelial:cardiac cell ratios, structures resembling blood vessel networks in-between cardiac cell bundles were observed (FIGS. 8C and 8D).

Whilst further reducing the present invention to practice, the present inventors found that solubilizing decellularized omentum led to the generation of a precursor composition that, upon heat activation, generated a hydrogel—as illustrated in FIGS. 18A-B and 27A-F. The hydrogel was shown to possess many of the natural components found in the omental ECM such as proteins and glycoaminoglycans. The hydrogel is in liquid form at room temperature and at body temperature (37° C.) forms a solid gel. It may be delivered into the body using injectable devices such as a needle and it can be molded into a variety of shapes during the gelation process.

Thus, according to one aspect of the present invention, there is provided a method of decellularizing omentum comprising:
 (a) exposing the omentum to a hypotonic solution;
 (b) dehydrating the omentum following step (a);
 (c) extracting fat from the dehydrated omentum using polar and non-polar extraction agents following step (b);
 (d) rehydrating the dehydrated omentum following step (c); and
 (e) extracting cells from the rehydrated omentum following step (d).

Omentum may be harvested from mammalian species, such as human, swine, bovine, goat and the like. Following tissue harvesting, the tissue can be either placed in 0.9% saline for immediate processing or stored for later use, preferably at a temperature of about −20° C. to about 80° C.

According to a preferred embodiment, the omentum is derived from a human.

A hypotonic solution is one in which the concentration of electrolyte is below that in cells. In this situation osmotic pressure leads to the migration of water into the cells, in an attempt to equalize the electrolyte concentration inside and outside the cell walls.

Preferably, the hypotonic buffer used by the method according to this aspect of the present invention is 10 mM Tris solution at a pH of about 8.0 and includes approximately 0.1% (w/v) EDTA (5 mM EDTA).

The hypotonic buffer may comprise additional agents such as serine protease inhibitors (e.g. phenylmethanesulfonylfluoride or phenylmethylsulfonyl fluoride, PMSF) and/or anionic detergents such as sodium dodecyl sulphate (SDS).

According to this aspect of the present invention, the tissue is subjected to the hypotonic buffer for a time period leading to the biological effect, i.e., cell swelling and rupture.

Following hypotonic shock, the tissue may optionally be subjected to cycles of freeze-thawing.

The freeze/thaw process preferably comprises freezing the tissue at, for example between −10 to −80° C., and typically at −80° C. for between 2-24 hours and subsequently defrosting the tissue for about 2, 3 or 4 hours until it reaches room temperature or above (for example at 37° C.). This process is carried out at least once and preferably twice or three times in the presence of a hypotonic buffer.

Dehydration involves treating the omentum with one or more dehydration solvents, such one or more treatments of the omentum with a dehydration solvent(s) and/or such solvent(s) in solution with water. The one or more treatments may be sequential steps in the method performed with solutions having different ratios of dehydration solvent(s) to water, such as having gradually reduced amounts of water in the solution for each successive treatment and the final treatment may involve the use of pure solvent, i.e., solvent not in solution with water.

Low molecular weight organic solvents may be used for the dehydration solvent. In an embodiment, the dehydration solvent is one or more alcohols, such as those selected from the group consisting of methanol, ethanol, isopropanol, propanol and combinations thereof.

According to a particular embodiment, the omentum is dehydrated by rinsing once with 70% ethanol (for example for 10-60 minutes) and two to three times in 100% ethanol for 10-60 minutes each.

After dehydration, the fat may be extracted from the omentum using at least one polar solvent and one non-polar solvent, which may occur in one or more extraction steps.

Examples of non-polar solvents are non-polar organic solvents such as hexane, xylene, benzene, toluene, ethyl acetate and combinations thereof. Polar solvents useful for the extraction solvent include acetone, dioxane, acetonithle and combinations thereof. In an embodiment, the extraction solvent is selected from acetone, hexane, xylene and combinations thereof. Nonpolar solvents, include for example hexane, xylene and combinations thereof.

Fat extraction may be conducted in fat extraction steps by contacting the dehydrated omentum with the extraction solvents for varying periods of time.

Preferably, the polar lipids of the tissue are extracted by washing in the polar extraction agent (e.g. 100% acetone) between 10 minutes to 60 minutes. This may be repeated a number of times (e.g. three times). Then, the nonpolar lipids may be extracted by incubating in a mixture of nonpolar:polar agents (e.g. 60/40 (v/v) hexane:acetone solution (with 3 changes) or 60/40 (v/v) hexane:isopropanol solution (with 3 changes)) for about 24 hours.

After the fat extraction, the defatted omentum is optionally re-hydrated. The defatted omentum maybe re-hydrated by contacting the defatted omentum with a re-hydration solvent, such as alcohol or a solution of alcohol in water, such as an alcohol solution having from about 60% to about 70% alcohol. Low molecular weight alcohols, such as methanol, ethanol, isopropanol, propanol and combinations thereof may be used.

The defatted omentum is then decellularized. Any decellularization process known to one skilled in the art may be applied to decellularize the defatted omentum. In an embodiment, the defatted omentum may be decellularized by solubilization of the nuclear and cytoplasmic components. For example, the defatted omentum may be immersed in a decellularization buffer, such as one having non-ionic detergent and metal salt dissolved in acid for a period of time, typically at least about 30 minutes. Non-ionic detergents useful in the invention include polysorbates, such as TWEEN 80, ethoxylated alcohols, such as TRITON® X-100, and polyethanols, such as HP 40 and IGEPAL CA-630 and combinations thereof. Metal salts that may be used include magnesium chloride, phosphate, acetate and citrate, and combinations thereof and these metal salts are typically dissolved in Tris-HCL.

According to another embodiment, the defatted omentum may be decellularized by enzymatic proteolytic digestion which digests cellular components within the tissue yet preserves the ECM components (e.g., collagen and elastin) and thus results in a matrix which exhibits the mechanical and structural properties of the original tissue ECM. It will be appreciated that measures should be taken to preserve the ECM components while digesting the cellular components of the tissue. These measures are further described hereinbelow and include, for example, adjusting the concentration of the active ingredient (e.g., trypsin) within the digestion solution as well as the incubation time.

Proteolytic digestion according to this aspect of the present invention can be effected using a variety of proteolytic enzymes. Non-limiting examples of suitable proteolytic enzymes include trypsin and pancreatin which are available from various sources such as from Sigma (St Louis, MO, USA). According to one preferred embodiment of this aspect of the present invention, proteolytic digestion is effected using trypsin.

Digestion with trypsin is preferably effected at a trypsin concentration ranging from 0.01-0.25% (w/v), more preferably, 0.02-0.2% (w/v), more preferably, 0.05-0.1 (w/v), even more preferably, a trypsin concentration of about 0.05% (w/v). For example, a trypsin solution containing 0.05% trypsin (w/v; Sigma), 0.02% EDTA (w/v) and antibiotics (Penicillin/Streptomycin 250 units/ml), pH=7.2] may be used to efficiently digest all cellular components of the tissue.

Preferably, while in the digestion solution, the tissue segments are slowly agitated (e.g., at about 150 rpm) to enable complete penetration of the digestion solution to all cells of the tissue.

It should be noted that the concentration of the digestion solution and the incubation time therein depend on the size of tissue segments utilized and those of skilled in the art are capable of adjusting the conditions according to the desired size and type of tissue.

Preferably, the tissue segments are digested for at least 1 hour and may be effected for up to 24 hours.

Following decellularization, the omentum may optionally be defatted again (e.g. using a combination of polar and non-polar solvents).

The method according to this aspect of the present invention optionally and preferably includes an additional step of removing nucleic acids (as well as residual nucleic acids) from the tissue to thereby obtain a nucleic acid-free tissue. As used herein the phrase "nucleic acid-free tissue" refers to a tissue being more than 99% free of any nucleic acid or fragments thereof as determined using conventional methods (e.g., spectrophotometry, electrophoresis). Such a step utilizes a DNase solution (and optionally also an RNase solution). Suitable nucleases include DNase and/or RNase [Sigma, Bet Haemek Israel, 20 µg/ml in Hank balance salt solution (HBSS)] or combinations of both—e.g. benzonase.

Next, the cellular components are typically removed from the tissue. Removal of the digested components from the tissue can be effected using various wash solutions, such as detergent solutions (e.g., ionic and non ionic detergents such as SDS Triton X-100, Tween-20, Tween-80) which can be obtained from e.g., Sigma (St Louis, MO, USA) or Biolab (Atarot, Israel, Merck Germany).

Preferably, the detergent solution used by the method according to this aspect of the present invention includes TRITON-X-100 (available from Merck). For efficient removal of all digested cellular components, TRITON-X-100 is provided at a concentration range of 0.05-2.5% (v/v), more preferably, at 0.05-2% (v/v), more preferably at 0.1-2% (v/v), even more preferably at a concentration of 1% (v/v).

Optionally, the detergent solution includes also ammonium hydroxide, which together with the TRITON-X-100, assists in breaking and dissolving cell nuclei, skeletal proteins, and membranes.

Preferably, ammonium hydroxide is provided at a concentration of 0.05-1.5% (v/v), more preferably, at a concentration of 0.05-1% (v/v), even more preferably, at a concentration of 0.1-1% (v/v) (e.g., 0.1%).

The concentrations of TRITON-X-100 and ammonium hydroxide in the detergent solution may vary, depending on the type and size of tissue being treated and those of skills in the art are capable of adjusting such concentration according to the tissue used.

Incubation of the tissue (or tissue segments) with the detergent solution can last from a few minutes to hours to even several days, depending on the type and size of tissue and the concentration of the detergent solution used and those of skills in the art are capable of adjusting such incubation periods. Preferably, incubation with the detergent solution is effected for at least 1 hour. According to one embodiment, 1-4 cycles of incubation with the detergent solution are performed until no foam is observed.

The above described detergent solution is preferably removed by subjecting the matrix to several washes in water or saline (e.g., at least 3 washes), until there is no evidence of detergent solution in the matrix.

Optionally, the decellularized ECM is then sterilized. Sterilization of the decellularized ECM may be effected using methods known in the art. In an embodiment, the decellularized omentum is contacted with a disinfection solution for a sufficiently effective period of time to disinfect the decellularized omentum, such as at least about 0.5 hour, typically about 1 hour to about 12 hours. The decellularized omentum may be fully submerged in the disinfection solution. The disinfection solution may comprise alcohol, or an alcohol in water solution, and may also include acid. The disinfection solution may include one or more of the following ethanol, methanol, isopropanol, propanol, hydrogen peroxide, peracetic acid and combinations thereof. In an embodiment, the disinfection solution has ethanol, such as 70% ethanol solution. Optionally, the decellularized omentum can be washed one or more times with ultrapure water.

Following washing and optional sterilization, the decellularized tissue may then be dehydrated for example by lyophilization.

The present inventors have shown that decellularizing omentum according to the methods described herein result in the generation of decellularized omentum which comprises less than 50 ng DNA per mg dry omentum, having a mean fiber diameter of about 1-2 μm, wherein the porosity of the composition is at least 50%.

As used herein the phrase "decellularized omentum" refers to the extracellular matrix which supports omentum tissue organization which has undergone a decellularization process (i.e., a removal of all cells from the tissue) and is thus devoid of cellular components.

The decellularized omentum obtained according to the presently described methods comprises less than 20% of the cells as compared to the amount of cells in the omentum prior to decellularization, more preferably less than 15% of the cells as compared to the amount of cells in the omentum prior to decellularization, more preferably less than 10% of the cells as compared to the amount of cells in the omentum prior to decellularization, more preferably less than 5% of the cells as compared to the amount of cells in the omentum prior to decellularization, more preferably less than 2% of the cells as compared to the amount of cells in the omentum prior to decellularization.

The phrase "devoid of cellular components" as used herein refers to being more than 90%, 91%, 92%, 93%, 94%, 95%, 96%, 97%, 98%, 99%, (e.g., 100%) devoid of the cellular components present in the natural (e.g., native) omentum. As used herein, the phrase "cellular components" refers to cell membrane components or intracellular components which make up the cell. Examples of cell components include cell structures (e.g., organelles) or molecules comprised in same. Examples of such include, but are not limited to, cell nuclei, nucleic acids, residual nucleic acids (e.g., fragmented nucleic acid sequences), cell membranes and/or residual cell membranes (e.g., fragmented membranes) which are present in cells of the tissue. It will be appreciated that due to the removal of all cellular components from the tissue, such a decellularized matrix cannot induce an immunological response when implanted in a subject.

The phrase "extracellular matrix (ECM)" as used herein, refers to a complex network of materials produced and secreted by the cells of the tissue into the surrounding extracellular space and/or medium and which typically together with the cells of the tissue impart the tissue its mechanical and structural properties. Generally, the ECM includes fibrous elements (particularly collagen, elastin, or reticulin), cell adhesion polypeptides (e.g., fibronectin, laminin and adhesive glycoproteins), and space-filling molecules [usually glycosaminoglycans (GAG), proteoglycans].

Typically, the decellularized omentum according to this aspect of the present invention comprises less than 60 ng DNA per mg dry omentum, more preferably less than 55 ng DNA per mg dry omentum, more preferably less than 50 ng DNA per mg dry omentum, more preferably less than 45 ng DNA and even more preferably less than 40 ng DNA per mg dry omentum.

As mentioned, the mean fiber diameter of the decellularized omentum is typically between about 1-2 μm.

As used herein the term "porosity" refers to the three-dimensional measurement of empty space or void volume per total volume.

Typically the porosity of the composition is greater than 30%, more preferably greater than 40%, more preferably greater than 45% and even more preferably greater than 50%.

The average pore area of the composition is typically greater than a pore area of greater than 200 μm$^2$, 300 μm$^2$, 400 μm$^2$, 500 μm$^2$, 600 μm$^2$ or even 700 μm$^2$.

By decellularizing the omentum using the methods described herein, the present inventors have obtained a composition of matter which is essentially devoid of lipids. The present inventors have found that the extent of extraction of lipids from the tissue correlates with the ability to induce cell attachment, maintain cell viability and promote proper assembly of cells into tissues. Thus, by decellularizing the omentum according to the presently disclosed methods, the present inventors have obtained a material which is useful as a cell scaffold for tissue construction.

The phrase "devoid of lipids" as used herein refers to a composition comprising less than 10%, 9%, 8%, 7%, 6%, 5%, 4%, 3%, 2%, 1% of the lipids present in the natural (e.g., native) omentum.

As mentioned, the decellularized omentum of this aspect of the present invention may be applied in tissue engineering and regeneration of internal organs, such as heart, kidney, liver, spleen and bladder. The decellularized omentum can also be used for repair and regeneration of skeletal tissues, such as bone, cartilage and tendon. Other uses for the decellularized omentum include soft tissue reinforcement and repair in combination with biocompatible meshes, such as dural grafting, hernia repair, and pelvic floor repair, nerve regeneration, such a tubular structure for peripheral nerve regeneration; tissue augmentation; delivery of cells and bioactives; chronic wound repair; and bone repair. These uses and applications of the decellularized omentum are illustrative of several potential uses and should not be construed as limiting the types of uses and applications for the decellularized omentum prepared by the methods and processes described herein.

The decellularized omentum can be combined with synthetic constructs to make reinforced constructs. For example, the decellularized omentum matrix can be used as a scaffold structure for implantation in a mammalian body, such as scaffold for tissue repair. It can be further enhanced by bioactives, cells, small molecules, minced tissue and cell lysates.

As used herein, the term "scaffold" refers to a 3 dimensional matrix upon which cells may be cultured (i.e., survive and preferably proliferate for a predetermined time period).

The scaffold of this aspect of the present invention may be composed solely of decellularized omentum or may comprise additional polymers.

Thus in other embodiments, the structural scaffold materials further comprises a "bioerodible" or "biodegradable" polymer or material.

The phrase "biodegradable polymer" as used herein, refers to a polymer or polymers which degrade in vivo, and wherein erosion of the polymer or polymers over time occurs concurrent with or subsequent to release of the islets. The terms "biodegradable" and "bioerodible" are equivalent and are used interchangeably herein.

Such bioerodible or biodegradable scaffold materials may be used to fabricate temporary structures. In exemplary embodiments, biodegradable or bioerodible structural scaffold materials may be biocompatible. Examples of biocompatible biodegradable polymers which are useful as scaffold materials include, but are not limited to, polylactic acid, polyglycolic acid, polycaprolactone, and copolymers thereof, polyesters such as polyglycolides, polyanhydrides, polyacrylates, polyalkyl cyanoacrylates such as n-butyl cyanoacrylate and isopropyl cyanoacrylate, polyacrylamides, polyorthoesters, polyphosphazenes, polypeptides, polyurethanes, polystyrenes, polystyrene sulfonic acid, polystyrene carboxylic acid, polyalkylene oxides, alginates, agaroses, dextrins, dextrans, polyanhydrides, biopolymers such as collagens and elastin, alginates, chitosans, glycosaminoglycans, and mixtures of such polymers. In still other embodiments, a mixture of non-biodegradable and bioerodible and/or biodegradable scaffold materials may be used to form a biomimetic structure of which part is permanent and part is temporary.

Therapeutic compounds or agents that modify cellular activity can also be incorporated (e.g. attached to, coated on, embedded or impregnated) into the scaffold material. Campbell et al (US Patent Application No. 20030125410) which is incorporated by reference as if fully set forth by reference herein, discloses methods for fabrication of 3D scaffolds for stem cell growth, the scaffolds having preformed gradients of therapeutic compounds. The scaffold materials, according to Campbell et al, fall within the category of "bio-inks". Such "bio-inks" are suitable for use with the compositions and methods of the present invention.

Exemplary agents that may be incorporated into the scaffold of the present invention include, but are not limited to those that promote cell adhesion (e.g. fibronectin, integrins), cell colonization, cell proliferation, cell differentiation, cell extravasation and/or cell migration. Thus, for example, the agent may be an amino acid, a small molecule chemical, a peptide, a polypeptide, a protein, a DNA, a RNA, a lipid and/or a proteoglycan.

Proteins that may be incorporated into the scaffolds of the present invention include, but are not limited to extracellular matrix proteins, cell adhesion proteins, growth factors, cytokines, hormones, proteases and protease substrates. Thus, exemplary proteins include vascular endothelial-derived growth factor (VEGF), activin-A, retinoic acid, epidermal growth factor, bone morphogenetic protein, TGFβ, hepatocyte growth factor, platelet-derived growth factor, TGFα. IGF-I and II, hematopoetic growth factors, heparin binding growth factor, peptide growth factors, erythropoietin, interleukins, tumor necrosis factors, interferons, colony stimulating factors, basic and acidic fibroblast growth factors, nerve growth factor (NGF) or muscle morphogenic factor (MMP). The particular growth factor employed should be appropriate to the desired cell activity. The regulatory effects of a large family of growth factors are well known to those skilled in the art.

The present invention contemplates seeding any cell type on the scaffolds described herein.

The cells may be derived from any organism including for example mammalian cells, (e.g. human), plant cells, algae cells, fungal cells (e.g. yeast cells), prokaryotic cells (e.g. bacterial cells).

According to a particular embodiment the cells comprise stem cells—e.g. adult stem cells such as mesenchymal stem cells or pluripotent stem cells such as embryonic stem cells or induced pluripotent stem cells. The stem cells may be modified so as to undergo ex vivo differentiation.

According to a particular embodiment, the cells are preferably intact (i.e. whole), and preferably viable, although it will be appreciated that pre-treatment of cells, such as generation of cell extracts or non-intact cells are also contemplated by the present invention.

The cells may be fresh, frozen or preserved in any other way known in the art (e.g. cryopreserved).

The present inventors have found that scaffolds generated from decellularized omentum characterized as detailed herein, are particularly effective at supporting cardiac cells.

Thus, according to another embodiment, the cells which are seeded on the scaffold are cardiac cells (e.g. human cardiomyoctes).

As used herein, the term "cardiomyocytes" refers to fully or at least partially differentiated cardiomyocytes. Thus, cardiomyocytes may be derived from cardiac tissue or from stem cells (such as embryonic stem cells or adult stem cells, such as mesenchymal stem cells). Methods of differentiating stem cells along a cardiac lineage are well known in the art—[Muller-Ehmsen J. et al., Circulation. 2002; 105:1720-6; Zhang M, et al., J Mol Cell Cardiol. 2001; 33:907-21, Xu et al. Circ Res. 2002; 91:501-508, and U.S. Pat. Appl. No. 20050037489, the contents of which are incorporated by reference herein]. According to one embodiment the stem cells are derived from human stem cell lines, such as H9.2 (Amit. M. et al., 2000. Dev Biol. 227:271).

According to one embodiment the cardiomyocytes of the present invention are at least capable of spontaneous contraction. According to another embodiment, the cardiomyocytes of the present invention express at least one marker (more preferably at least two markers and even more preferably at least three markers) of early-immature cardiomyocytes (e.g. atrial natriuretic factor (ANF). Nkx2.5. MEF2C and α-skeletal actin). According to another embodiment, the cardiomyocytes of the present invention express at least one marker (more preferably at least two markers and even more preferably at least three markers) of fully differentiated cardiomyocytes (e.g. MLC-2V, α-MHC, α-cardiac actin and Troponin I).

Screening of partially differentiated cardiomyocytes may be performed by a method enabling detection of at least one characteristic associated with a cardiac phenotype, as described hereinbelow, for example via detection of cardiac specific mechanical contraction, detection of cardiac specific structures, detection of cardiac specific proteins, detection of cardiac specific RNAs, detection of cardiac specific electrical activity, and detection of cardiac specific changes in the intracellular concentration of a physiological ion.

Various techniques can be used to detect each of cardiac specific mechanical contraction, cardiac specific structures, cardiac specific proteins, cardiac specific RNAs, cardiac specific electrical activity, and cardiac specific changes in the intracellular concentration of a physiological ion. For example, detection of cardiac specific mechanical contraction may be effected visually using an optical microscope. Alternately, such detection can be effected and recorded using a microscope equipped with a suitable automated motion detection system. Detection of cardiac specific structures may be performed via light microscopy, fluorescence affinity labeling and fluorescence microscopy, or electron microscopy, depending on the type of structure whose detection is desired. Detection of cardiac specific proteins may be effected via fluorescence affinity labeling and fluorescence microscopy. Alternately, techniques such as Western immunoblotting or hybridization micro arrays ("protein chips") may be employed. Detection of cardiac specific RNAs is preferably effected using RT-PCR. Alternatively, other commonly used methods, such as hybridization microarray ("RNA chip") or Northern blotting, may be employed. RT-PCR can be used to detect cardiac specific RNAs. Detection of cardiac specific changes in the intracellular concentration of a physiological ion, such as calcium, is preferably effected using assays based on fluorescent ion binding dyes such as the fura-2 calcium binding dye (for example, refer to Brixius, K. et al., 1997. J Appl Physiol. 83:652). Such assays can be advantageously used to detect changes in the intracellular concentration of calcium ions, such as calcium transients. Detection of cardiac specific electrical activity of the cells may be effected by monitoring the electrical activity thereof via a multielectrode array. Suitable multielectrode arrays may be obtained from Multi Channel Systems, Reutlingen. Germany. To detect cardiac specific electrical activity in the partially differentiated cells, the latter can be advantageously cultured, under conditions suitable for inducing cardiac differentiation directly on a multielectrode array, thereby conveniently enabling monitoring the electrical activity of such cells and tissues. Regions of embryoid bodies displaying cardiac differentiation, preferably in the form of cardiac specific mechanical contraction, can be advantageously microdissected from embryoid bodies and cultured on microelectrode arrays.

Cells can be seeded in a scaffold by static loading, or by seeding in stirred flask bioreactors (scaffold is typically suspended from a solid support), in a rotating wall vessel, or using direct perfusion of the cells in medium in a bioreactor. Highest cell density throughout the scaffold is achieved by the latter (direct perfusion) technique.

The cells may be seeded directly onto the scaffold, or alternatively, the cells may be mixed with a gel which is then absorbed onto the interior and exterior surfaces of the scaffold and which may fill some of the pores of the scaffold. Capillary forces will retain the gel on the scaffold before hardening, or the gel may be allowed to harden on the scaffold to become more self-supporting. Alternatively, the cells may be combined with a cell support substrate in the form of a gel optionally including extracellular matrix components. An exemplary gel is Matrigel™, from Becton-Dickinson. Matrigel™ is a solubilized basement membrane matrix extracted from the EHS mouse tumor (Kleinman. H. K., et al., Biochem. 25:312, 1986). The primary components of the matrix are laminin, collagen I, entactin, and heparan sulfate proteoglycan (perlecan) (Vukicevic. S., et al., Exp. Cell Res. 202:1, 1992). Matrigel™ also contains growth factors, matrix metalloproteinases (MMPs [collagenases]), and other proteinases (plasminogen activators [PAs]) (Mackay, A. R., et al., BioTechniques 15:1048, 1993). The matrix also includes several undefined compounds (Kleinman, H. K., et al., Biochem. 25:312, 1986; McGuire, P. G. and Seeds, N. W., J. Cell. Biochem. 40:215, 1989), but it does not contain any detectable levels of tissue inhibitors of metalloproteinases (TIMPs) (Mackay, A. R., et al., BioTechniques 15:1048, 1993). Alternatively, the gel may be growth-factor reduced Matrigel, produced by removing most of the growth factors from the gel (see Taub, et al., Proc. Natl. Acad. Sci. USA (1990); 87 (10:4002-6). In another embodiment, the gel may be a collagen I gel, alginate, or agar. Such a gel may also include other extracellular matrix components, such as glycosaminoglycans, fibrin, fibronectin, proteoglycans, and glycoproteins. The gel may also include basement membrane components such as collagen IV and laminin. Enzymes such as proteinases and collagenases may be added to the gel, as may cell response modifiers such as growth factors and chemotactic agents.

In one embodiment, the decellularized omentum is seeded with a combination of cardiac cells (e.g. cardiomyocytes) and endothelial cells in which the devitalized omentum serves as a cell attachment scaffold and growth promoting substrate. Endothelial cell seeded onto decellularized omentum has utility as a building block material for vascular reconstruction.

Contemplated ratios of cardiac cells:endothelial cells include 90:10, 80:20, 70:30, 60:40 and 50:50.

The endothelial cells may be human embryonic stem cell (hESC)-derived endothelial cells (Levenberg, et al., Proc Natl Acad Sci USA (2002) 99, 4391-4396, the contents of which are incorporated by reference herein), or primary endothelial cells cultured from e.g. human umbilical vein (HUVEC), or biopsy-derived endothelial cells such as from the aorta or umbilical artery. The endothelial cells of the present invention may also be derived from humans (either autologous or non-autologous) e.g. from the blood or bone marrow. In addition the endothelial cells may be derived from other mammals, for example, humans, mice or cows. For example, endothelial cells may be retrieved from bovine aortic tissue. Preferably, the endothelial cells are not derived from the cardiac tissue from which the cardiac cells were isolated.

In one embodiment, human embryonic endothelial cells are produced by culturing human embryonic stem cells in the absence of LIF and bFGF to stimulate formation of embryonic bodies, and isolating PECAM1 positive cells from the population. HUVEC may be isolated from tissue according to methods known to those skilled in the art or purchased from cell culture laboratories such as Cambrex Biosciences or Cell Essentials.

Promotion of 3D endothelial structures may also be enhanced by addition of fibroblast cells (e.g. human embryonic fibroblasts). Fibroblasts may be isolated from tissue according to methods known to those skilled in the art (e.g. obtained from E-13 ICR embryos) or purchased from cell culture laboratories such as Cambrex Biosciences or Cell Essentials. According to one embodiment, the fibroblast cells are co-seeded with the cardiomyocytes and endothelial cells. Accordingly, a pool of cardiomyocytes, endothelial cells and fibroblasts (in the presence or absence of an appropriate gel) may be generated and seeded onto the scaffold.

The present inventors have shown that co-seeding of cardiac cells and endothelial cells on the decellularized omentum described herein result in a composition of matter comprising vascularized cardiac cells seeded on a decellularized omentum scaffold, the vascularized cardiac cells being able to contract more than 20 times per minute, preferably more than 25 times per minute, preferably more than 30 times per minute, preferably more than 35 times per minute and preferably more than 40 times per minute.

The amplitude of contraction of the vascularized cardiac cells is typically greater than 3 µm, 4 µm or even greater than 5 µm.

The decellularized omentum can be lypophilized with polymers to make 3D foam or heat melted into a film or mesh. Further, fibers may be electrostatically spun onto the omentum and used "as is" or with synthetic constructs to make reinforced structures.

According to another embodiment, the decellularized omentum may be solubilized and formed into a hydrogel as further described herein below.

Thus, according to another aspect of the present invention there is provided a method of generating a precursor composition, which upon temperature activation is capable of forming a hydrogel, the method comprising:
 (a) decellularizing omentum to generate decellurized omentum;
 (b) lyophilizing the decellularized omentum to generate lyophilized omentum; and
 (c) solubilizing the lyophilized omentum, thereby generating the composition of matter.

The first step in the generation of the precursor composition is decellularizing omentum. According to this aspect of the present invention, the decellularization is effected using any method in the art so long as the lipids are removed from the omentum. Thus, preferably both a polar and non-polar extraction agent is used in the decellularization process.

According to a particular embodiment, the decellularization is effected using the following steps:
 (a) exposing the omentum to a hypotonic solution;
 (b) freeze thawing the omentum following step (a)
 (c) dehydrating the omentum following step (b);
 (d) extracting fat from the dehydrated omentum using a polar and non-polar extraction agent following step (c);
 (e) rehydrating the dehydrated omentum following step (d);
 (f) extracting cells from the rehydrated omentum following step (e) and
 (g) lyophilizing the omentum following step (f).

Each of these steps has been described in full herein above.

According to another embodiment, the omentum is decellularized using the following steps:
 (a) exposing the omentum to a hypotonic solution;
 (b) freeze thawing the omentum following step (a)
 (c) dehydrating the omentum following step (b);
 (d) extracting fat from the dehydrated omentum using a polar and non-polar extraction agent following step (c);
 (e) rehydrating the dehydrated omentum following step (d); and
 (f) degrading nucleic acids from the rehydrated omentum following step (e) and Each of these steps has been described in full herein above.

Other methods contemplated by the present inventors for decellularizing tissue include those described in U.S. Pat. Nos. 4,776,853, 4,801,299 and U.S. Patent Publication No. 20090163990, the contents of each being incorporated herein by reference in their entirety.

Solubilization of the decellularized ECM may be effected as described in Freytes et al., Biomaterials 29 (2008) 1630-1637 and U.S. Patent Application No. 20120156250, the contents of which are incorporated herein by reference.

Typically, in order to carry out solubilization of the decellularized omentum it is first dehydrated e.g. lyophilized.

The lyophilized, decellularized omentum may be cut into small pieces, e.g. crumbled, or milled into a powder and then subjected to a second round of proteolytic digestion. The digestion is effected under conditions that allow the proteolytic enzyme to digest and solubilize the ECM. Thus, according to one embodiment, the digestion is carried out in the presence of an acid (e.g. HCL) so as to obtain a pH of about 3-4.

Proteolytic digestion according to this aspect of the present invention can be effected using a variety of proteolytic enzymes. Non-limiting examples of suitable proteolytic enzymes include trypsin, pepsin, collaganease and pancreatin which are available from various sources such as from Sigma (St Louis, MO, USA) and combinations thereof. Matrix degrading enzymes such as matrix metalloproteinases are also contemplated.

It should be noted that the concentration of the digestion solution and the incubation time therein depend on the type of tissue being treated and the size of tissue segments utilized and those of skilled in the art are capable of adjusting the conditions according to the desired size and type of tissue.

Preferably, the tissue segments are incubated for at least about 20 hours, more preferably, at least about 24 hours. Preferably, the digestion solution is replaced at least once such that the overall incubation time in the digestion solution is at least 40-48 hours.

Once the decellularized ECM is solubilized, the pH of the solution is increased so as to irreversibly inactivate the proteolytic enzyme (e.g. to about pH 7). The decellularized, solubilized omentum may be stored at this stage at temperatures lower than 20° C.—for example 4° C. so that the decellularized ECM remains in solution.

Thus, according to another aspect of the present invention there is provided a precursor composition comprising solubilized, decellularized omentum which is capable of forming a gel on heat activation.

Typically, the solubilized, decellularized omentum is capable of forming a gel at a temperature above about 30° C. above about 31° C., above about 32° C. above about 33° C., above about 34° C., above about 35° C., above about 36° C., above about 37° C.

The hydrogel generated from the precursor composition described herein is viscoelastic, thermoresponsive, has low swelling ratio and is biocompatible and degradable.

Typically the DNA (ng) content per dry weight of hydrogel is less than 50 ng per dry weight of hydrogel, less than 40 ng per dry weight of hydrogel, or even less than 30 ng per dry weight of hydrogel. Typically, it comprises the following components: collagen type I, II, III, IV, V, VI, laminin, elastin, fibronectin and glycosaminoglycans (sulfated and nonsulfated).

According to a particular embodiment, the sulfated GAG content per dry weight of hydrogel is between 1-10 µg or more preferably between 2-10 µg, or even more preferably between 2-10 µg.

According to still another embodiment, the diameter of the fibers in the hydrogel is between 5-500 nm (for example between 20-400 nm).

Preferably, the concentration of the precursor molecules in the hydrogel is between 0.5 to 35%, more preferably between 0.5 to 20%, more preferably between 0.5 to 10%, more preferably between 0.5 to 5%—for example 0.5%, 1%, 1.5% or 2%.

It will be appreciated that the gelation kinetics of the hydrogel of the present invention is dependent upon the concentration of the precursor molecules in the hydrogel. Typically, the maximum slope of gelation is between 0.001-0.1 (OD/min) (for example between 0.01-0.1). The half time of gelation is typically between 20-80 minutes (for example between 30-60 minutes). The lag phase for gelation is typically between 20-60 minutes (for example between 20-40 minutes).

For a 1% gel, the storage modulus $G'(t=0;Pa)$ may be between 10-20 for example 16-18. For a 1% gel, the storage modulus $G'(t=0.5;Pa)$ may be between 100-200 for example 120-160. For a 1% gel, the storage modulus $G'(t=0.95;Pa)$ may be between 100-200 for example 120-160. For a 1.5% gel, the storage modulus $G'(t=0;Pa)$ may be between 10-50 for example 30-40. For a 1.5% gel, the storage modulus $G'(t=0.5;Pa)$ may be between 200-500 for example 300-400. For a 1.5% gel, the storage modulus $G'(t=0.95;Pa)$ may be between 200-500 for example 250-450.

For a 1% gel, the loss modulus $G''(t=-0;Pa)$ may be between 5-20 for example 10-15. For a 1% gel, the loss modulus $G''(t=0.5;Pa)$ may be between 10-100 for example 20-50. For a 1% gel, the loss modulus $G''(t=0.95;Pa)$ may be between 10-100 for example 20-50. For a 1.5% gel, the loss modulus $G''(t=0;Pa)$ may be between 10-50 for example 20-40. For a 1.5% gel, the loss modulus $G''(t=0.5;Pa)$ may be between 10-100 for example 40-70. For a 1.5% gel, the loss modulus $G''(t=0.95;Pa)$ may be between 10-100 for example 50-80.

The swelling ratio of the hydrogels of this aspect of the present invention are typically between 30-50, with the exact values depending on the length of time the hydrogel has been swollen and the percent precursor present in the hydrogel. Typically, the higher the precursor concentration in the hydrogel, the lower the swelling ratio.

The present inventors have shown that it is possible to control the degradation rate of the hydrogel by manipulating the amount of precursor used to formulate the hydrogel. Thus, when a fast degradation rate is required, the concentration of the precursor should be low. Conversely when a slow degradation rate is required, the concentration of the precursor should be increased.

As described in the Examples section herein below, the precursor hydrogel composition may be administered into the body using an injecting device (e.g. needle, catheter) so as to provide mechanical support of the heart wall. The precursor hydrogel may contain and release growth factors or therapeutic agents (as described herein above) in a controlled manner and/or as a substrate/carrier for cells.

Thus, the present inventors consider administration of the precursor composition (as a liquid) either in the presence or absence of cell populations to patients. Such cell populations have been described herein above.

Another contemplated use of the precursor hydrogel is as an encapsulating agent. Thus the precursor hydrogel may be added to a polymerizing agent to generate a mixture for generating capsules.

The hydrogel may undergo a process of 3D printing. The precursor (together with cells or in the absence of cells), in its liquid state may be printed by extrusion through an aperture (e.g. syringe) so as to form a thin line of biomaterial. The diameter of the aperture is typically between 0.1-0.7 mms. By varying the hydrogel's temperature, velocity of printing, surface temperature or concentration, various printed hydrogel diameters may be obtained, ranging from 100 µm to several millimeters.

The polymerizing agent of this aspect of the present invention is preferably water soluble and may include polymers such as chitosan and polymethacrylic acid or hydrogels composed of polysaccharides (such as alginate, hyaluronic acid and agarose) or other polymers such as poly ethylene glycol. (PEG), and poly hydroxyethyl methacrylate (HEMA)).

According to a particular embodiment, the polymerizing agent is chitosan or alginate.

According to another embodiment, the polymerizing agent is alginate. Alginate is commercially available from a variety of sources—e.g. Novamatrix, Norway. The alginate may be of a viscosity less than 20 up until greater than 200 mPa·s with different G/M content (e.g. from less than 1 to greater than 1.5).

Typical ratios of volumes of polymerizing agent:decellularized ECM which are mixed to generate the mixture are between 50:50-70:30.

Cells are added to the above described mixture. Thus, for example for a 2 ml mixture, about two million cells may be added.

Additional information on use of decellularized ECM as an encapsulating agent is provided in WO 2014/037942, incorporated herein by reference.

In any of the compositions described herein, the decellularized omentum may be derived from the patient himself (i.e. autologous to the patient) or derived from a subject other than the patient (i.e. non-autologous) and/or the cell populations which are administered to the patient together with the decellularized omentum are derived from the patient himself (i.e. autologous to the patient) or derived from a subject other than the patient (i.e. non-autologous).

The compositions of the present invention may be used for treating any disorder associated with tissue degeneration. According to a specific embodiment, the compositions are used for treating a cardiac disorder which is associated with a defective or absent myocardium.

Thus, according to another aspect of the present invention there is provided a method of treating cardiac disorder associated with a defective or absent myocardium in a subject, the method comprising transplanting a therapeutically effective amount of the compositions of the present invention into the subject, thereby treating the cardiac disorder.

The method may be applied to repair cardiac tissue in a human subject having a cardiac disorder so as to thereby treat the disorder. The method can also be applied to repair cardiac tissue susceptible to be associated with future onset or development of a cardiac disorder so as to thereby inhibit such onset or development.

The present invention can be advantageously used to treat disorders associated with, for example, necrotic, apoptotic, damaged, dysfunctional or morphologically abnormal myocardium. Such disorders include, but are not limited to, ischemic heart disease, cardiac infarction, rheumatic heart disease, endocarditis, autoimmune cardiac disease, valvular heart disease, congenital heart disorders, cardiac rhythm disorders, impaired myocardial conductivity and cardiac insufficiency. Since the majority of cardiac diseases involve necrotic, apoptotic, damaged, dysfunctional or morphologically abnormal myocardium, and since the vascularized cardiac tissue of the present invention displays a highly differentiated, highly functional, and proliferating cardiomyocytic phenotype, the method of repairing cardiac tissue of the present invention can be used to treat the majority of instances of cardiac disorders.

According to one embodiment, the method according to this aspect of the present invention can be advantageously used to efficiently reverse, inhibit or prevent cardiac damage caused by ischemia resulting from myocardial infarction.

According to another embodiment, the method according to this aspect of the present invention can be used to treat cardiac disorders characterized by abnormal cardiac rhythm, such as, for example, cardiac arrhythmia.

As used herein the phrase "cardiac arrhythmia" refers to any variation from the normal rhythm of the heart beat, including, but not limited to, sinus arrhythmia, premature heat, heart block, atrial fibrillation, atrial flutter, pulsus alternans and paroxysmal tachycardia.

According to another embodiment, the method according to this aspect of the present invention can be used to treat impaired cardiac function resulting from tissue loss or dysfunction that occur at critical sites in the electrical conduction system of the heart, that may lead to inefficient rhythm initiation or impulse conduction resulting in abnormalities in heart rate.

The method according to this aspect of the present invention is effected by transplanting a therapeutically effective amount of the composition of the present invention to the heart of the subject (either together with the cardiac cells seeded or without the cardiac cells). When the composition is in a liquid form (e.g. precursor hydrogel composition), it may be injected into the body at a preferable site. When the composition is in a solid form, it may be transplanted into the body at a preferable site.

As used herein, "transplanting" refers to providing the scaffold supported cells of the present invention, using any suitable route.

As used herein, a therapeutically effective dose is an amount sufficient to effect a beneficial or desired clinical result, which dose could be administered in one or more administrations. According to one embodiment, a single administration is employed. The injection can be administered into various regions of the heart, depending on the type of cardiac tissue repair required. Intramyocardial administration is particularly advantageous for repairing cardiac tissue in a subject having a cardiac disorder characterized by cardiac arrhythmia, impaired, cardiac conducting tissue or myocardial ischemia.

Such transplantation directly into cardiac tissue ensures that the administered cells/tissues will not be lost due to the contracting movements of the heart.

The compositions of the present invention can be transplanted via transendocardial or transepicardial injection, depending on the type of cardiac tissue repair being effected, and the physiological context in which the cardiac repair is effected. This allows the administered cells or tissues to penetrate the protective layers surrounding membrane of the myocardium.

Preferably, a catheter-based approach is used to deliver a transendocardial injection. The use of a catheter precludes more invasive methods of delivery wherein the opening of the chest cavity would be necessitated.

The compositions of the present invention can be utilized to regulate the contraction rate of a heart en response to physiological or metabolic state of the recipient individual, thereby serving as a biological pacemaker.

In the case of repairing cardiac tissue in a subject having a cardiac disorder characterized by cardiac arrhythmia, electrophysiological mapping of the heart and/or inactivation of cardiac tissue by radiofrequency treatment may be advantageously performed in combination with administration of the cells and tissues of the present invention if needed.

To repair cardiac tissue damaged by ischemia, for example due to a cardiac infarct, composition of the present invention is preferably administered to the border area of the infarct. As one skilled in the art would be aware, the infarcted area is grossly visible, allowing such specific localization of application of therapeutic cells to be possible. The precise determination of an effective dose in this particular case may depend, for example, on the size of an infarct, and the time elapsed following onset of myocardial ischemia.

According to one embodiment, transplantation of the compositions of the present invention for repair of damaged myocardium is effected following sufficient reduction of inflammation of affected cardiac tissues and prior to formation of excessive scar tissue.

The present invention can be used to generate cardiomyocytic cells and tissues displaying a desired proliferative capacity, thus cells and tissues are preferably selected displaying a suitable proliferative capacity for administration, depending on the type of cardiac tissue repair being effected. Administration of highly proliferative cells may be particularly advantageous for reversing myocardial damage resulting from ischemia since, as previously described, it is the essential inability of normal adult cardiomyocytes to proliferate which causes the irreversibility of ischemia induced myocardial damage.

Since porcine models are widely considered to be excellent models for human therapeutic protocols and since such models have been widely employed and characterized, it is well within the grasp of the ordinarily skilled artisan to determine a therapeutically effective dose for a human based on the guidance provided herein, and on that provided by the extensive literature of the art.

Determination of an effective dose is typically effected based on factors individual to each subject, including, for example, weight, age, physiological status, medical history, and parameters related to the cardiac disorder, such as, for example, infarct size and elapsed time following onset of ischemia. One skilled in the art, specifically a cardiologist, would be able to determine the amount and number of cells comprised in the composition of the present invention that would constitute an effective dose, and the optimal mode of administration thereof without undue experimentation.

It will be recognized by the skilled practitioner that when administering non-syngeneic cells or tissues to a subject, there is routinely immune rejection of such cells or tissues by the subject. Thus, the method of the present invention may also comprise treating the subject with an immunosuppressive regimen, preferably prior to such administration, so as to inhibit such rejection. Immunosuppressive protocols for inhibiting allogeneic graft rejection, for example via administration of cyclosporin A, immunosuppressive antibodies, and the like are widespread and standard practice in the clinic.

In any of the methods described herein, the decellularized omentum can be administered either per se or, as a part of a pharmaceutical composition that further comprises a pharmaceutically acceptable carrier.

As used herein a "pharmaceutical composition" refers to a preparation of one or more of the chemical conjugates described herein, with other chemical components such as pharmaceutically suitable carriers and excipients. The purpose of a pharmaceutical composition is to facilitate administration of a compound to a subject.

Hereinafter, the term "pharmaceutically acceptable carrier" refers to a carrier or a diluent that does not cause significant irritation to a subject and does not abrogate the biological activity and properties of the administered compound. Examples, without limitations, of carriers are propylene glycol, saline, emulsions and mixtures of organic solvents with water.

Herein the term "excipient" refers to an inert substance added to a pharmaceutical composition to further facilitate administration of a compound. Examples, without limitation, of excipients include calcium carbonate, calcium phosphate, various sugars and types of starch, cellulose derivatives, gelatin, vegetable oils and polyethylene glycols.

According to a preferred embodiment of the present invention, the pharmaceutical carrier is an aqueous solution of saline.

Techniques for formulation and administration of drugs may be found in "Remington's Pharmaceutical Sciences," Mack Publishing Co., Easton, PA, latest edition, which is incorporated herein by reference.

One may administer the pharmaceutical composition in a systemic manner (as detailed hereinabove). Alternatively, one may administer the pharmaceutical composition locally, for example, via injection of the pharmaceutical composition directly into a tissue region of a patient.

Pharmaceutical compositions of the present invention may be manufactured by processes well known in the art. e.g., by means of conventional mixing, dissolving, granulating, dragee-making, levigating, emulsifying, encapsulating, entrapping or lyophilizing processes.

Pharmaceutical compositions for use in accordance with the present invention thus may be formulated in conventional manner using one or more physiologically acceptable carriers comprising excipients and auxiliaries, which facilitate processing of the active ingredients into preparations which, can be used pharmaceutically. Proper formulation is dependent upon the route of administration chosen.

For injection, the active ingredients of the pharmaceutical composition may be formulated in aqueous solutions, preferably in physiologically compatible buffers such as Hank's solution, Ringer's solution, or physiological salt buffer. For transmucosal administration, penetrants appropriate to the barrier to be permeated are used in the formulation. Such penetrants are generally known in the art.

Depending on the medical condition, the subject may be administered with additional chemical drugs (e.g., immunomodulatory, chemotherapy etc.) or cells.

Examples of immunosuppressive agents include, but are not limited to, methotrexate, cyclophosphamide, cyclosporine, cyclosporin A, chloroquine, hydroxychloroquine, sulfasalazine (sulphasalazopyrine), gold salts. D-penicillamine, leflunomide, azathioprine, anakinra, infliximab (REMICADE), etanercept, TNF.alpha. blockers, a biological agent that targets an inflammatory cytokine, and Non-Steroidal Anti-Inflammatory Drug (NSAIDs). Examples of NSAIDs include, but are not limited to acetyl salicylic acid, choline magnesium salicylate, diflunisal, magnesium salicylate, salsalate, sodium salicylate, diclofenac, etodolac, fenoprofen, flurbiprofen, indomethacin, ketoprofen, ketorolac, meclofenamate, naproxen, nabumetone, phenylbutazone, piroxicam, sulindac, tolmetin, acetaminophen, ibuprofen. Cox-2 inhibitors and tramadol.

As used herein the term "about" refers to +10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a". "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA". Scientific American Books, New York; Birren et al. (eds) "Genome Analysis: A Laboratory Manual Series". Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis. J. E., ed. (1994); "Culture of Animal Cells—A Manual of Basic Technique" by Freshney. Wiley-Liss, N. Y. (1994). Third Edition; "Current Protocols in Immunology" Volumes I-III Coligan J. E., ed. (1994); Stites et al. (eds). "Basic and Clinical Immunology" (8th Edition). Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait. M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press. (1986); "A Practical Guide to Molecular Cloning" Perbal. B., (1984) and "Methods in Enzymology" Vol. 1-317. Academic Press; "PCR Protocols: A Guide To Methods And Applications", Academic Press, San Diego, CA (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Omentum-Based Matrix for Engineering Autologous Vascularized Cardiac Tissues

Materials and Methods

Decellularization.

Decellularization of porcine omental tissue: Omenta of healthy 6 month old pigs were purchased from the institute of animal research in Kibutz Lahav. Israel. Fresh omental tissue was agitated for 1 hour in a hypotonic buffer of 10 mM Tris 5 mM Ethylenediaminetetraacetic acid (EDTA) and 1 µM phenylmethanesulfonyl-fluoride (PMSF) at pH 8.0. Then the tissue was subjected to three cycles of freezing (−80° C.) and thawing (37° C.) using the same buffer. After the last cycle the tissue was gradually dehydrated by washing it once with 70% ethanol for 30 minutes and three times in 100% ethanol for 30 minutes each. Polar lipids of the tissue were then extracted by three 30 minute washes of 100% acetone. Subsequently, the a-polar lipids were extracted by 3 incubations in a 60:40 hexane:acetone solution (8 h each). Then, the defatted tissue was gradually rehydrated and subjected to 0.25% Trypsin-EDTA (Biological Industries, Kibbutz Beit-Haemek, Israel) degradation overnight at room temperature (RT). The tissue was then thoroughly washed with phosphate buffered saline (PBS) and with 50 mM Tris buffer with 1 mM $MgCl_2$ at pH 8.0. Following this, the tissue was gently agitated in a nucleic acid degradation solution of 50 mM Tris 1 mM $MgCl_2$ 0.1% bovine serum albumin (BSA) and 40 U/ml Benzonase® nuclease (Novagen, Madison, WI) at pH 8.0 for 20 h at 37° C. Finally, the tissue was washed with a buffer containing 50 mM Tris 1% (v/v) triton-X100 (pH 8.0), subsequently with 50 mM Tris buffer (pH 8.0), three times with PBS and three times with sterile double distilled water (DDW). The decellularized tissue was frozen overnight (−20° C.) and lyophilized.

Decellularization of porcine heart tissue: Hearts of healthy 6 month old pigs were purchased from the institute of animal research in Kibutz Lahav, Israel. The left ventricle was horizontally cut into 3 mm thick tissue slices and subjected to a decellularization protocol as described herein. Briefly, the tissue was incubated in a lysis buffer (10 mM Tris buffer and 0.1% wt/vol EDTA, pH 8.0) for 24 hr, followed solubilization in 0.5% sodium dodecyl sulfate (SDS) with orbital mixing (4 days, medium was changed every 8 h). Following, the sections were washed in PBS and incubated under orbital mixing with 40 U/ml Benzonase in 50 mM Tris, 1 mM $MgCl_2$, 0.01% BSA, pH 8.0 at 37° C. for 20 h. washed 4 times in sterile DDW, frozen overnight (−20° C.) and lyophilized.

Histology, immunostaining and immunofluorescence. Fresh or decellularized tissues were dehydrated in graduated ethanol steps (70-100%), fixed in formalin and paraffin-embedded. Sections of 5 µm were obtained and affixed to X-tra™ adhesive glass slides (Leica Biosystems). The sections were stained with Masson trichrome (Bio-Optica. Milano, Italy) for cell and collagen detection, and with Alcian-blue (Merck. Geneva. Switzerland) for GAG detection.

For immunohistochemistry, heat-mediated antigen retrieval was performed after deparaffinization. Endogenous peroxidases were inhibited by incubating the slides in 3% hydrogen peroxide in PBS for 5 min. Then, the slides were blocked in DMEM-based buffer containing 2% fetal bovine serum (FBS) for 1 h in RT and stained using primary mouse monoclonal anti-Human smooth muscle actin antibody (Dako, Glostrup, Denmark) for 1 h in RT. Antibody labeling was detected using secondary horseradish peroxidase-conjugated anti-mouse antibody (Dako), visualized using DAB chromogen substrate (Dako).

For immunofluorescence, native, acellular scaffolds or cell-seeded constructs were fixed and permeabilized in cold methanol, blocked for 8 min at RT in Super Block (ScyTek laboratories, West Logan, UT). After 3 PBS washes, the samples were incubated with primary antibodies: mouse monoclonal anti-collagen I (Sigma, St Louis, MO), rabbit polyclonal anti collagen 4 (Abeam, Cambridge, MA), rabbit polyclonal anti laminin (Abeam), mouse monoclonal anti VEGF (Abeam), primary rabbit polyclonal anti cardiac Troponin I (Abeam), mouse monoclonal anti α-actinin (Sigma), rabbit anti connexin 43 (Invitrogen, Carlsbad, CA), mouse monoclonal anti CD31 (Abeam), rabbit monoclonal anti Ki67 (Abcam), rabbit polyclonal anti Sca-1 (Millipore), mouse anti-Vimentin (Invitrogen), mouse anti SSEA-4 (R&D Systems, Minneapolis, MN), rabbit anti Nanog (Peproteck, Rocky Hill, NJ). After incubation, the samples were washed and incubated for 1 h at RT with secondary antibodies: goat anti-rabbit Alexa Fluor 488 (Jackson, West Grove, PA). Goat Anti-Mouse Alexa Fluor 647 (Jackson). For nuclei detection, the cells were incubated for 5 min with 5 µg/mL Hoechst 33258 (Sigma).

Samples were analyzed using a confocal microscope LSM 510 Meta (Zeiss, Germany) or inverted fluorescence microscope (Nikon Eclipse TI).

Assessment of matrix components. For DNA quantification, nucleic acids were isolated using the phenol-chloroform method and visualized by ethidiume bromid gel electrophoresis.

Total GAG content was quantified in natural and decellularized tissues using dimethylmethylene blue dye-binding assay (DMMB; Blyscan, Biocolor Ltd., Carrickfergus, UK), with a chondroitin sulphate standard, according to manufactures guideline and normalized to dry weight.

The decellularized samples were analyzed by mass spectrometry (MS) performed by an orbitrap ion-trap mass spectrometer (MS. Thermo Fisher Scientific, Inc.). The MS data was analyzed using the MaxQuant 1.2.2.5 software (Mathias Mann's lab, Maxplanq institute) searching against the pig part of the NCBI-nr database.

Scanning electron microscopy. Cells were fixed by 2.5% gluteraldehyde in PBS for 1 h at room temperature. After fixation, cultures were rinsed with PBS and treated with Guanidine-HCl:Tannic acid (4:5) solution (2%) for 1 hour at room temperature. Cultures were rinsed again with PBS and incubated in 2% $OsO_4$ solution in PBS for 1 h. Cultures were then washed and dehydrated in graded series of ethanol (50, 70, 80, 90 and 100%). Finally, the preparations were sputtered with gold for scanning electron microscope (SEM. JSM 840A, JEOL) examination, or with carbon for HRSEM examination (Magellan 400L, FEI, Hillsboro, OR, USA).

Mechanical properties of decellularized scaffolds. Three uniaxial mechanical assays (cyclic strain, stress relaxation, and strain to break) were conducted on decellularized heart and omentum samples using an Instron universal loading frame, model 5582 universal testing instrument with a 100N load cell. Device control, data acquisition and processing were performed with BlueHill 2.0 materials testing software (Instron). The specimens were hydrated with PBS (pH 7.4) at ambient temperature throughout the testing.

Cyclic loading. Samples were preconditioned by 10 strain-release cycles. The scaffolds were stretched at a fixed rate of 0.05 mm/s to 15% strain and then released at the same rate to the starting point. After a 3 min rest at starting point, three more strain-release cycles were performed.

Stress-relaxation. Samples were stretched rapidly (0.5 mm/s) to 20% strain and held at constant displacement for 10 min, allowing relaxation of stress.

Strain to break. Samples were stretched at a rate of 0.05 mm/s until torn. At least 3 samples were used for each test.

Cardiac cell isolation and culture. Neonatal ventricle myocytes (taken from 1- to 3-day-old Sprague-Dawley rats) were isolated using 6-7 cycles of enzyme digestion, as described herein. Briefly, left ventricles were harvested, minced and cells were isolated using enzymatic digestion with collagenase type II (95 U/ml; Worthington. Lakewood, NJ) and pancreatin (0.6 mg/ml; Sigma) in Dulbecco's modified Eagle Medium (DMEM, ($CaCl_2.2H_2O$ (1.8 mM), KCl (5.36 mM). $MgSO_4.7H_2O$ (0.81 mM), NaCl (0.1 M). $NaHCO_3$(0.44 mM), $NaH_2PO_4$ (0.9 mM)). After each round of digestion cells were centrifuged (600 G, 4° C., 5 min) and re-suspended in culture medium composed of M-199 supplemented with 0.6 mM $CuSO_4.5H_2O$, 0.5 mM $ZnSO_4.7H_2O$, 1.5 mM vitamin B12, 500 U/ml Penicillin (Biological Industries) and 100 mg/ml streptomycin (Biological Industries), and 0.5% (v/v) FBS. To enrich the cardiomyocyte population, cells were suspended in culture medium with 5% FBS and pre-plated twice (30 min). Cell number and viability was determined by hemocytometer and trypan blue exclusion assay. $5 \times 10^5$ cardiac cells were seeded onto 5 mm diameter scaffolds by adding 10 µl of the suspended cells, followed by 40 min incubation period (37° C., 5% $CO_2$). Following this, cell constructs were supplemented with culture medium (with 5% FBS) for further incubation.

Cardiac cells seeded onto Surgisis SIS scaffolds (Cook Biotech Inc.), or alginate scaffolds, were used as control groups.

Human umbilical vein endothelial cells (HUVECs) culture. HUVECs (passage 4; Lonza, Basel, Switzerland) were cultured in Endothelial cell medium (EGM-2, PromoCell, Heidelberg, Germany). HUVECs and cardiac cells were cultured at various endothelial:cardiac cell ratios (10%, 25% and 50% HUVECs) in EGM-2.

Mesenchymal stem cell isolation and culture. Mesenchymal stem cells (MSCs) were isolated from the femurs of 4-6 weeks old Sprague-Dawley rats, as described below. Briefly, cells were aspirated from each bone, seeded separately on culture plates and grown in complete medium (high-glucose DMEM, supplemented with 10% (v/v) FBS, 1% (w/v) penicillin-streptomycin and 1% (w/v) 1-glutamine, all materials from Biological Industries). The next day, nonadherent cells were removed by several washes with a fresh warmed medium. MSCs were identified by adherence to the flask. MSCs were allowed to grow to 70% confluence and then harvested, replated, and cultured for an additional week prior to seeding on the omentum scaffold.

Human iPSC culture. hiPSCs were removed from the mouse embryonic fibroblast feeder-layer, dispersed into cell-clumps using collagenase type IV (300 U/ml, Worthington Biochemical Corporation, Lakewood, NJ), seeded onto the omental scaffolds and cultured.

Assessment of cell viability. Cell viability was determined by a colorimetric XTT assay for the quantification of cell proliferation and viability (Biological Industries) according to the manufacturer's instructions. Then, the absorbance of each sample (475 nm) was measured against a background control (665 nm) using a SynergyHT microplate photometer.

Live/Dead assay: scaffolds seeded with cardiac cells were subjected to a fluorescein-diacetate (FDA) and propidium iodide (PI) staining assay. Seeded scaffolds were immersed for 20 min in 5 µg/ml FDA (Sigma) and 4 µg/mL PI (Sigma) in culture medium at 37° C. Samples were washed with PBS and imaged using a fluorescence microscope (Nikon Eclipse TI, inverted).

Analyses of tissue function. Contraction of the cardiac cell constructs was recorded using an inverted microscope. Contraction amplitude was analyzed using ImageJ software (NIH). Contraction rate was counted.

Statistical analysis. Data are presented as means±SEM. Univariate differences between the groups were assessed using Student's t-test. All analyses were performed using GraphPad Prism version 5.00 for Windows (GraphPad Software). P<0.05 was considered significant.

Results

Prior to the decellularization process, the present inventors sought to detect the presence of several key players in the omental tissue, important for engineering vascularized cardiac tissues. These factors include the underlying collagen fibrous mesh, blood vessel infrastructure, adhesion molecules and GAGs.

Figure 1A:
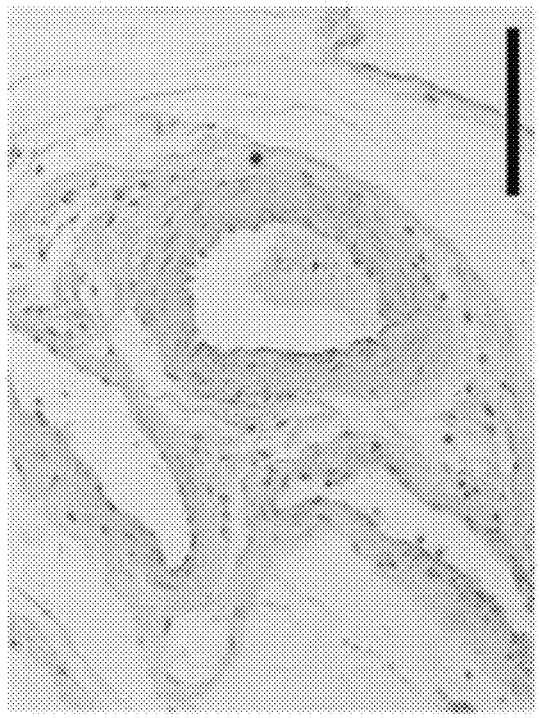
Figure 1B:
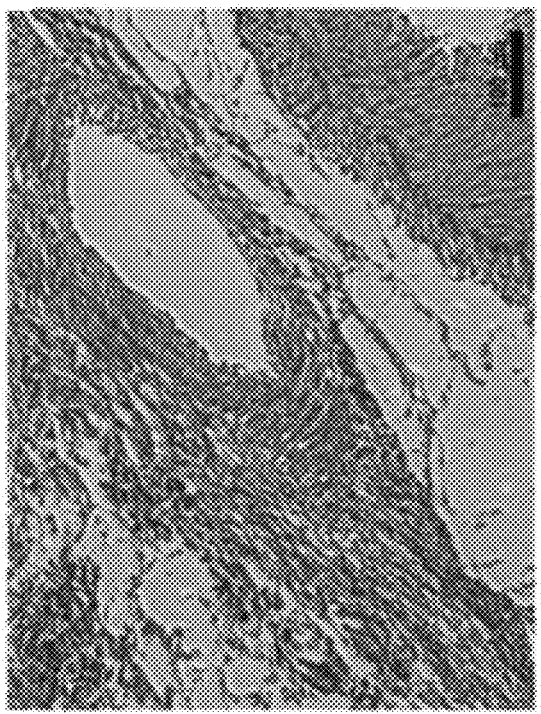
Figure 1C:
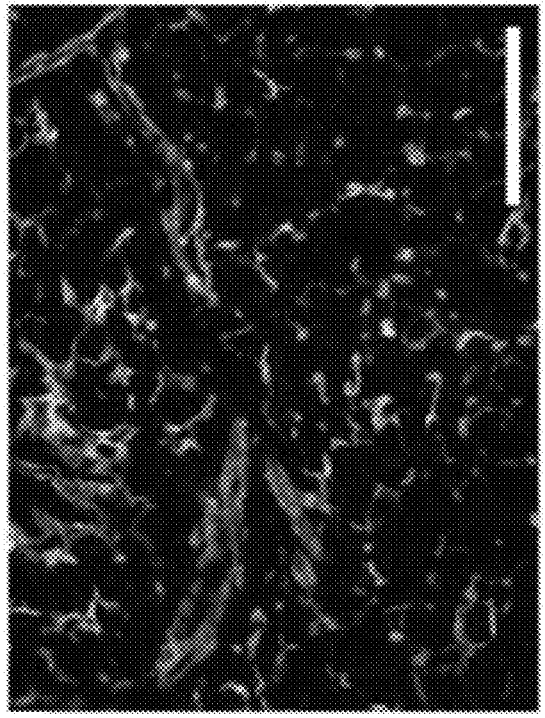
Figure 1D:

Masson's trichrome staining of fixed omentum slices revealed high content of collagen fibers (blue) within the tissue, serving as the underlying matrix supporting the cells (FIG. 1A). To evaluate the presence of GAGs, fixed slices of omental tissues were stained with Alcian blue. FIG. 1B revealed high content of sulfated GAGs (light blue) throughout the tissue, mainly around blood vessels. Smooth muscle actin staining, which labels smooth muscle cells, revealed a dense vascular network composed of multiple size blood vessels (FIG. 1C; brown) with high content of vascular endothelial growth factor (VEGF) around them (FIG. 1D; pink). The adhesion molecule laminin was found on the collagen fibers throughout the tissue (FIG. 1D; green).

Decellularization of the Omentum and Matrix Analyses

Figure 3B:
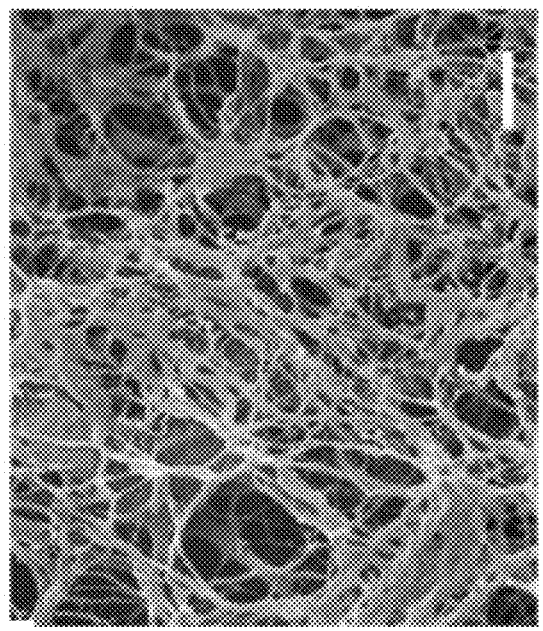
Figure 3D:
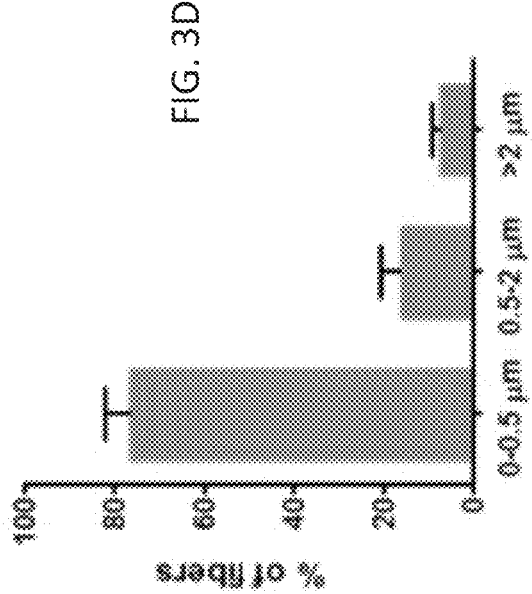
Figure 3A:
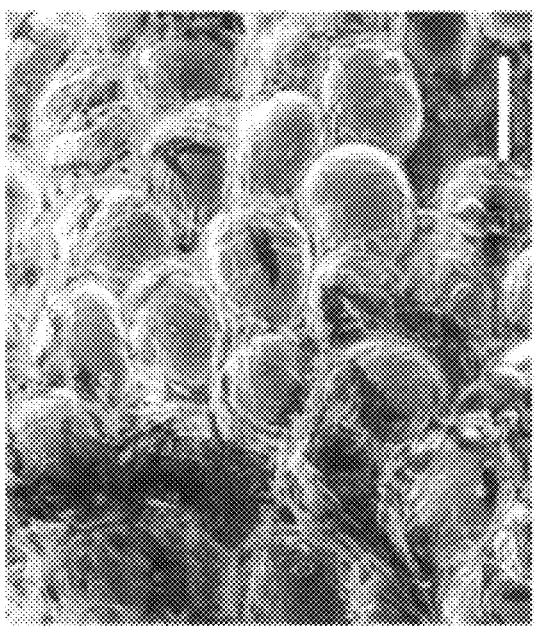
Figure 3C:
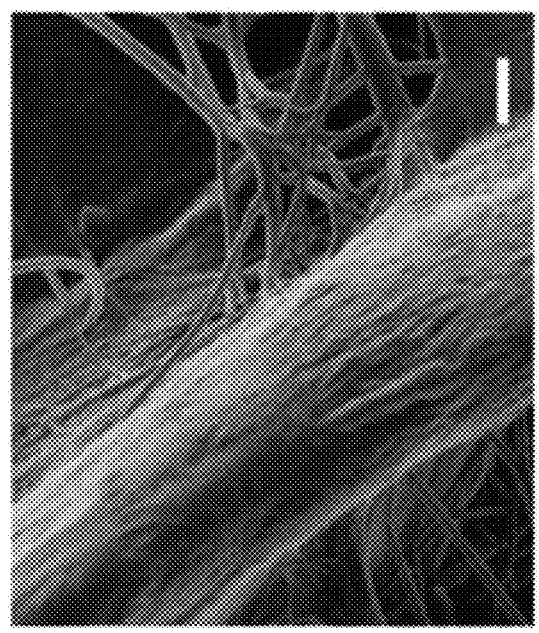

To evaluate the potential of the omentum matrix to serve as a scaffold for cardiac tissue engineering, the present inventors first focused on cell removal. Omental tissues were subjected to various processes (described in detail in the methods section) in order to achieve efficient removal of adipose and blood vessel cells and their fragments (FIGS. 2A-2D). Complete DNA/RNA removal was validated using Hoechst 33258 staining. Nuclei were detected in fresh omentum but not in the decellularized matrix (FIGS. 2E and 2F, respectively). Ethidium bromide agarose gel electrophoresis showed no DNA bands associated with the decellularized omental tissue, whereas fresh omentum showed a large band above 9400 bp (FIG. 2G). SEM analysis performed on native (FIG. 3A) and decellularized omentum (FIG. 3B) further indicated efficient cell removal and the preservation of a fibrous mesh with blood vessel infrastructure (FIG. 3C). Overall, the decellularized matrix contained fibers ranging from 150 nm to several micrometers in diameter (FIG. 3D).

Figure 4A:
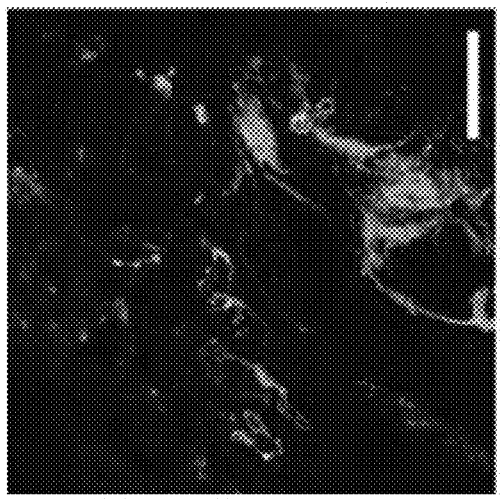
Figure 4B:
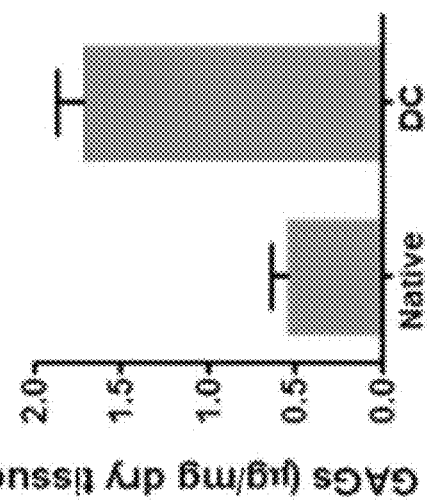

The present inventors next sought to analyze the composition of the matrix. Masson's trichrome staining revealed a fibrous, collagen-rich structure (FIG. 4A). Positive staining for collagen I and IV was observed (FIG. 4B). Further indication of protein content within the decellularized omentum was provided by the MS proteomic analysis. Among the collagen proteins in the matrix mostly structural collagenous proteins were identified such as collagen types I (52%) and III (15%), which provide mechanical support to the matrix, collagen type II (12%) which interacts with proteoglycans and provides tensile strength to tissues and collagen type V (7%), associated with initiation of collagen fibril assembly. Furthermore, collagens IV (2%) and VI (2%), comprising the basement membrane of blood vessels were also detected, suggesting the basic building blocks of the vessel infrastructure were preserved during the decellularization process.

Figure 4C:
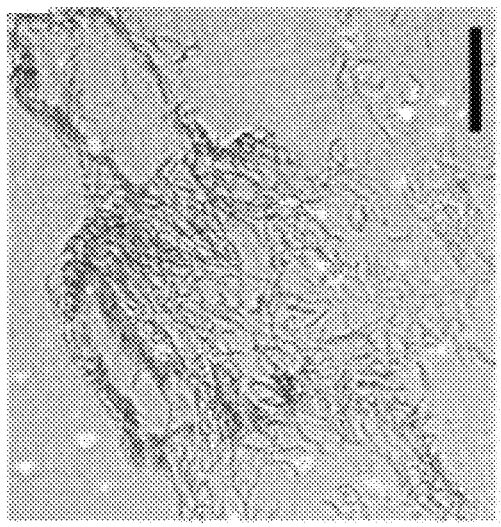
Figure 4D:
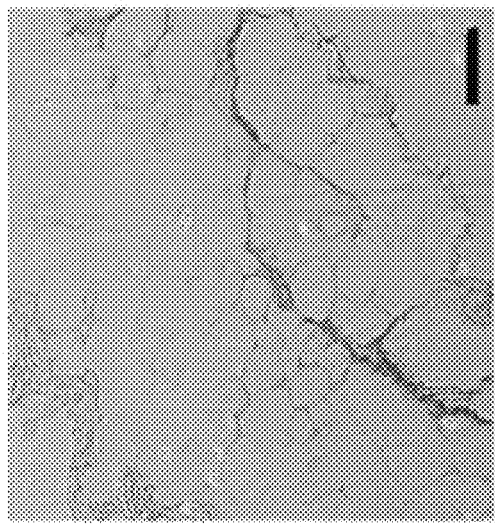

In addition to their capacity to bind water and thus form hydrated matrices, sulfated GAGs electrostatically bind heparin binding proteins and control their release into the cellular microenvironment. GAG preservation within the decellularized omentum matrix was qualitatively detected by Alcian blue staining (FIG. 4C). Next, sulfated GAGs within the matrix were quantified using Blyscan assay. As shown, 1.7 µg of sulfated GAGs were preserved in 1 mg dry matrix during decellularization process (FIG. 4D).

To evaluate whether the mechanical properties of the decellularized omentum may support cardiac function, the matrix was analyzed by 3 mechanical assays: cyclic-strain, strain-relaxation and strain-to-break. Representative graphs are presented in FIGS. 5A-5C. It was found that the scaffolds exhibited low hysteresis and high elasticity, as evident by the distance between the ascending and descending curves in the cyclic strain assay. Almost no reduction of peak stress values for consequent cycles or reduction of minimum stress at starting point was observed in the omental scaffolds (FIG. 5A). In the stress-relaxation assay, the omental scaffolds exhibited viscoelastic behavior (FIG. 5B), resembling previously described stress-relaxation results of native heart tissue. Although the omental scaffolds exhibited, as expected, lower ultimate strength than the cardiac ECM, both the omental and cardiac ECM had initial failure at 20% stretch in the strain to break assay (FIG. 5C).

Engineering Functional Cardiac Patches

The potential of the matrices to support cardiac cell culture and tissue assembly over time was assessed. Cardiac cells were isolated from the ventricles of neonatal rats and seeded with a single droplet into the matrices (FIG. 6A). Cell viability was assessed over time by Live/Dead staining and XTT viability assay, revealing negligible cell death and maintenance throughout the cultivation period (FIGS. 6B and 6C).

To evaluate cardiac cell morphology within the scaffolds, the constructs were double stained for troponin I and collagen I. Confocal images of cell seeded constructs on day 3, revealed that the cells are located on the collagen fibers (pink), suggesting cell-matrix interaction (FIG. 7A). On day 7, the cells assembled into elongated and aligned cell bundles (FIG. 7B). Sarcomeric α-actinin (pink) staining revealed massive striation, indicating the contraction potential of the tissue (FIG. 7C). The cells within the omental matrix acquired morphology similar to that of cells cultivated on decellularized heart (FIG. 7D) and typical to native cardiac cells. High resolution SEM images of cardiac cells grown within the omental matrix provided further indication for cell elongation and alignment, and for cell-cell and cell-matrix interactions (FIG. 7E). It was noted that during the cultivation period the pores of the matrices were gradually filled, probably with ECM proteins secreted by cardiac fibroblasts (FIG. 7F).

Figure 7G:
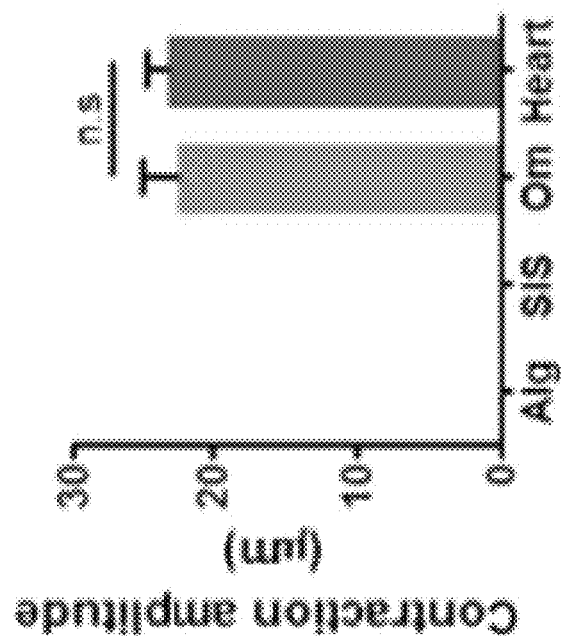

Since a strong contraction of the engineered tissue is essential for creating an effective heart patch, the contraction amplitude and rate of the patches was measured. The amplitude and rate were of the same order as cardiac tissue engineered within decellularized heart matrix (FIGS. 7G and 7H). Cells seeded onto alginate scaffolds and SIS membranes, serving as control groups, were not able to induce construct contraction, although contractions of individual cell aggregates were observed.

Vascularization of the Cardiac Patch

Prevascularization of the patch is essential for its proper integration with the host myocardium after implantation. In the absence of proper vasculature, following transplantation, oxygen cannot reach the implanted cells and the cardiac cells comprising the patch cannot survive. Therefore, the present inventors sought to assess the ability of the omentum-based matrix to induce the assembly of endothelial cells into blood vessels. HUVECs were seeded on the matrix to form blood vessel networks on the blood vessel infrastructure. As shown, endothelial cells, positively stained for CD31 marker (pink) were located on collagen IV fibers (green) within the matrix, forming tube-like structures (FIGS. 8A and 8B).

Figure 8F:
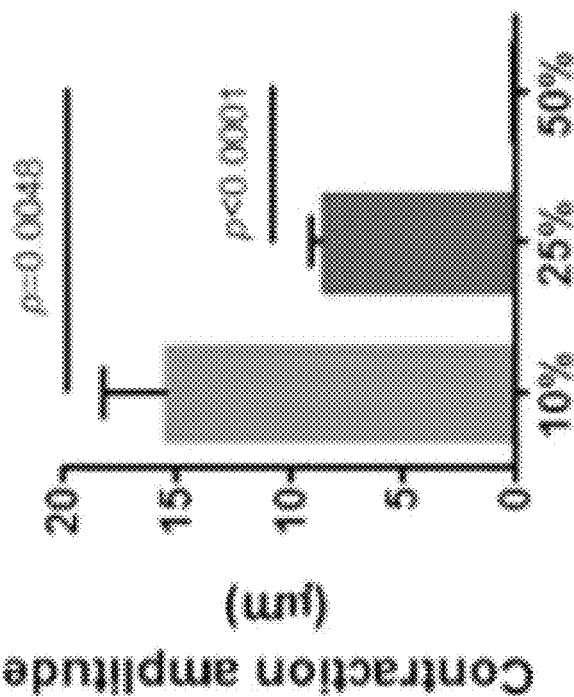
Figure 8E:
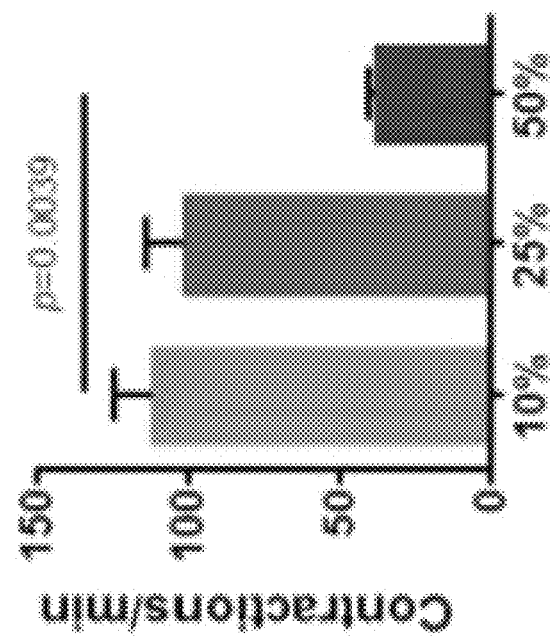

Next, HUVECs were co-cultured with cardiac cells at various endothelial:cardiac cell ratios (described in methods section). Structures resembling blood vessel networks (CD31; pink) in-between cardiac cell bundles (troponin I; green) were observed in the different cultures (FIGS. 8C and 8D). The contraction properties of the vascularized cardiac patches were evaluated. As shown in FIGS. 8E and 8F, higher contraction amplitude and rate were observed in cardiac patches seeded with higher cardiac cell percentage. It was further observed that when the cell constructs were cultured in EGM-2 medium (FIG. 8E), the contraction rate was significantly higher than of constructs cultured in M199 medium (FIG. 7H). This is probably due to growth factor supplements in the enriched EGM-2 medium (epidermal GF, vascular endothelial GF, basic fibroblast factor, IGF-1).

Omentum Matrix as a Platform for Engineering Autologous Tissues

The present inventors next sought to evaluate the potential of the matrix to accommodate MSCs and hiPS cells, which have the potential to regenerate the infarcted heart. Theoretically, these cells can be isolated from a patient, seeded and cultivated within the patient's derived matrix and re-transplanted instead of the injured tissue. This approach may represent a new concept for engineering personalized tissues.

Figure 9C:
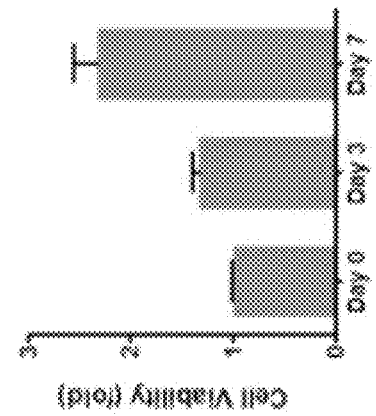
Figure 9B:
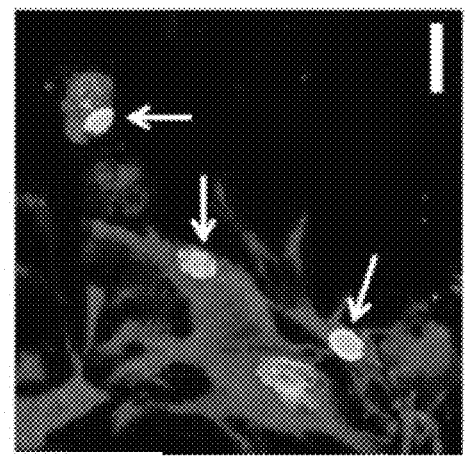
Figure 9A:
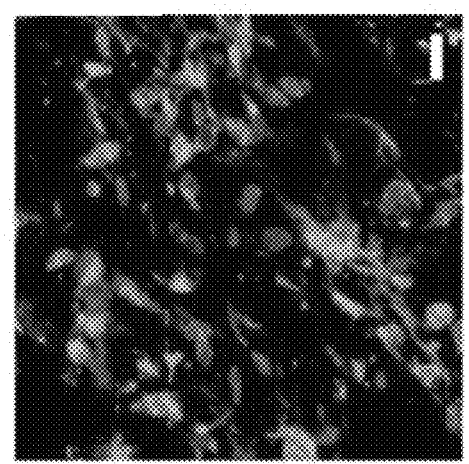
Figure 9E:
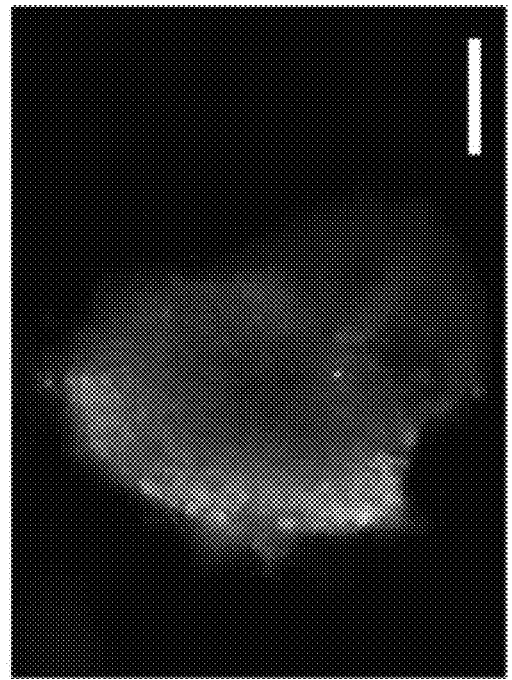
Figure 9D:
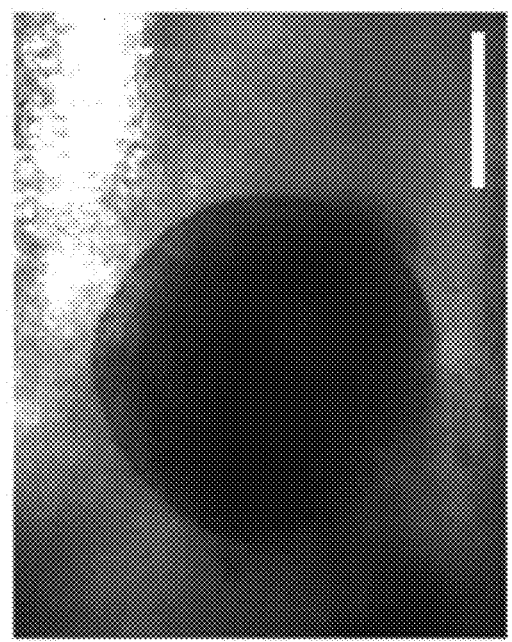

MSCs were isolated from rat bone marrow and cultured within omentum matrices. On day 7 the cells exhibited strong staining for Sca-1 (FIG. 9A, green). Co-staining with vimentin (pink) and Ki67 proliferation marker (green), along with XTT viability assay have indicated cell proliferation within the scaffold (FIGS. 9B and 9C).

hiPS cells were also cultured on the omentum matrix. Previously it has been shown that these cells can be isolated from patients, and manipulated to differentiate into contracting cardiomyocytes. Therefore iPS cells are relevant for the engineering of an autologous cardiac patch. FIGS. 9D and 9E revealed that 7 days after cell seeding, embryoid bodies were formed on the omentum matrix. The cells were positively stained for Nanog (green) and SSEA-4 (pink), indicating the maintenance of their pluripotency.

Discussion

The omentum is a highly vascularized tissue and its collagenous fibrillar ECM is rich with sulphated GAGs and adhesive proteins. The ability to easily remove parts of this tissue without adversely affecting the patient's health, and the quick and simple decellularization process allow its use as an autologous scaffold for tissue engineering and regenerative medicine.

In this study, the present inventors investigated the ability of the omentum matrix to serve as a scaffold for inducing functional assembly of vascularized heart patches. Cells were efficiently removed from the fatty tissue while preserving the underlying matrix. The diameter of the collagen fibers comprising the matrix ranged between 150 nm to several micrometers. A matrix composed of such fibers may serve as an appropriate scaffold for engineering cardiac tissues, as these dimensions are in accordance with the endomysial and perimysial fibers of the native cardiac matrix, wrapping individual cardiomyocytes and cell bundles, respectively.

As in the myocardium, the omentum matrix is mainly composed of fibrilar collagen types I and III network. The matrix is also composed of collagen types IV and VI, found in the basement membrane of blood vessels, suggesting that the basic infrastructure of the vessels was preserved during the decellularization process.

The omental matrix also contained sulfated GAGs. These molecules may be useful for storage and release of heparin-binding GF into the cell microenvironment, promoting physiological processes such as cardioprotection, cell migration and vascularization. Recently it was shown that efficient controlled release of VEGF into the microenvironment of an engineered cardiac tissue was able to promote rapid vascularization after patch implantation. Therefore, the ability to utilize the preserved GAGs for releasing such factors is beneficial for integration of the engineered tissue with the host after transplantation. Prevascularization of the cardiac patch would allow quick anastomosis between the engineered blood vessels and the host vasculature, significantly shortening the time the tissue is left without oxygen and nutrients, and therefore may improve graft viability.

A prerequisite from matrices for cardiac tissue engineering is to withstand the physiological working conditions of the heart. The stress-relaxation assay revealed that the decellularized omentum matrix exhibited similar behavior to that reported for the native heart. The scaffolds exhibited low energy dissipation (reduced hysteresis) during cyclic loading, suggesting that the obtained scaffolds can withdraw physiological cyclic loading. The strain to break assay revealed that both the omental and cardiac ECM had initial failure at 20% stretch, suggesting a potential to withstand physiological strain (i.e. <20%) after transplantation.

The topographical, biochemical, and mechanical signals provided by the omentum matrix maintained cardiac cell viability throughout the cultivation period. The slight elevation in XTT values throughout the cultivation period may be attributed to the proliferation of cardiac fibroblasts within the scaffold. Massive staining of troponin I and sarcomeric α-actinin could be observed in cells comprising the patch as early as 3 days post seeding. These markers are associated with muscle contraction, therefore suggesting a strong contraction potential. SEM images revealed that the cardiac cells interacted with collagen fibers, and obtained elongated and aligned morphology in distinct planes of the scaffolds. The porosity level of the scaffolds was decreased, probably due to high secretion rate of ECM proteins by cardio fibroblasts. Overall these molecular features were responsible for a strong contraction force of the omentum matrix-based cardiac patches. Contractility studies revealed no significant difference between cardiac tissues engineered within an omentum or heart matrices. In the absence of a functional difference between these matrices the omentum has an advantage for engineering personalized cardiac patches.

Another critical issue in cardiac patches for regenerative medicine is the ability of the biomaterial to induce the formation of blood vessel networks. On day 3 after endothelial cell seeding, the cells organized into tube-like structures on collagen IV fibers within the matrix, indicating initial formation of blood vessel networks. Endothelial cells were further co-cultured with cardiac cells and on day 7 assembled into tube-like structures without affecting the contraction ability of the patch. Such prevascularization of a cardiac patch may promote rapid anastomosis with the host blood vessel network, allowing proper oxygen and nutrients transfer to the graft and maintenance of cell viability.

The omentum matrix can be harvested from patients and used to efficiently maintain autologous cell viability. MSCs have been previously shown to have a therapeutic effect on the infarcted heart both when MSC-based engineered tissues were implanted or when the cells were injected directly into the infarct. Here, the present inventors have shown that the omentum matrix is able to support MSCs culture and proliferation. Furthermore, the omentum matrix was able to maintain the undifferentiated phenotype of iPS cells without the use of feeder layer cells. The potential of these cells to differentiate to contracting cardiomyocytes was previously reported, therefore their combination with the omental matrix represents a platform for engineering functional and personalized cardiac patches for post infarct transplantation.

Example 2

Comparison of Decellularization Protocols

Materials and Methods

Two different porcine omentums were obtained from the institute of animal research in Kibutz Lahav, Israel. The fresh tissues were washed with phosphate buffered saline (PBS) in order to deplete blood and debris. Then, each organ was divided into five 30-50 g pieces. Each piece from each omentum was treated with a different protocol for decellularization. Overall, every decellularization protocol was conducted on two different omenta. After weighing the decellularized tissues, the samples were kept frozen for further analysis. Five different decellularization methods were investigated. All steps of incubations and washes were obtained at room temperature on an orbital shaker unless noted otherwise.

Protocol #1. Fresh omentum was agitated for 1 h in a hypotonic buffer of 10 mM Tris 5 mM Ethylenediaminetetraacetic acid (EDTA) and 1 µM phenylmethanesulfonyl-fluoride (PMSF) at pH 8.0. Next, the tissue went through three cycles of freezing (−80° C.) and thawing (37° C.) using the same buffer. After the last thawing the tissue was dehydrated by washing it once with 70% ethanol for 30 min and three times in 100% ethanol for 30 min each. Then the polar lipids of the tissue were extracted by three 30 min washes of 100% acetone. Finely the apolar lipids were extracted by 24 h incubation in a 60/40 (v/v) hexane:acetone solution (with 3 changes). The defatted tissue was rehydrated by one 30 min wash in 100% ethanol and overnight incubation in 70% ethanol at 4° C. Then the tissue was washed four times with PBS at pH 7.4 and was incubated in 0.25% Trypsin-EDTA (Biological Industries, Kibbutz Beit-Haemek, Israel) solution overnight. The tissue was then washed thoroughly with PBS and then with 50 mM Tris buffer with 1 mM $MgCl_2$ at pH 8.0 for 30 min. Following, the tissue was gently agitated in a nucleic degradation solution of 50 mM Tris, 1 mM $MgCl_2$, 0.1% bovine serum albumin (BSA) and 40 units/mL Benzonase® nuclease (Novagen. Madison, WI) at pH 8.0 for 20 h at 37° C. Finally the tissue was washed with 50 mM Tris 1% triton-X100 solution at pH8.0 for 1 h. The decellularized tissue was washed once with 50 mM Tris at pH 8.0, three times with PBS and three times with double distilled water. The decellularized tissue was frozen (−20° C.) and lyophilized.

Protocol #2. Fresh omentum was agitated for 1 h in a hypotonic buffer of 10 mM Tris 5 mM EDTA and 1 µM PMSF at pH 8.0. Then the tissue went through one cycle of freezing (−80° C.) and thawing (37° C.) using the same buffer. The tissue was dehydrated by washing it once with 70% ethanol for 30 min and three times in 100% ethanol for 30 min each. Then the polar lipids of the tissue were extracted by three 30 min washes of 100% isopropanol. Finely the apolar lipids were extracted by 24 h incubation in a 60/40 (v/v) hexane:isopropanol solution (with three changes). The defatted tissue was rehydrated by one 30 min wash in 100% ethanol and overnight incubation in 70% ethanol at 4° C. Then the tissue was washed 4 times with PBS at pH 7.4 and was incubated in 0.25% Trypsin-EDTA solution for 1 h at 37° C. The tissue was then washed thoroughly with PBS and then with 50 mM Tris buffer with 1 mM $MgCl_2$ and 1% triton-X100 at pH 8.0 for 1 h. The tissue was washed twice in a 50 mM Tris-1 mM $MgCl_2$ at pH 8.0 for 30 min each. Then the tissue was gently agitated in a nucleic degradation solution of 50 mM Tris 1 mM $MgCl_2$ 0.1% BSA and 40 units/mL Benzonase® nuclease at pH 8.0 for 20 h at 37° C. Finally the tissue was washed with 50 mM Tris 1% triton-X100 solution at pH 8.0 for 1 h. The decellularized tissue was washed once with 50 mM Tris at pH 8.0, three times with PBS and three times with double distilled water. The decellularized tissue was frozen (−20° C.) and lyophilized.

Protocol #3. Fresh omentum was agitated for 24 h in a hypotonic buffer of 10 mM Tris 5 mM EDTA and 1 µM PMSF at pH8.0 (with 3 changes). The tissue was dehydrated by washing it once with 70% ethanol for 30 min and 3 washes of 100% ethanol for 30 min each. Then the tissue was incubated for 24 h in 100% acetone (with 3 changes) for lipid extraction. The tissue was rehydrated by one 30 min wash in 100% ethanol and overnight incubation in 70% ethanol at 4° C. Then the tissue was washed four times with PBS at pH 7.4 and then incubated for 2 h in the hypotonic solution. The tissue was further processed with 1% SDS solution for 24 h (with 2 changes) following two 2 h incubations in 2.5 mM sodium deoxycholate in PBS. The tissue was dehydrated again, incubated for 24 h in 100% acetone and rehydrated. Then the tissue was treated again with the hypotonic buffer for 2 h followed by 24 h in 1% SDS and two 2 h incubations in 2.5 mM sodium deoxycholate. The tissue was then washed thoroughly with PBS and then with 50 mM Tris-1 mM $MgCl_2$ at pH 8.0 for 1 h. The tissue was gently agitated in a nucleic degradation solution of 50 mM Tris 1 mM $MgCl_2$ 0.1% BSA and 40 units/mL Benzonase® nuclease at pH 8.0 for 20 h at 37° C. Finally the tissue was washed twice with 50 mM Tris at pH 8.0 (1 h each), three times with PBS and three times with double distilled water. The decellularized tissue was frozen (−20° C.) and lyophilized.

Protocol #4. Fresh omentum was first treated exactly as in protocol #3, only with one cycle of fat extraction with 100% acetone. After the nucleic degradation step the tissue was dehydrated by washing it once with 70% ethanol for 30 min and 3 washes of 100% ethanol for 30 min each. Following, the tissue was washed 3 times in 100% acetone. Finely the apolar lipids were extracted by 24 h incubation in a 60/40 (v/v) hexane:acetone solution (with 3 changes). The defatted tissue was rehydrated by one 30 min wash in 100% ethanol and 30 min wash in 70% ethanol at 4° C. The processed tissue was then washed three times with PBS and three times with double distilled water. The decellularized tissue was frozen (−20° C.) and lyophilized.

Protocol #5. Fresh omentum was dehydrated by washing it once with 70% ethanol for 30 min and three washes of 100% ethanol for 30 min each. Then the tissue was washed three times with 100% acetone for 1 h and once with 50/50 (v/v) acetone:hexane solution. The tissue was incubated for 24 h in 20/80 (v/v) acetone:hexane solution (with three changes) for lipid extraction. The tissue was rehydrated by one 30 min wash in 100% ethanol and overnight incubation in 70% ethanol at 4° C. The defatted tissue was washed with 50 mM Tris buffer with 1 mM $MgCl_2$ and 1% triton-X100 at pH 7.4 for 30 min and then was incubated for 20 h in a fresh solution that contains 40 units/mL Benzonase® nuclease. Next the tissue was washed twice with 50 mM Tris 5 mM $MgCl_2$ and 1% Triton-X100 at pH 7.4 for 2 h, and then for 1 h in 1 M NaCl 20 mM EDTA and 0.2% Triton-X100 at pH7.0. Finally the tissue was washed with double distilled water and was stored in 70% ethanol at 4° C.

Assessing Remaining Lipids:

20 mg of dried samples from the tissues that were processed by each method were digested in 1 ml digestion solution containing 1.7 mg/ml papain for 4 hours at 65° C. The digested samples were centrifuged, so that the fatty components of the digested tissues remained at the top of the tubes and were investigated.

DNA Staining and Quantification:

Small pieces from the processed tissues were stained with 5 μg/ml Hoechst for nucleic acids detection for 3 minutes and then washed thoroughly with PBS. The samples were observed under a fluorescent microscope. DNA was extracted from three random dry samples (25-30 mg) of the native and decellularized tissues using DNeasy Blood & Tissue Kit (Qiagen, Hilden, Germany) according to the manual guide. The obtained DNA was quantified by measurements of the O.D at 260 nm wavelength using spectrophotometer (Nanodrop 1000, Thermo Scientific).

Sulfated Glycosaminoglycan Quantification:

The Sulfated glycosaminoglycans (GAGs) in the processed tissues were quantified using the Blyscan sulfated GAG assay kit (Biocolor Ltd.) Dried samples from the processed tissues of each omentum were digested in a digestion solution containing 1.7 mg/ml papain for 4 hours at 65° C. The digested samples were centrifuged and the supernatant was tested following the manufacturer's protocol. Each assay was performed in duplicate (overall there were four repeats for every method; two from each omentum).

Histology:

Samples from the native and the processed tissues (of the same animal) were fixed in formalin and embedded in paraffin. Sections of 5 μm were obtained and affixed to X-tra® adhesive glass slides (Leica Biosystems). The slides were stained with hematoxylin and eosin (H&E) in order to confirm decellularization and with Alcian-blue and Fast-red for GAG imaging.

Scanning Electron Microscopy:

For scanning electron microscope (SEM) imaging, punches from each scaffold that contained both translucid and fatted areas were selected. Processed tissues from the same animal were fixed with 2.5% glutaraldehyde in 0.2M phosphate buffer at pH 7.4 for 2 hours. Then the tissues were dehydrated using a graded series of ethanol-water solutions (50%-100%). Finally the samples were critical point dried and sputter coated with gold before observed under scanning electron microscope (Jeol JSM840A). The properties of the fibers and pores of the scaffolds were measured from five different photos for each method using ImageJ program.

Fibroblast Viability Assessment:

In order to assess the biocompatibility of the processed tissues, 8 mm scaffolds were obtained from each method for incubation with NIH-3T3 cells that were stably transfected with a plasmid DNA encoding for enhanced green fluorescent protein (EGFP). The scaffolds were sterilized by UV light for 2 hours. $10^5$ cells were seeded on each scaffold or on empty wells for positive control in triplicates for each time point that was measured. The scaffolds were washed once and then incubated in Dulbecco's modified Eagle's medium (DMEM) supplemented with fetal bovine serum and antibiotic mixture. The scaffolds were observed under a fluorescent microscope for imaging. The viability of the cells was measured using XTT cell proliferation assay kit (ATCC) according to the manufacturer's instructions. Briefly, the cell containing scaffolds were incubated with the XTT reagent for 10 hours in 37° C. The scaffolds were removed and the optical density of the medium was measured at 450 nm and 630 nm. All the scaffolds were the products of the same omentum.

Cardiomyocytes culture: Neonatal ventricle myocytes (taken from 1- to 3-day-old Sprague-Dawley rats) were isolated using 6-7 cycles of enzyme digestion, as previously described. Briefly, left ventricles were harvested, minced and cells were isolated using enzymatic digestion with collagenase type II (95 U/mL; Worthington. Lakewood, NJ) and pancreatin (0.6 mg/mL) in DMEM. After each round of digestion cells were centrifuged (600 g, 4° C. 5 min) and re-suspended in culture medium composed of M-199 supplemented with 0.6 mM $CuSO_4.5H_2O$, 0.5 mM $ZnSO_4.7H_2O$, 1.5 mM vitamin B12, 500 U/mL penicillin (Biological Industries) and 100 mg/mL streptomycin (Biological Industries), and 0.5% (v/v) FBS. To enrich the cardiomyocytes population, cells were suspended in culture medium with 5% FBS and pre-plated twice for 30 mins. Cell number and viability was determined by hemocytometer and trypan blue exclusion assay. Cardiac cells ($5\times10^5$) were seeded onto 5 mm diameter scaffolds by adding 10 μl of the suspended cells, followed by 40 min incubation period (37° C. 5% $CO_2$). Following, cell constructs were supplemented with culture medium (with 5% FBS) for further incubation.

Immunostaining: Cardiac cell constructs were fixed and permeabilized in 100% cold methanol for 10 min. washed three times in DMEM-based buffer and then blocked for 1 h at room temperature in DMEM-based buffer containing 2% FBS, after which the samples were washed three times with PBS. The samples were then incubated with primary antibodies to detect α-sarcomeric actinin (1:750, Sigma), washed three times and incubated for 1 h with Alexa Fluor 647 conjugated goat anti-mouse antibody (1:500; Jackson. West Grove, PA USA). For nuclei detection, the cells were incubated for 3 min with 5 μg/ml Hoechst 33258 and washed three times. Samples were visualized using an inverted fluorescence microscope (Nikon Eclipse TI). All the scaffolds were the products of the same omentum.

Statistical analysis: Statistical analysis data are presented as average±standard error. Differences between the groups were assessed with one way ANOVA followed by Tukey post hoc test. All analyses were performed using GraphPad Prism version 5.00 for Windows (GraphPad Software). P<0.05 was considered significant. NS denotes P>0.05. * denotes P<0.05,  denotes P<0.01. * denotes p<0.001.

Results and Discussion

In order to obtain decellularized scaffolds which are suitable for engineering functional tissues, two main conditions must be kept. First, it is crucial that cells and DNA fragments are removed from the matrix to prevent both toxicity in vitro and immune response after transplantation. The second goal is preservation of the essential biomolecules of the ECM, including collagen fibers. GAGs, and adhesion proteins.

The omentum is a highly vascularized, double sheet of peritoneum that extends from the greater curvature of the stomach overlying most abdominal organ. It has a unique cellular and extracellular composition, containing adipocytes that are embedded in a well vascularized connective tissue and a translucent region that includes mesothelial cells and collagen.

After processing the tissue with five protocols, the present inventors sought to evaluate the effect of the different protocols on cell removal and ECM preservation (see Table 1 herein below and Materials and Methods).

TABLE 1

| Protocol#5 | Protocol#4 | Protocol#3 | Protocol#2 | Protocol#1 | Step |
|---|---|---|---|---|---|
| X | 10 mM tris + 5 mM EDTA + 1 uM PMSF pH 8.0 - 1 h X2 and overnight | 10 mM tris + 5 mM EDTA + 1 uM PMSF pH 8.0 - 1 h X2 and overnight | 10 mM tris + 5 mM EDTA + 1 uM PMSF pH 8.0 - 1 h | 10 mM tris + 5 mM EDTA + 1 uM PMSF pH 8.0 - 1 h | Hypotonic shock |
| X | X | X | In hypotonic buffer, -20*C. to -80*C. to 37*C. | In hypotonic buffer, -80*C. to 37*C. X3 | Freeze-thaw |
| 70% ethanol 100% ethanol X3 Acetone X3 50:50 acetone:hexane 20:80 acetone:hexane - 24 h | 70% ethanol 100% ethanol X3 Acetone - 24 h | 70% ethanol 100% ethanol X3 Acetone - 24 h | 70% ethanol 100% ethanol X3 Isopropanol X3 40:60 isopropanol:hexane - 24 h | 70% ethanol 100% ethanol X3 Acetone X3 40:60 acetone:hexane - 24 h | Dehydration / Fat extraction |
| 70% ethanol | 100% ethanol 70% ethanol | 100% ethanol 70% ethanol | 100% ethanol 70% ethanol | 100% ethanol 70% ethanol | Rehydration |
| 50 mM tris + 1% MgCl2 + 1% triton pH 7.4 - 30 min | 10 mM tris + 5 mM EDTA - 2 h 1% SDS in ddw - 24 h 2.5 mM Sodium deoxycholate in PBS - 2 h X2 | 10 mM tris + 5 mM EDTA - 2 h 1% SDS in ddw - 24 h 2.5 mM Sodium deoxycholate in PBS - 2 h X2 | Trypsin 1 h at 37*C. 50 mM tris + 1 mM MgCl2 + 1% Triton pH 8.0 - 1 h | Trypsin - overnight at RT | Cell extraction |
| 50 mM tris + 1% MgCl2 + 1% triton pH 7.4 + 41.8 U/ml benzonase - 20 h | 50 mM tris + 1 mM MgCl2 pH 8.0 - 30 min 50 mM tris + 1 mM MgCl2 + 0.1% BSA + 40 U/ml benzonase - 20 h at 37*C. | 50 mM tris + 1 mM MgCl2 pH 8.0 - 30 min X2 50 mM tris + 1 mM MgCl2 + 0.1% BSA + 40 U/ml benzonase - 20 h at 37*C. | 50 mM tris + 1 mM MgCl2 pH 8.0 - 30 min X2 50 mM tris + 1 mM MgCl2 + 0.1% BSA + 40 U/ml benzonase - 20 h at 37*C. | 50 mM tris + 1 mM MgCl2 pH 8.0 - 30 min 50 mM tris + 1 mM MgCl2 + 0.1% BSA + 40 U/ml benzonase - 20 h at 37*C. | Nucleic degradation |
| 50 mM tris + 5 mM MgCl2 + 1% triton pH 7.4 - 2 h X2 1M NaCl + 20 mM EDTA + 0.2% triton pH 7.0 - 1 h Ddw X4 | 50 mM tris + 1% triton - 1 h 50 mM tris * Second fat extraction step: Dehydration Acetone X3 40:60 acetone:hexane - 24 h Rehydration PBS X3 Ddw X3 | 50 mM tris + 1% triton - 1 h 50 mM tris PBS X3 Ddw X3 | 50 mM tris + 1% triton - 1 h 50 mM tris PBS X3 Ddw X3 | 50 mM tris + 1% triton - 1 h 50 mM tris PBS X3 Ddw X3 | Continuing cell extraction and washing |
| X | Freezing at -20*C. Lyophilizing | Freezing at -20*C. Lyophilizing | Freezing at -20*C. Lyophilizing | Freezing at -20*C. Lyophilizing | Lyophilization |

The first protocol was developed in order to maximize elimination of cellular components without considering the preservation of the ECM and therefore was the most aggressive. The protocol combined mechanical, physical, chemical and biological approaches for decellularization. Protocol 2 was designed to reduce the damages to the ECM obtained by protocol 1. It constituted the same steps of protocol 1, however several of the steps were less aggressive. For example, the trypsin digestion step was shorter, and the fat extraction step was conducted with isopropanol which is less reactive than the acetone used in protocol 1. Protocols 3 and 4 were based mostly on detergent and osmotic pressure for decellularization in order to further reduce the damages to the ECM, and differ from each other by the fat extraction step. For the fat extraction step in protocol 4, the use of the a-polar solvent hexane in order to also dissolve the a-polar lipids in the tissue was added, whereas in protocol 3 only the polar solvent acetone was used. Finally, in protocol 5 the decellularization started with fat extraction that was followed by nucleic acid degradation and a short exposure to hypertonic environment and ionic detergent that was meant to disrupt cellular membranes.

Macroscopic Structure

The macroscopic effect of the different protocols is shown in FIGS. 10A-10C. Protocol 1, which involved 3 cycles of freezing and thawing and a long protease digestion led to the disruption of the omental macrostructure (FIG. 10A). Protocol 2 involved only one cycle of freezing and thawing and 1 h of protease digestion. As shown, this protocol resulted in less disrupted macrostructure. Protocol 3 involved longer hypotonic treatment and use of the anionic surfactant SDS which lyses cells. As shown in FIG. 10A, the natural structure was conserved, and the blood vessel infrastructure could be easily detected. However, fatty tissue could still be observed around the blood vessels. To efficiently remove the fat from the tissues hexane was added, an a-polar solvent (protocol 4). As shown, addition of this step resulted in a better removal of the fatty tissue. The cell extraction steps in protocol 5 mainly relied on the use of the nonionic detergent triton X-100 and a short exposure to hypertonic environment which causes cell lysis due to water flow out. The obtained structure resembled the structure of the native tissue. However, the yellow color of the tissue suggested the existence of cell components at the end of the process.

Lipid extraction: Another indication for the efficiency of fat extraction was the visual detection of lipids that are extracted from the tissues after enzymatic digestion (FIG. 10B). As shown in FIG. 10B, a lipid phase was not detected in the tissues that were processed by protocols 1, 4 and 5. As expected, since the tissue was treated only with acetone for fat extraction the a-polar lipids were not dissolved and high lipid content was detected in the tissue that was processed by protocol 3. Furthermore a relatively high lipid content after treating the tissue with protocol 2 was found, indicating that the combination of acetone and hexane (protocols 1, 4, 5) is more efficient than the use of isopropanol and hexane (protocol 2). That observation may be attributed to the fact that the ketone group in acetone is more reactive than the hydroxyl in isopropanol.

Mass reduction: The present inventors next sought to evaluate the efficiency of decellularization process by tissue mass reduction. As shown in FIG. 10C all decellularization protocols yielded a significant reduction in tissue mass, which occurred after the fat depletion step. Protocols 1, 2, and 5 combined the use of a polar solvent (i.e. acetone or isopropanol) with the a-polar solvent hexane. The percentages of the remaining wet masses after the fat depletion step for those protocols were 37.4±2.6, 35.8±2.5 and 36.0±0.32 of the initial mass, respectively. The first fat extraction step in protocol 3 and 4 was conducted with acetone only, therefore the a-polar lipids did not dissolve, and the remaining mass percentages were 58.9±7.7 and 55.3±8.7 respectively. The second fat extraction process in protocol 4 involved hexane and therefore resulted in an efficient extraction of the remaining lipids and a further 36.8% wet mass reduction from the initial weight. However, in protocol 3, the last decellularization steps (detergent treatments and nucleic digestion by nuclease) have yielded only 12.7% reduction in wet mass. In protocols 1, 2 and 4 the steps following the fat extraction have yielded further significant mass reduction, indicating that more components have been removed from the tissues. The lack of mass reduction in protocol 5 indicated that the processes that followed the fat extraction step (triton X-100 processing and a short hypertonic treatment) had minimal contribution to the decellularization process.

While investigating the dry masses of the processed tissues it was expected that similar percentages of mass reduction would be obtained compared with the wet mass loss. However, the dry mass assessments revealed that all protocols induced higher mass reduction than the observed wet mass loss. This phenomenon can be attributed to the increase in water absorbance of the processed tissues. The remaining wet masses after treating the tissues with protocols 1-5 were 19.83±1.37, 16.91±0.73, 46.19±2.29, 18.5±1.5 and 35.15±1.22. However, as shown in FIG. 10D, the remaining dry masses after treating the tissues with protocols 1-5 were only 2.74%±0.19, 4.75%±0.21, 13.08%±0.649, 5.28%±0.43 and 4.74±0.164 respectively. Interestingly, the results revealed that protocol 1 resulted in higher dry mass reduction than protocols 2 and 4, although the wet mass reduction of these protocols was similar. That observation indicated that protocol 1 has eliminated more components from the tissue, while resulting in a more water absorbing matrix.

The ratio between the wet mass and the dry mass of the scaffold indicated its ability to absorb water. As shown in FIG. 10E all protocols resulted in an increase of water absorbance compared with the native tissue, however a significantly higher absorption was found after treating the tissues with protocols 1 and 5. This can be attributed to a decrease in hydrophobic components such as lipids and an increase in the concentration of water absorbing ECM components, such as GAGs and collagens.

Cell Removal

The efficiency of cells and nucleic acids removal was evaluated. The decellularized matrices were stained for nucleic acids by Hoechst 33258 or nuclei and cytoplasm by H&E (FIGS. 11A and 11B, respectively). Furthermore, the residual DNA in the matrices was quantified. As shown in FIG. 11A, a negligible Hoechst staining was detected after processing the tissues with protocols 1, 3 and 4. Treating the tissues with protocols 2 and 5 resulted in no intact nuclei; however, the nucleic acids were not removed efficiently, indicating that the nucleases could not access efficiently into the cells.

Residual DNA quantification revealed a significant reduction in DNA by all of the protocols (less than 100 ng DNA per mg dry tissue). Protocols 1-3 resulted in less than 50 ng DNA per mg dry tissue, which may be considered as completely decellularized scaffolds. Protocols 4 and 5 resulted in higher DNA content. Comparing the staining results of the scaffolds that were obtained by protocols 4 and 5 suggests that the remaining DNA was probably more degraded in protocol 4 than the DNA that remained with protocol 5, and therefore it could not be detected under the microscope.

Accordingly, H&E staining revealed cells and nuclei presence in the matrix processed by protocol 5, further supporting the assumption that DNA was not efficiently degraded by that protocol. H&E staining of the matrices processed by protocols 1-4 revealed no cell debris.

The histological cuts also revealed differences in the morphologies of the processed tissues. The morphology of the native adipose tissue resembles a honeycomb structure due to the large adipocytes loaded with fat. In all of the processed tissues that underwent fat extraction with apolar and polar solvents (i.e, protocols 1, 2, 4 and 5), the absence of lipids resulted in morphology changes. The fact that the structure of the matrix obtained by protocol 3 is still similar to that of the native tissue further supports the claim that a polar solvent alone is not sufficient for fat removal. Examination of the morphologies obtained by protocols 1, 2 and 4 revealed that protocol 1 was indeed more destructive to the ECM than protocol 2. That observation suggests that shorter trypsin digestion or less freezing and thawing cycles are less disruptive to the ECM. In addition, both protocols resulted in more ECM damage than protocol 4. This suggests that a treatment that includes freezing and thawing and trypsin digestion is more disruptive to the ECM than decellularization with tonicity and mild detergents.

Gag content: GAGs are long unbranched polysaccharides that are major components of the ECM. GAGs have numerous biological activities, namely they promote cell adhesion, control and regulate cell growth, and induce proliferation. The high negative charge of the sulfated GAGs promotes electrostatic interactions with many growth factors and cytokines, providing their preservation and controlled release into the cellular microenvironment. Therefore, the preservation of GAG content within the matrix may be beneficial for engineering complex tissues. To qualitatively assess GAG content at the end of the decellularization process. Alcian blue staining was used. FIG. 12A revealed that all the treatments preserved GAGs to some extent, however massive Alciane blue staining was detected after processing the tissue with protocol 5. That observation suggests that fat extraction with hexane and acetone followed by nuclease treatment and mild detergents and hypertonic treatments led to less damage to the GAGs than the other cell extracting steps, such as trypsin digestion, continuous agitation in detergents or freezing and thawing. However, these processes resulted in more efficient cell removal. Overall it was noticed that the GAGs were better preserved by the processes that did not involve trypsin digestion (i.e. protocols 3-5). It was found that cell removal and lipid extraction steps condensed the decellularized tissues. Therefore, the processed tissues exhibited stronger staining as compared to the native omentum.

The present inventors next sought to quantify the remaining sulfated GAGs (FIG. 12B). Using Blyscan assay, it was found that prior to decellularization the native tissue contained 0.59 µg±0.13 sulfated GAGs per mg dry tissue. As a result of the decellularization and fat extraction, the ECM content per mg tissue increased. Consequently, the content of the sulfated GAGs in the processed tissues was higher than in the native tissue. FIG. 12B revealed the amount of sulfated GAGs per mg after processing by protocols 1-5. The amount of sulfated GAGs per mg dry tissue in the matrix obtained by protocol 3 was significantly lower than in the matrix obtained by protocol 4 due to the high lipid content, which diluted other ECM components. The sulfated GAG contents in protocols 4 and 5 were significantly higher than in protocols 1 and 2. Overall, these results may suggest that the combination of detergents and tonicity is less destructive for GAGs in the ECM as compared to trypsin digestion and freezing and thawing.

Matrix morphology: The internal morphology of the matrix can dictate the growth and assembly of the engineered tissue. Therefore, the present inventors next sought to evaluate the morphology of the matrices by SEM. As shown in FIGS. 13A-13C, the different decellularization processes resulted in distinct matrix morphology. The matrix obtained by protocol 1 had a relatively small average fibers diameter (1.1 µm±0.087), and the mean pore area of that matrix was significantly the largest (975.6 µm$^2$±112.5, P<0.05). While protocols 2-4 resulted in an average fiber diameter at the same range, protocol 5 resulted in significantly higher diameter fibers (2.464 µm±0.104; P<0.0005). Since not all cell components were efficiently removed by protocol 5, the obtained pores were smaller (389.6 µm$^2$±41.63). Protocols 2 and 3 have yielded matrices with two regions, similar to the native tissue. Due to the poor fat removal, the fatty area was covered with lipids and therefore was not porous; however the translucent area was more fibrous and therefore had more open space. Overall the mean pore area of the matrices obtained by protocols 2 and 3 were relatively small (184.3 µm$^2$±22.14 and 260.3 µm$^2$±68.6, P<0.05 respectively). The matrix obtained by protocol 4 had a pore area of 619.1 µm$^2$±107.2, significantly higher than the pore area obtained by protocols 2 and 3. Overall, the average pore size was significantly smaller than the values obtained with protocol 1.

All the decellularized matrices exhibited fiber diameter of about 1-2 µm, similar to that of collagen fibers that are abundant in the ECM of the omentum Protocols 1, 4 and 5 resulted in scaffolds with large pores, and therefore may be more appropriate for tissue engineering.

Cell adhesion and viability: Cell-matrix interactions are essential for engineering homogenous tissues. The present inventors next sought to evaluate the ability of cells to adhere to the different scaffolds. NIH 3T3 cells were mixed with culture medium and seeded on the scaffolds with a single droplet. Three hours post-seeding (defined as day 0) the cell constructs were washed carefully and the existence of viable cells in the scaffolds was assessed using XTT metabolic assay. As shown in FIG. 14, significantly higher number of viable cells was detected within the scaffolds obtained by protocol 1 as compared to scaffolds obtained by all other protocols. Very few viable cells were detected in scaffolds obtained by protocol 5. This may be attributed to the inefficient decellularization process and the existence of toxic cellular materials remaining within the scaffold.

The present inventors then evaluated the proliferation of EGFP expressing fibroblasts in the different scaffolds. FIG. 15A shows fluorescence images of fibroblast in the different scaffolds on day 2 (upper panel) and day 8 (lower panel). As shown, higher cell concentrations were observed in scaffolds obtained by protocols 1, 2 and 4, as compared to scaffolds prepared by protocols 3 and 5. To quantify cell growth over the culture period we used XTT assay. A significant increase by day 8 in the average O.D at 450 nm in scaffolds obtained by protocols 1, 2 and 4 was noted, while limited expansion rate was observed in scaffolds obtained by protocols 3 and 5 (FIG. 15B). Although similar O.D was observed at day 8 in protocols 1, 2 and 4, considering the initial low number of attached cells in protocol 4, the proliferation rate in these scaffolds was higher than that of scaffolds obtained by protocols 1 and 2. Similarly, the limited proliferation rate observed in scaffolds obtained by protocol 5 may be attributed to the initial lower cell attachment. Therefore it was concluded that scaffolds obtained by protocol 5 are not appropriate for tissue engineering. The high water absorbance of scaffolds obtained by protocol 1 is probably related to the high capacity of cell attachment. Due to the high adhesion observed, these scaffolds may be suitable for culturing cells with limited or no proliferation potential, such as cardiomyocytes.

Cell organization and tissue assembly: The present inventors next sought to assess the potential of the decellularized matrices to serve as scaffolds directing functional assembly of cardiac tissues. In cardiac tissue engineering, an optimal scaffolding material should promote elongation and alignment of the cultured cells, and direct their organization into functional cardiac patches generating strong contraction forces. To assess cardiac cell organization within the scaffolds, cells were isolated from ventricles of neonatal rats and seeded on the different matrices as described. Immunostaining of cardiomyocytes with antibodies against sarcomeric actinin revealed distinct morphologies within the different scaffolds. While decellularization protocols 3-5 resulted in rounded cells with limited actinin striation, cells seeded within scaffolds obtained by protocols 1 and 2 showed elongated morphology. Furthermore, massive and organized actinin expression was observed in these cultures. Analysis for cardiomyocyte elongation revealed significantly higher aspect ratio in cells cultured on matrices obtained by protocol 1 and 2 as compared to matrices obtained by protocols 3-5 (FIG. 16B). Higher aspect ratio may lead to anisotropic contraction of cardiac patches.

Conclusions

Here, the present inventors have optimized the decellularization process assessing cell removal efficiency, biochemical content and matrix morphology. They also evaluated the effect of the different parameters on seeded cell viability and proliferation, and on the assembly of cardiac tissues. It was shown that several of the investigated decellularization protocols were not efficient. For example the use of acetone for fat removal is not sufficient by itself (protocol 3), and a short exposure to hypertonic tension and mild detergents for cell removal is not efficient at all (protocol 5). It may be concluded that aggressive processing of the omentum, such as trypsin digestion and freezing and thawing result in a complete a-cellular matrix that is compatible for cell culture and tissue assembly. Nevertheless, the tissues that were processed by milder conditions such as detergents and osmotic pressure resulted in scaffolds that better resemble the native tissue, indicating that many ECM components were intact. Furthermore, all lipids must be extracted from the tissue in order to induce cell attachment, maintain cell viability and promote proper assembly of cells to tissues.

Example 3

Omentum-Based Matrix for Engineering Autologous Vascularized Cardiac Tissues

1. Decellularization of Omentum for Matrix Preparation

Omenta of healthy six month old pigs were purchased from the institute of animal research in Kibutz Lahav, Israel. The omentum was treated to the following decellularization protocol involving mechanical rupture, polar solvent extraction, and enzymatic digestion. All the following actions were made under constant shaking at RT unless described otherwise.

Frozen omentum (−20° C.) was slowly heated to room temperature and sliced into four pieces. In order to separate the cells, the tissues were transferred to hypotonic buffer solution containing 10 mM Tris base, 5 mM ethylenediaminetetraacetic acid (EDTA) and 1 µM phenylmethylsulfonyl fluoride (PMSF) at pH 8.0 twice for one hour and then overnight. The following day, the tissues were rinsed in 70% ethanol for 30 min and twice in 100% ethanol (30 min each), then the polar lipids of the tissue were extracted by three 30 minutes washes of 100% acetone. In the next 24 hours the a-polar lipids were extracted by incubation in a 60:40 hexane:acetone solution (with 3 changes), followed by a 30 min 100% ethanol rinse. Subsequently, samples were placed in 70% ethanol overnight at 4° C. The next morning, after 10 min ethanol shake, the tissues were treated again with the hypotonic buffer of 10 mM Tris base and 5 mM EDTA for 2 hour (twice for 1 hour), followed by 16 hours in 0.5% SDS. The tissues were then washed thoroughly twice with PBS for 30 min and then were placed for 30 min in a solution of 50 mM Tris-1 mM $MgCl_2$ at pH 8.0. The tissues were then gently agitated in a nucleic degradation solution of 50 mM Tris, 1 mM $MgCl_2$ 0.1% BSA and 40 units/ml Benzonase® nuclease at pH 8.0 for 20 hours at 37° C. Finally the tissues were washed twice with 50 mM Tris at pH 8.0 (30 min each), once with 70% ethanol for 10-15 min and three times with sterile double distilled water before freezing overnight.

Figure 17B:
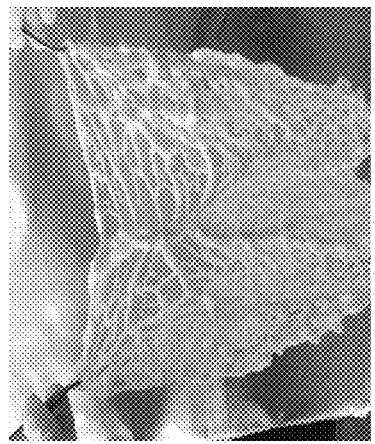
Figure 17D:
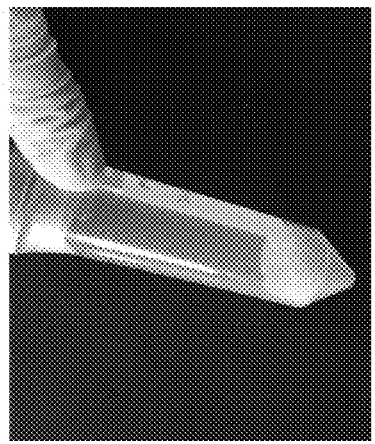
Figure 17A:
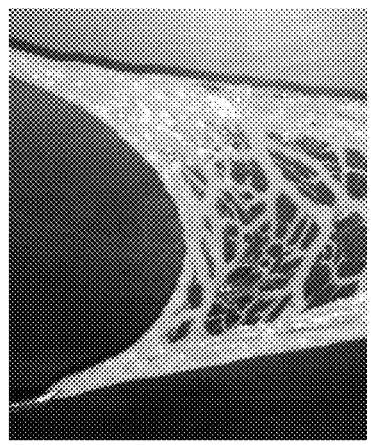
Figure 17C:
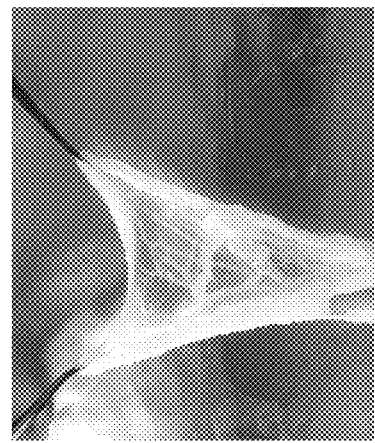

At the end of the decellularization process cellular material was effectively removed, yielding white, translucent omentum ECM (FIG. 17C). The omentum ECM was then lyophilized and milled into a powder (FIG. 17D), and finally solubilized with enzymatic digestion (FIG. 18A).

2. Preparation of Solubilized Omentum ECM

The decellularized omentum was lyophilized, ground into a coarse powder with a IKA Analytical A-11 basic mill and then frozen until further use. Dry, milled omentum matrix was enzymatically digested by adding a 1 mg/ml solution of pepsin in 0.1 M HCl such that the final concentration of matrix was varied between 10 to 20 mg/ml. The omentum matrix was digested for 64-72 hours at room temperature under constant stirring until the liquid was homogenous with no visible particles. Subsequently, the pH was raised above 7 using 5 M NaOH and salt concentration was adjusted using PBS×10. To induce gelation in vitro, the solubilized, neutralized omentum matrix was heated to 37° C. in a humidified incubator with 5% $CO_2$.

Gelation of the omentum biomaterial was first confirmed at physiological conditions of pH 7.4, 1.0×PBS, and 37° C. The extracellular matrix remained a viscous liquid after neutralization to pH 7.4 while kept at 4° C. or RT (FIG. 18A). After the liquid ECM was brought to 37° C. to induce gelation, a gel was created. The gelation was confirmed by observation and maintenance the mold shape (FIG. 18B).

3. Gel Composition Characterization:

3.1 Glycosaminoglycans (GAGs) Analysis Using Blyscan

The GAG content per sample was determined using sulfated Glycosaminoglycan assay kit (Biocolor Ltd.) First, omentum ECM samples (10-20 mg) were digested for 3 h at 65° C. in papain (7.14 µg ml$^{-1}$) in 0.2 M sodium phosphate buffer, 0.1M sodium acetate, 0.01M $Na_2EDTA$, 0.005M cystine HCL. pH 6.4. Once melted, the digested samples were centrifuged for 10 minutes and the supernatant was tested following the manufacturer's protocol. Briefly, 100 µl of digested hydrogel was added to 1 ml Blyscan dye reagent. The solution was mixed and centrifuged. The supernatant was removed and the pellet suspended in 0.5 ml dissociation reagent. 200 μl of this solution was added to each well of a clear 96 well plate and the absorbance measured at a wavelength of 656 nm. GAGs standard (Biocolor Ltd. UK) was used to create a standard curve from which GAGs values for each hydrogel could be calculated.

The total GAG concentration for pepsin digested omentum matrix was 2.27±0.5 μg/mg of dry lyophilized omentum powder (mean±SD).

3.2 Histology

A sample of the liquid omentum pre-gel was allowed to gel for 3 hours before it was frozen. Sections of 7-10 μm were obtained and affixed adhesive to glass slides (Leica Biosystems). The sections were stained with hematoxylin and eosin (H&E) to confirm decellularization.

Results of the histology analysis can be seen in FIG. 19.

3.3. Turbidimetric Gelation Kinetics

Turbidimetric gelation kinetics was determined using spectrophotometric measurements. Liquid omentum ECM pre-gel solution at different concentrations (10 and 15 mg/ml) was added to 48-well plates and read spectrophotometrically in a plate reader pre-heated to 37° C. The samples were kept on ice until placement in the spectrophotometer. Absorbance at 405 nm was measured every 1 min for 3 hours until the data reached plateau. Absorbance values were averaged within each group, normalized, and plotted over time, as illustrated in FIG. 20.

Both hydrogel concentrations have reached absorbance plateau within 3 hours. The 15% concentration hydrogel reached plateau faster than the 10% hydrogel.

3.4 Rheology: Storage Modulus, Loss Modulus

The formation of omentum ECM hydrogel was studied using oscillatory rheometry which measures the storage (G') and loss moduli (G") of the material as a function of shear strain. Rheological methods have been often employed to study the viscoelastic behavior of materials and G' is commonly used as an indication of stiffness of a given viscoelastic material.

Rheological measurements of hydrogels were performed using a stress-control Discovery HR-2 hybrid rheometer. Pre-formed gel (24 hr at 37° C.) were cut using 8 mm hydrogels and subjected to a constant shear stress of 0.63% at a frequency sweep range of 0.04-16 Hz. The complex viscosity in the linear region (from 0.04 up to about 5 Hz) was averaged for each group and plotted (FIG. 21).

An additional experiment was conducted to measure the elastic (G') and loss modulus (G") over time while the pre-gel solution reached plateau due to gelation (FIGS. 22A-22E). Pre-gel solutions were placed from ice on a 37° C. A layer of mineral oil was applied during the experiment to prevent evaporation. The experiment was conducted at 5% strain and 1 Hz.

The elastic modulus in both concentration groups was higher than the loss modulus at all measured time points, including in the beginning and at the end of gelation, suggesting that even the pre-gel solution is a soft gel. The elastic and loss modulus were higher at all times points for the 15% concentration hydrogels.

3.5. Increase in Dry Weight

Hydrogel samples at 15% concentration were formed using 25×20 mm molds for 24 h at 37° C. After, the hydrogel was cut into 8 mm discs and allowed to swell in PBS for 0.5 and 72 hr. The samples were then removed and carefully blotted to remove excess surface liquid. The total swelled weight was measured ($W_s$). After, the samples were frozen and dried using a lyophilizer. Total dry weight was measured ($W_d$). Finally, increase in ratios by weight was calculated as:

Dry weight ratio=$W_s-W_d/W_d$

After 0.5 hr, the dry weight of the swollen hydrogels increased by 50.97±3%. No significant difference in dry weight ratio was observed after 0.5 and 72 hr—see FIG. 23.

3.6. Scanning Electron Microscopy

Scanning electron microscopy (SEM) was used to examine the surface topography of the hydrogel. Formed hydrogels were frozen (−80° C.), lyophilized and sputter coated with gold before observed under scanning electron microscope (Jeol JSM840A). Images are illustrated in FIGS. 24A-24B.

3.7. Statistical Analysis

All values are reported as mean±standard deviation. Univariate differences between the groups will be assessed using Student's t-test. All analyses will be performed using GraphPad Prism version 5.00 for Windows (GraphPad Software), p<0.05 will be considered significant.

3.8. Protein Components of the Hydrogel

The size of proteins and peptides in the hydrogel was determined by protein electrophoresis (SDS-PAGE, 12% acrylamide gel). Proteins and peptides between 250-130 kDa, 230-100 kDa, 100-70 kDa, 70-55 kDa, 55-35 kDa, 35-25 kDa, 25-15 kDa and smaller than 15 kDa were detected, as illustrated in FIG. 25.

3.9. Pore Size

Pore size in the hydrogel was determined using scanning electron microscope. Pore diameter was approximately between 10-180 μm, with pore sizes approximately between 70-18000 μm². An exemplary image of the hydrogel is illustrated in FIGS. 24A-24B.

3.9. Biocompatibility

Hydrogel bio-compatibility was determined using Presto-Blue cell viability assay (molecular probes, Invitrogen). Pre-hydrogel solution was left for 1.5 hr in a humidified cell incubator to solidify. After, 3T3 fibroblast cells were seeded on the established hydrogels. Cell viability was maintained through day 3 and 7 as illustrated in FIG. 26.

Example 4

Hydrogel Comprising Decellularized Omentum

Materials and Methods

Decellularization of the omentum: The omentum was decellularized as described herein above. Briefly, omenta of healthy six month old pigs were used. In order to remove the cells, the tissues were first agitated in hypotonic buffer and then subjected to gradual lipid extraction. Subsequently, the samples were again treated with the hypotonic buffer, followed by 0.5% (w/v) sodium dodecyl sulfate (SDS) washes. Next, the tissues were gently agitated with 40 units/mL of Benzonase nuclease (Novagen, Madison, WI). Finally, the tissues were rinsed with sterile phosphate buffered saline (PBS), followed by sterile double distilled water, frozen overnight and lyophilized.

Preparation of solubilized omentum dECM: After lyophilization, the decellularized omentum was ground into a coarse powder using a Wiley mini mill and then frozen until further use. Dry, milled omentum dECM was enzymatically digested by adding a 1 mg/ml solution of pepsin (Sigma, 3200-4500 units/mg protein) in 0.1 M HCl. Final concentration of dECM was varied between 1% to 1.5% (w/v). The dECM was digested for 64-72 hours at RT under constant stirring until the liquid was homogenous with no visible particles. Subsequently, salt concentration was adjusted using PBS×10 and the pH was raised to 7.2-7.4 using 1 M NaOH. Raising the pH terminates pepsin activity (the enzyme is deactivated above pH 6). To induce gelation in-vitro, the solubilized omentum ECM was placed in a humidified cell incubator with 5% $CO_2$, at 37° C.

Histology and biochemical analysis: Liquidated omentum dECM was allowed to gel for 2 h at 37° C. Subsequently, gelled samples and native omental samples were fixed in optimum cutting temperature (O.C.T.) embedding medium (Tissue-Tek. Sakura, Japan), sections of 10-12 μm were obtained using a Cryotome™ FSE (Thermo Scientific), and affixed on X-tra™ adhesive glass slides (Leica Biosystems, Wetzler, Germany). Hematoxylin and Eosin (H&E) staining (Merck. Geneva. Switzerland) for decellularization confirmation and Masson's trichrome (Bio-Optica, Milano, Italy) for cell and collagen detection staining were performed according to manufacturer guidelines. For SDS-PAGE protein analysis, 100 μl of 5% SDS solution were added to an equal volume of 1% or 1.5% omentum hydrogels. The mixture was incubated for 10 min at RT for sample solubilization, after which 7.5 μl of each sample (equal to 75 μg and 112.5 μg of the 1% and 1.5% liquidated dECM, respectively) were taken and separated alongside a PageRuler™ size marker (Thermo Scientific, Waltham, MA) on Tris-glycine SDS-polyacrylamide gel (12%). Protein bands were visualized using SeeBand Forte™ Protein staining solution (Gene Bio application, Israel). For nucleic acid detection, slides were stained with 5 μg/mL Hoechst 33258 (Sigma-Aldrich) for 7 min followed by washes with PBS. The samples were visualized using an inverted fluorescence microscope (Nikon Eclipse TI) and images were taken under same exposure parameters. DNA was extracted from dried native or lyophilized dECM hydrogels samples according to manufacturer guidelines (DNeasy Blood & Tissue Kit. Qiagen. Hilden, Germany). The obtained DNA was quantified by measurements of the O.D at 260 nm wavelength using spectrophotometer (Nanodrop 1000, Thermo Scientific). The GAGs content per sample was determined in dried native or lyophilized hydrogels using the Blyscan sulfated GAG assay kit (Biocolor Ltd, UK) according to the manufacturer instructions.

Scanning electron microscopy: For scanning electron microscope (SEM) imaging, samples of 1% and 1.5% liquidated dECM were allowed to gel for 2 h. The samples were then fixed with 2.5% glutaraldehyde in PBS for 2 h at RT followed by dehydration using a graded series of ethanol-water solutions (50%-100%). Liquidated dECM samples were dried over night using a vacuum desiccator at RT. Finally, all samples were critical point dried, sputter-coated with gold and observed under SEM (Jeol JSM840A). The properties of the fibers from at least 5 different randomly located images of each hydrogel were measured with ImageJ software (NIH).

Gelation kinetics: 500 μl of 4° C. liquidated dECM samples at different concentrations were transferred to 48-well plates. Absorbance was measured every minute for 3 h at 405 nm wavelength, using a Synergy™ Multi-Detection Microplate Reader (BioTek, Winooski, VT), pre-heated to 37° C. Absorbance values were normalized and plotted over time. A linear fit was applied to the linear region of the normalized curves to calculate the max slope of gelation (S), the half time of gelation ($t_{1/2}$) and the lag phase ($t_{lag}$). The half time of gelation was defined as the time when the material reached 50% of the maximum measured absorbance. The lag phase was calculated by finding the time at which the linear fit was zero for normalized absorbance.

Rheological properties: Rheological experiments were performed using a Discovery HR-3 hybrid Rheometer (TA Instruments, DE) with 8-mm diameter parallel plate geometry with a Peltier plate to maintain sample temperature. The samples were loaded into the rheometer with the Peltier plate maintaining a temperature of 4° C. The sample was protected from evaporation by applying mineral oil. The temperature was then set to 37° C. to induce gelation; during this time the oscillatory moduli of the sample were monitored continuously at a fixed frequency of 1 Hz and a strain of 5%.

Final viscoelastic properties of the gel were measured by performing a frequency sweep between 0.04 Hz to 10 Hz at 0.63% strain on samples that were allowed to gel for 24 h at 37° C. Data were best-fit to the following equation (1): $\eta = kf^n$, where ($\eta$) is the complex viscosity. (f) is frequency and (k) and (n) being constants.

Swelling ratio: The 1% and 1.5% w/v liquid dECM were allowed to gel for 2 h in a plastic mold at 37° C. Then, 8 mm samples were punctured from the mold and allowed to swell in 3 ml culture medium (as described in section 2.9) in a 6 well plate, one scaffold per well, in a humidified $CO_2$ cell incubator at 37° C. Samples were collected after swelling times of 30 min. 24 h and 72 h and the swelled weight W was measured at each time point. Next, scaffolds were frozen, lyophilized and measured again to obtain dry weight $W_d$. Finally, swelling ratios of the scaffolds were determined using the equation:

$$W_s = W_d/W_d$$

Enzymatic degradation assay: The 1% and 1.5% w/v liquid dECM were allowed to gel for 2 h in a plastic mold at 37° C. Then, 8 mm samples were punctured from the mold and placed in a 24 well plate, one scaffold per well. Then, 500 μl solution of 1 U/ml collagenase type II (Worthington Biochemical Corporation, NJ) in Dulbecco's modified Eagle Medium (DMEM) was added to each well and scaffolds were placed in a humidified $CO_2$ cell incubator at 37° C. under mild shaking conditions. Untreated scaffolds placed under the same conditions but without collagenase supplementation served as control. Solutions were changed every other day. Samples were collected after degradation times of 30 min, 24 h, 72 h and 120 h, frozen and lyophilized. The remaining weight ratios of the scaffolds were determined using the equation $100 - [W_{control} - W_{collagenase}]/W_{control}(\times 100)$.

Cardiomyocytes isolation, encapsulation and culture: Left ventricles of 0-3 day old neonatal Sprague-Dawley rats were harvested and cells were isolated using 6 cycles (30 min each) of enzyme digestion with collagenase type II (95 U/mL; Worthington) and pancreatin (0.6 mg/mL) in DMEM as previously reported. After each round of digestion cells were centrifuged (600 g, 5 min) and re-suspended in culture medium composed of M-199 (Biological Industries, Beit-Haemek. Israel) supplemented with 0.6 mM $CuSO_4.5H_2O$, 0.5 mM $ZnSO_4.7H_2O$, 1.5 mM vitamin B12, 500 U/mL penicillin and 100 mg/mL streptomycin, and 0.5% (v/v) fetal bovine serum (FBS). To enrich the cardiomyocytes population, cells were suspended in culture medium with 5% FBS and pre-plated twice (30 min). Cells were counted and encapsulated in 1:1 hydrogel:culture medium mix. The mixture was then poured into a plastic mold and left to gel for 2 h at 37° C. in a 5% $CO_2$ humidified incubator. Following gelation, scaffolds were extracted from the molds and used for further analysis. Cells cultured on the top surface of pre-formed hydrogels were seeded using a single droplet and allowed to attach to the hydrogels for 2 h before culture medium was added.

Cardiomyocyte immunostaining: Immunostaining was performed as previously described [44]. Cardiac cell seeded on or encapsulated within the hydrogel constructs were fixed and permeabilized in cold methanol for 10 min and blocked with Super Block (ScyTek laboratories, West Logan, UT) for 8 min at RT. After 3 washes with PBS, the samples were incubated for 1 h with primary anti α-sarcomeric actinin antibody (1:750. Sigma-Aldrich). Next, the samples were rinsed and incubated for 1 h with Alexa Fluor 647 conjugated goat anti-mouse antibody (1:500; Jackson, West Grove, PA). For nuclei detection, the cells were incubated for 7 min with Hoechst 33258 and washed three times. Samples were visualized using a laser scanning confocal microscope (Nikon Eclipse Ni).

Hydrogel area change due to cell degradation: Cardiac cells ($1\times10^6$ and $2\times10^6$) have been encapsulated in 200 µl of 1% and 1.5% hydrogels. Hydrogel degradation was macroscopically evaluated after 4 and 7 days in culture. Unseeded hydrogels at both concentrations served as controls for all the measured time points.

Statistical Analysis:

Statistical analysis data are presented as means±standard deviation (SD). Univariate differences between the 1% and 1.5% hydrogels were assessed with Student's t-test. All analyses were performed using GraphPad Prism version 6.00 for Windows (GraphPad Software). $p<0.05$ was considered significant.

Results

Figure 27C:
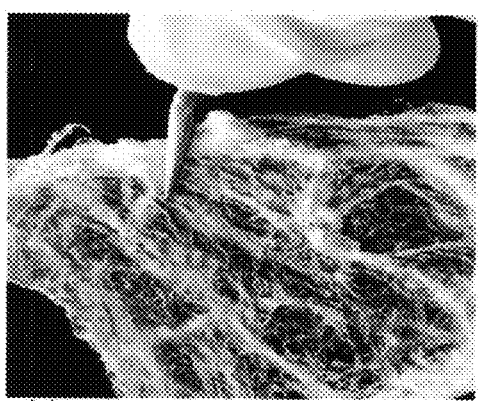
Figure 27F:
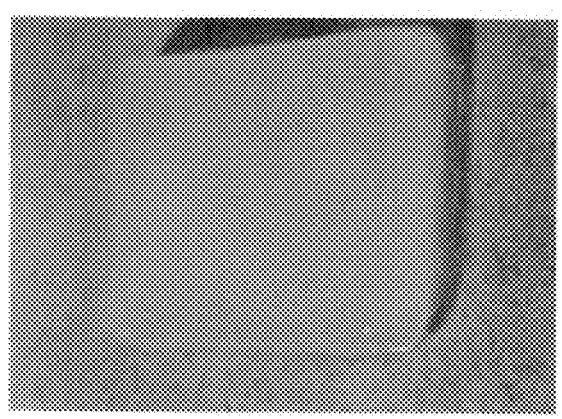
Figure 27B:
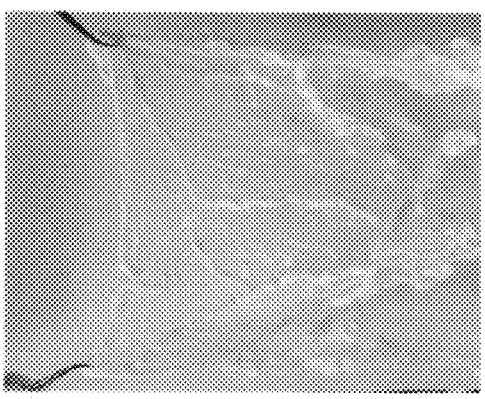
Figure 27E:
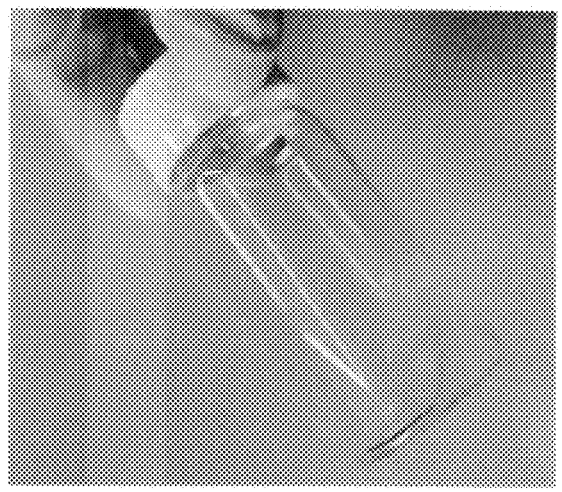
Figure 27A:
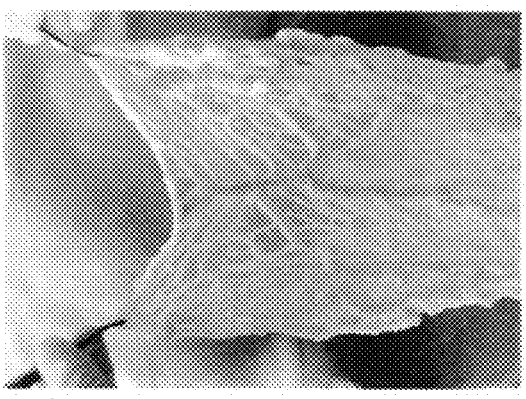
Figure 27D:
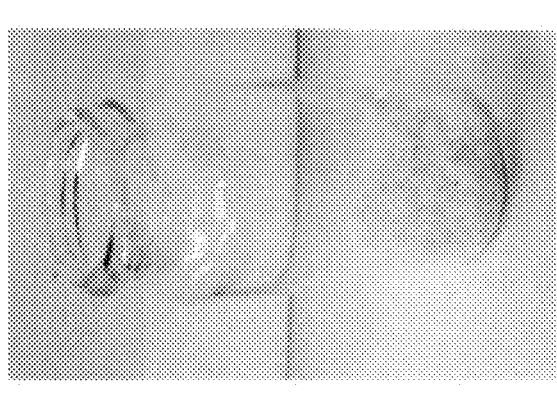

In order to evaluate the potential of omentum ECM-based hydrogels to serve as cell delivery systems, the present inventors first focused on omentum decellularization. Fresh pig omentum was collected and decellularized to produce dry dECM (FIG. 27 A-27C). The dry dECM product was further milled and digested to produce liquidated dECM (FIGS. 27D, 27E). Next, the solution was brought to physiological conditions using PBSx10 and pH 7.2-7.4. The produced material could be easily injected at RT, but self-assembled into a structured mold maintaining hydrogel when allowed to gel at 37° C. (FIG. 27F).

Decellularization Confirmation and Biochemical Analyses

The present inventors next sought to assess the removal of cellular content and the biochemical composition of the produced hydrogel. Histological H&E staining performed on native omentum (FIG. 28A) and dECM-hydrogels sections (FIG. 28B), showed complete cell removal as evident by lack of cells and nuclei in the dECM-hydrogels sections. Masson's trichrome staining of native omentum (FIG. 28C) and dECM-hydrogel (FIG. 28D) revealed well preserved, fibrous, collagen-rich content in the dECM-hydrogel sections. In the myocardium, cells are restrained by a complex network of structural proteins, such as collagen and elastic fibers, adhesive proteins like fibronectin and laminin and by a hydrated network of proteoglycans and GAGs. The fibrillar collagen types I and III are the major components of the myocardial collagen matrix. The interstitial collagen matrix surrounds and supports cardiac myocytes and the coronary microcirculation. High collagen content has an important role in ventricular mechanical function, cell attachment, alignment and coordinated force generation. High collagen content found in the dECM-hydrogels can provide sufficient structural and biochemical support to the encapsulated cells, simulating the natural cardiac microenvironment during the course of scaffold degradation and cell integration with the healthy myocardium. SDS-protein page has revealed bands between 250 to 15 kD, in both dECM solutions. Most protein bands were localized at similar positions as collagen I and other reported dECM-based digests. Complete DNA removal was further validated using Hoechst 33258 staining and residual DNA content quantification. Nuclei were detected in fresh omentum but not in the hydrogel sections (FIGS. 28F, 28G respectively). DNA quantification revealed a significant reduction in DNA in the dECM-hydrogel (FIG. 28H; less than 50 ng DNA per mg dry scaffold), which is considered as a completely decellularized material. Complete removal of nuclei content is important to prevent immunogenicity of the autologous DNA released from omental resident cells during decellularization process.

GAGs are polysaccharides that are major components of the ECM. They control many biological processes, such as cell migration, proliferation and GFs protection. Preservation of GAG content in the dECM-hydrogel could be beneficial for both encapsulated cell viability and for GFs encapsulation. Therefore, the present inventors sought to evaluate GAGs presence in the dECM-hydrogel. Remaining sulfated GAGs (sGAG) were quantified using Blyscan assay (FIG. 28I). The obtained results revealed that native omentum and dECM-hydrogels contained 0.53±0.09 µg and 0.82±0.14 µg sGAG per mg dry scaffold, respectively. These findings are consistent with other reports of sGAG content in dECM-based digests.

Scanning electron microscopy: To confirm fiber existence and analyze the fibrous structure, liquid dECM and dECM-hydrogels were imaged using SEM. As shown, no fibers were visualized in liquid ECM (FIGS. 29A, 29B), whereas a complex network of fibers was revealed post gelation in both concentrations (FIGS. 29C-29F). As expected, the 1.5% dECM-hydrogel had a denser fibrillar structure as compared to the 1% dECM-hydrogel. Both hydrogel concentrations showed randomly oriented fibers in the nanoscale region, usually between tens to hundreds nm in diameter (FIG. 29G). Average fiber diameter was around 150 nm in both the 1% and the 1.5% concentrations. Such fiber dimensions are in accordance with endomysial fibers of the native cardiac matrix, which wrap individual cells and connect adjacent myocytes to one another. Therefore, this system could provide the structural signaling needed for encapsulated cell attachment and enhance their survival until the delivery vehicle is degraded and the cells are integrated within the desired location.

Figure 30A:
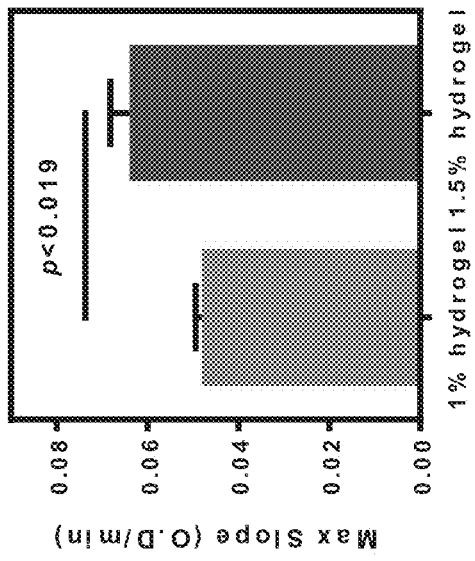
Figure 30C:
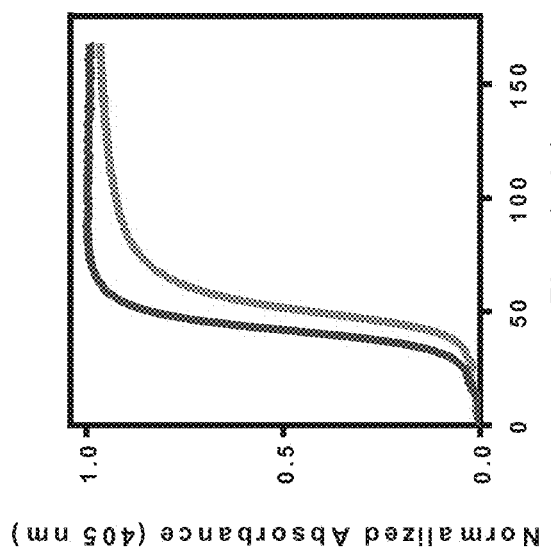
Figure 30B:
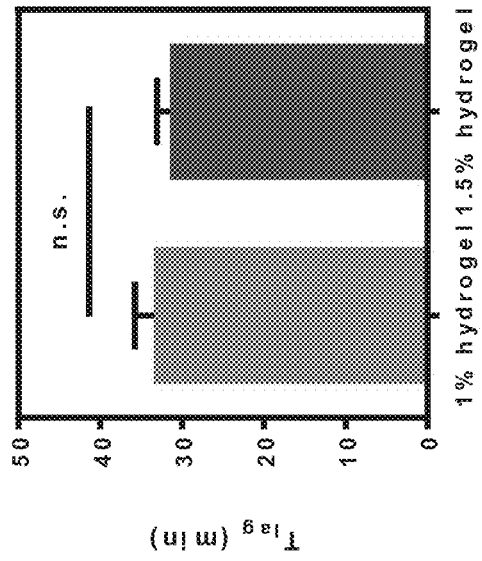
Figure 30D:
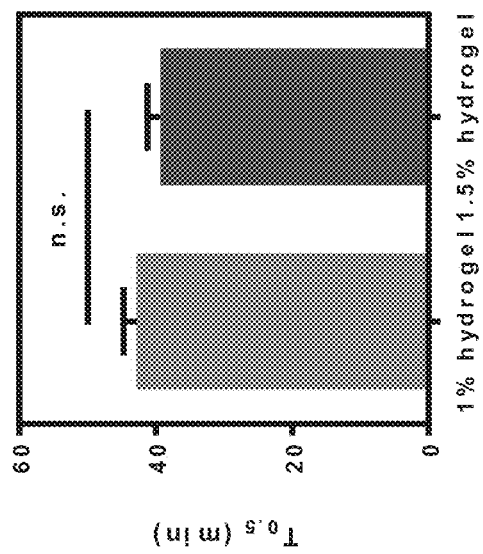
Figure 32C:
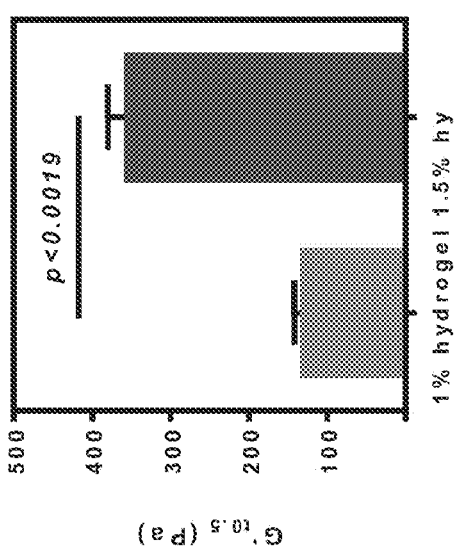
Figure 32B:
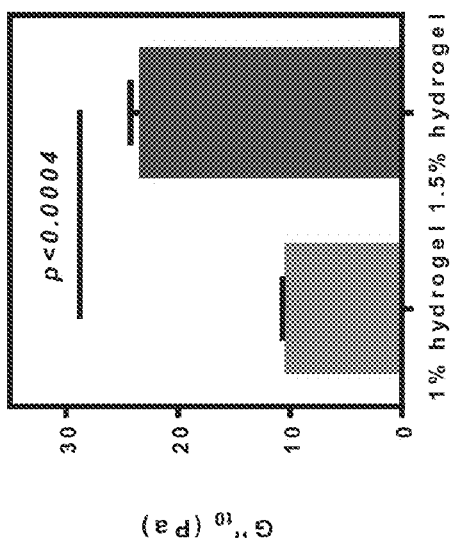
Figure 32A:
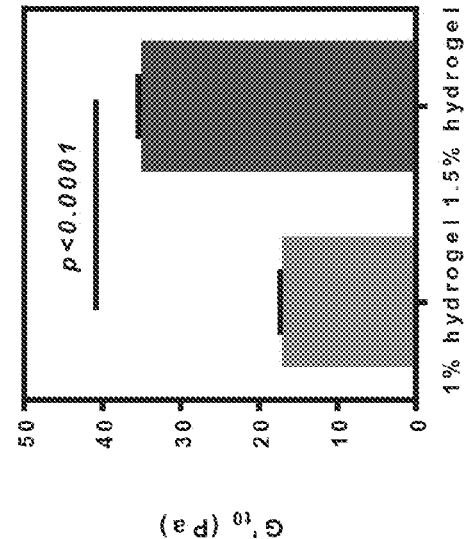
Figure 32F:
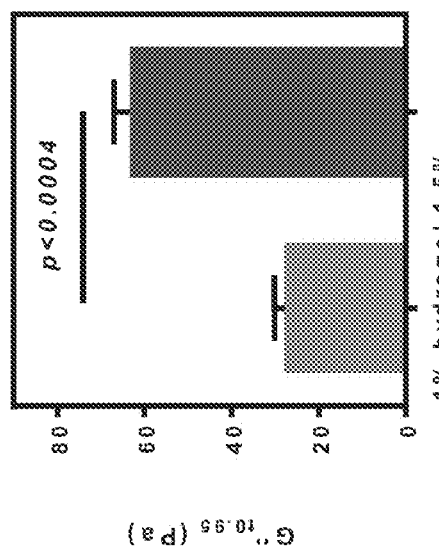
Figure 32E:
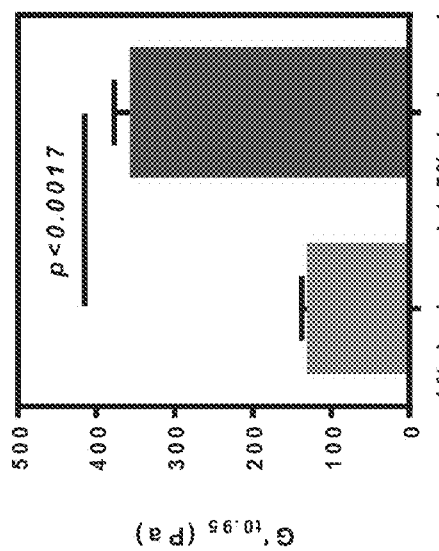
Figure 32D:
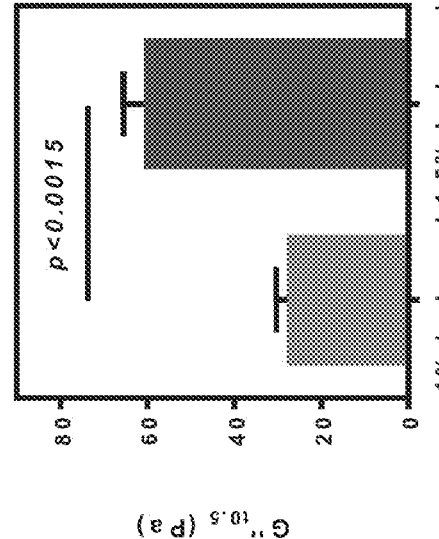

Turbidity gelation kinetics: Absorbance changes of liquidated dECM during the gelation period were used for calculating gelation kinetics parameters (FIGS. 30A-30D). For both hydrogel concentrations a typical sigmoidal graph was observed after temperature was elevated from 4° C. to 37° C. (FIG. 30A). Gelation parameters calculated from the obtained graphs (FIGS. 30B-30D and Table 2) revealed that the higher concentration hydrogel (1.5% w/v) had a higher maximum slope in the linear region, reached half of maximum absorbance faster and had a shorter lag phase than the 1% w/v hydrogel. The gelation kinetics parameters, such as speed of gelation or lag time, can be controlled by varying the initial dECM concentration. These parameters influence the degree of cell, drug, GFs and hydrogel material leakage from the desired site to adjacent areas after delivery, subsequently effecting the success of the treatment. Furthermore, as one of the advantages of the developed hydrogel is its injectability, gelation parameters might influence the final shape of the material inside the infarction and the time period the patient must stay without motion during the procedure.

TABLE 2

Turbidity results for slope of linear region (S), half gelation time ($T_{1/2}$) and lag time ($T_{lag}$) of 1% and 1.5% dECM-hydrogels

| Material | S (OD/min) | $t_{1/2}$ (min) | $t_{lag}$ (min) |
|---|---|---|---|
| 1% hydrogel | 0.048 ± 0.001 | 42.83 ± 1.93 | 33.45 ± 2.32 |
| 1.5% hydrogel | 0.064 ± 0.004 | 39.36 ± 1.88 | 31.54 ± 1.57 |

Rheological properties of dECM-hydrogels: Rheological properties of an obtained material are important characteristics in order to predict their behavior under applied forces. When temperature was elevated from 4° C. to 37° C. and during the gelation period, both the storage modulus (G') and the loss modulus (G") changed over time, and were characterized by a sigmoidal shape (FIG. 31A and FIGS. 32A-32F). As G' was greater than G" at both concentration throughout the measurements, the analyzed materials have pronounced elastic gel properties. Under the present conditions (5% strain, shear rate of 1 Hz), increasing material concentration from 1% to 1.5% w/v significantly increased the storage modulus, indicating on the formation of stiffer gels. In addition, the kinetics of the storage and loss modulus was faster than the turbidity kinetics (FIGS. 30A-30D and Table 2). The complex viscosity of omentum dECM-hydrogels at both concentrations was assessed over a range of shear rates. Across all samples, the complex viscosity decreased as the shear rate increased (FIG. 31B). A linear trend was observed when obtained data was plotted on a log-log scale. As a result, the power equation was used to fit the data. Increasing the concentration of the omentum-ECM increased intermolecular forces, resulting in an elevated viscosity. This increase in viscosity can be observed as a vertical shift of the data points in FIG. 31B. This trend is also confirmed by the increase of (k) values between the 1% and the 1.5% w/v samples (Table 3). The (n) values across the samples are observed to be negative, which indicate that the material is shear thinning, meaning a material will have a lower viscosity under higher shear rates.

TABLE 3

Complex viscosity fit for dECM-hydrogels at different concentration

| Material | k | n | $r^2$ |
|---|---|---|---|
| 1% hydrogel | 12.799 | −0.694 | 0.9574 |
| 1.5% hydrogel | 19.854 | −0.773 | 0.9788 |

Swelling ratio by weight: Swelling studies indicated that a swelling equilibrium by mass was already reached at the first measured time point (30 min) for both hydrogel concentrations, remaining almost constant up to 7 d (FIG. 33A). At 30 min. a swelling equilibrium ratio of 43.59±1.37 and 35.51±0.08 was reached for the 1% and 1.5% dECM-hydrogel, respectively (p=0.02). Swelling parameters govern the degree of diffusion in and out of the hydrogel for various factors that influence both the encapsulated cells (oxygen and nutrients) and the surrounding environment (drugs or GFs). These parameters could also influence the migration of encapsulated cells out, or the degree of vascular cell infiltration into, the hydrogel.

Enzymatic degradation: As omentum dECM-hydrogels were developed for the purpose of cell delivery in-vivo, the present inventors further examined the kinetics of hydrogel degradation by ECM-specific enzymes. In the myocardium, collagen fiber breakdown is mediated by collagenase, generally produced by cardiac fibroblasts. As expected, higher dECM concentration resulted in slower enzyme-dependent degradation (FIG. 33B). The degradation rate was similar through the first 30 min, however the 1.5% hydrogel degraded much slower throughout the experiment. Comparatively, after 72 and 120 h, almost complete degradation was reached in the 1% hydrogel; while in the 1.5% hydrogels about 77% and 20% w/w still remained, respectively. These results indicate that degradation could be controlled through hydrogel concentration. The control over degradation kinetics is important as it influences encapsulated cell escape from the delivery vehicle, influences blood vessel infiltration into the matrix and GF or drug release from the formed hydrogels. All these parameters affect cell survival and consequently the therapeutic outcome from the treatment.

Figure 34E:
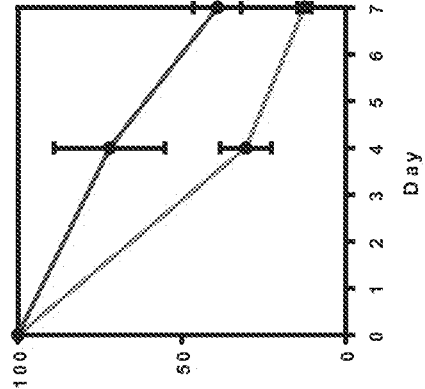
Figure 34F:
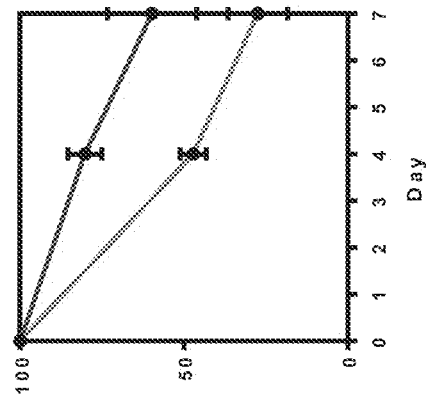
Figure 34A:
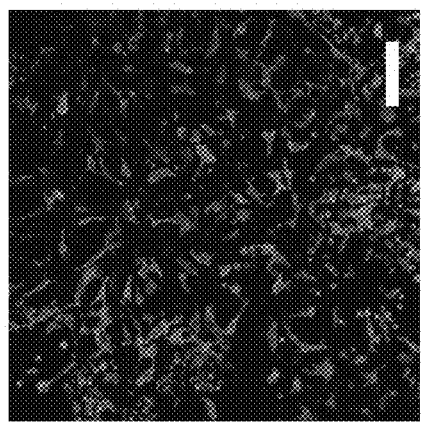
Figure 34B:
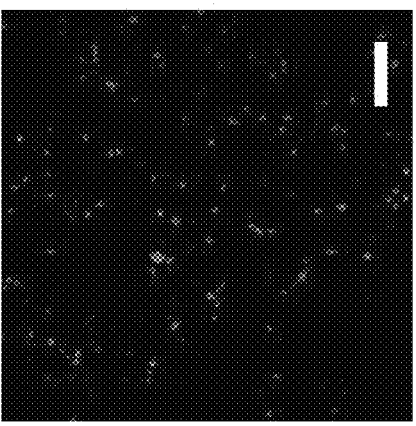
Figure 34C:
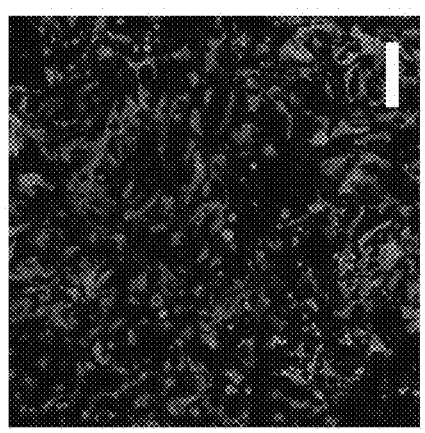
Figure 34D:
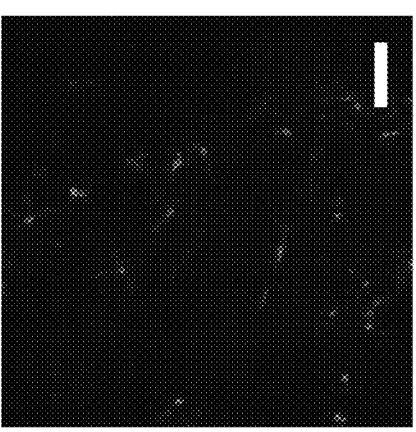

Hydrogel potential to accommodate cardiac cells: Finally, the present inventors sought to evaluate the ability of the hydrogel to support cardiac cells. Thus, cardiac cells were isolated and encapsulated within, or seeded on dECM-hydrogels. On day 7 of cultivation, the cell-hydrogel constructs were immunostained against cardiac actinin (FIGS. 34A-34F). Cardiomyocytes seeded on top of the hydrogels appeared elongated with typical cardiac striations (FIGS. 34A, 34B), similar to native myocardium. It may be concluded that the successful adherence of cardiac cells to the matrix was due to binding domains still remaining in the hydrogel. Most cardiomyocytes encapsulated within the 1% hydrogel also appeared elongated, although some cells did not spread and appeared round in shape (FIG. 34C). As for the encapsulated cells, more cells appeared rounded in the 1.5% (FIG. 34D) than in the 1% hydrogels. This could be explained by the relatively denser microenvironment inside the 1.5% hydrogel that could prevent cell spreading.

Another important characteristic of cell-matrix interaction is the ability of the cells to degrade the encapsulating material. This is important in order to evaluate cell ability to be released from the matrix and consequently to be free to interact and integrate with the host tissue. After encapsulation, cells degrade the hydrogel, reducing hydrogel area over time. It was noticed that degradation was both depended on initial encapsulated cell number and on hydrogel concentration (FIGS. 34E, 34F). A higher cell number of initially encapsulated cells promoted a greater extent of degradation. It may be speculated that as the 1.5% hydrogels were found to be stiffer and denser than the 1% hydrogels, this hydrogel would degrade slower than the 1%. As expected, when the same number of cells were encapsulated in both hydrogel concentrations, reduction in hydrogel area was slower for the 1.5% hydrogel.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of 3D printing a 3D structure of cardiac tissue, the method comprising:
    (a) digesting decellularized omentum with a proteolytic enzyme to generate a liquid composition which comprises solubilized, decellularized omentum, said liquid composition being capable of forming a gel at 37° C.; wherein the liquid composition is more than 99% devoid of nucleic acid or residual nucleic acid components and wherein the liquid composition is more than 99% devoid of lipid components;
    (b) combining said liquid composition with viable cardiac cells to form a mixture comprising solubilized, decellularized omentum and the viable cardiac cells; and
    (c) extruding said mixture through an aperture; and
    (d) generating 3D structure of cardiac tissue comprising viable cardiac cells having an elongated morphology and decellularized omentum, thereby 3D printing the 3D structure of cardiac tissue;

further comprising decellularizing said omentum prior to said digesting wherein said decellularizing comprises:
    (i) exposing the omentum to a hypotonic solution to produce hypotonic shock; (ii) exposing the omentum to freeze-thaw conditions following step (i); (iii) dehydrating said omentum following step (ii); (iv) extracting fat from the dehydrated omentum using polar and non-polar extraction agents following step (iii); (v) rehydrating the dehydrated omentum following step (iv); and (vi) extracting cells from said rehydrated omentum following step (v); wherein step (iv) also comprises washing the dehydrated omentum multiple times with acetone, followed by three incubations in a 60:40 hexane:acetone solution.

2. The method of claim 1, wherein said omentum is human omentum.

3. The method of claim 1, wherein a diameter of said aperture is between 0.1-0.7 mm.

4. The method of claim 1, wherein the mixture consists of viable cells and decellularized omentum.

5. The method of claim 1, further comprising combining said liquid composition with endothelial cells following step (a) and prior to step (c).

6. The method of claim 5, wherein said 3D structure of cardiac tissue comprises blood vessels.

* * * * *